US011571705B2

United States Patent
Enokihara et al.

(10) Patent No.: US 11,571,705 B2
(45) Date of Patent: Feb. 7, 2023

(54) COATING APPLICATOR FOR PROVIDING A BELT-SHAPED PASTE LAYER

(71) Applicant: TOYOTA JIDOSHA KABUSHIKI KAISHA, Toyota (JP)

(72) Inventors: Katsushi Enokihara, Toyota (JP); Takenori Ikeda, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 54 days.

(21) Appl. No.: 17/234,022

(22) Filed: Apr. 19, 2021

(65) Prior Publication Data

US 2021/0237113 A1 Aug. 5, 2021

Related U.S. Application Data

(63) Continuation of application No. 15/889,313, filed on Feb. 6, 2018, now Pat. No. 11,040,368.

(30) Foreign Application Priority Data

Feb. 8, 2017 (JP) .............................. JP2017-021535
Jul. 26, 2017 (JP) .............................. JP2017-144178

(51) Int. Cl.
  *B05C 1/08* (2006.01)
  *H01M 4/04* (2006.01)
  *B05D 1/26* (2006.01)
  *B05D 1/28* (2006.01)

(52) U.S. Cl.
  CPC .......... *B05C 1/0882* (2013.01); *B05C 1/0865* (2013.01); *B05D 1/26* (2013.01); *H01M 4/0404* (2013.01); *B05D 1/28* (2013.01); *B05D 2252/02* (2013.01)

(58) Field of Classification Search
  None
  See application file for complete search history.

(56) References Cited

U.S. PATENT DOCUMENTS

| 2002/0018857 A1 | 2/2002 | Bode et al. |
| 2012/0033200 A1 | 2/2012 | Bentmar |
| 2016/0240859 A1 | 8/2016 | Uezono |

(Continued)

FOREIGN PATENT DOCUMENTS

| JP | 3680985 B2 | 8/2005 |
| JP | 2015-141876 A | 8/2015 |

(Continued)

OTHER PUBLICATIONS

Belblidia et al. (Reverse roll-coating flow: a computational investigation towards high-speed defect free coating in the field of roll coating, Mech Time-Depend Mater (2013) 17:557-579; Belblidia) (Year: 2013).

(Continued)

*Primary Examiner* — Francisco W Tschen
(74) *Attorney, Agent, or Firm* — Sughrue Mion, PLLC

(57) ABSTRACT

At the time of forming a paste layer on a substrate sheet by use of three rolls placed at right angles, in order to offset a variation amount of a first gap due to thermal expansion of the rolls, a variation amount in a given detection period is calculated by use of outputs of a first sensor configured to detect a coating film surface of a second-roll coating film of a second roll and a second sensor configured to detect a second-roll surface, and the first roll is moved by use of a first-roll moving mechanism.

7 Claims, 22 Drawing Sheets

(56) References Cited

U.S. PATENT DOCUMENTS

| | | |
|---|---|---|
| 2017/0155125 A1 | 6/2017 | Ikeda |
| 2018/0006292 A1 | 1/2018 | Nakano et al. |
| 2018/0221908 A1 | 8/2018 | Enokihara |

FOREIGN PATENT DOCUMENTS

| | | |
|---|---|---|
| JP | 2016-152169 A | 8/2016 |
| JP | 2017-103015 A | 6/2017 |

OTHER PUBLICATIONS

Benjamin et al. Multiple Roll Systems: Steady-State Operation, AIChE Journal, vol. 41, No. 5, May 1995; 1045-1060). (Year: 1995).

Notice of Allowance dated Mar. 3, 2021, which issued during the prosecution of U.S. Appl. No. 15/889,313.

Enokihara, Katsushi et al., U.S. Appl. No. 15/889,313, filed Feb. 6, 2018.

COATING APPLICATOR FOR PROVIDING A BELT-SHAPED PASTE LAYER

INCORPORATION BY REFERENCE

This application is a continuation of U.S. application Ser. No. 15/889,313 filed Feb. 6, 2018 (allowed), which is based on Japanese Patent Application No. 2017-021535 filed on Feb. 8, 2017 and Japanese Patent Application No. 2017-144178 filed on Jul. 26, 2017 including the specification, drawings and abstract is incorporated herein by reference in its entirety.

BACKGROUND

1. Technical Field

The present disclosure relates to a manufacturing method of a paste-layer-attached sheet formed such that a belt-shaped paste layer is provided on a belt-shaped substrate sheet, and a coating applicator used in manufacture thereof.

2. Description of Related Art

As a belt-shaped electrode plate (a positive plate or a negative plate) used for a battery, there has been known an electrode plate in which a belt-shaped active material layer including active material particles, a binder, and the like is formed on a belt-shaped current collector foil. Such an electrode plate is manufactured by the following technique, for example. That is, an active material paste in which active material particles and a binder are dispersed in a solvent is prepared. Then, a coating applicator including a first roll, a second roll placed in parallel with the first roll via a first gap, and a third roll placed in parallel with the second roll via a second gap is prepared. The active material paste is supplied to the first gap between the first roll and the second roll, so as to form a wet coating film on the second roll. Subsequently, the wet coating film is transferred onto a current collector foil passing through the second gap between the second roll and the third roll, so that a wet active material layer is applied to the current collector foil. After that, the wet active material layer on the current collector foil is dried, so that an active material layer is formed. Such a manufacturing method is described in Japanese Patent Application Publication No. 2016-152169 (JP 2016-152169 A), for example.

SUMMARY

However, when the wet active material layer (paste layer) is continuously formed on a long belt-shaped current collector foil (substrate sheet) by use of the coating applicator as mentioned above, a temperature increases due to frictional heat or the like generated near the first gap and the second gap, so that a dimension (radius) of each roll gradually increases due to thermal expansion. Consequently, a dimension of the first gap decreases due to the increase of the radii of the first roll and the second roll, thereby decreasing a thickness of the wet coating film (second-roll coating film) formed on the second roll. Because of this, a thickness and a density of the wet active material layer (paste layer) formed on the current collector foil (the substrate sheet) vary.

The present disclosure provides a manufacturing method of a paste-layer-attached sheet and a coating applicator use for manufacture thereof, each of which restrains variations in a paste layer formed on a substrate sheet along with thermal expansion of each roll.

One aspect of the present disclosure relates to a manufacturing method of a paste-layer-attached sheet in which a belt-shaped paste layer made of a paste is provided on a belt-shaped substrate sheet, and the manufacturing method includes: forming the paste layer on the substrate sheet by use of a coating applicator, the coating applicator including: a first roll; a second roll placed in parallel with the first roll via a first gap and configured to rotate in a second-roll rotation direction reverse to the first roll; a third roll placed in parallel with the second roll via a second gap and configured to rotate in a reverse direction to the second roll so as to convey the substrate sheet passing through the second gap, the first roll, the second roll, and the third roll being placed such that a first virtual surface connecting a second-roll central axis of the second roll to a first-roll central axis of the first roll and a second virtual surface connecting the second-roll central axis of the second roll to a third-roll central axis of the third roll intersect with each other at right angles at the second-roll central axis and the second gap is formed in a part advanced by a quarter turn from the first gap in the second-roll rotation direction over a second-roll surface of the second roll; a first sensor configured to detect a first radial position on a coating film surface of a second-roll coating film made of the paste applied to the second-roll surface, the first radial position being at a first angle position on the coating film surface of the second-roll coating film, the first angle position being advanced by a first angle from the first gap in the second-roll rotation direction over the second-roll surface, the first angle being larger than 0° but smaller than 90°; a second sensor placed to be opposed to the first sensor across the second roll and configured to detect a second radial position on the second-roll surface of the second roll, the second radial position being at a second angle position on the second-roll surface, the second angle position being advanced from the first angle position by 180° in the second-roll rotation direction; and a first-roll moving mechanism configured to move the first roll in a first direction connecting the second roll to the first roll, the paste layer being formed such that the paste is supplied to the first gap and the second-roll coating film applied to the second-roll surface is passed through the second gap so as to be transferred onto the substrate sheet conveyed by the third roll; detecting, every detection period, a variation amount of a gap dimension of the first gap from the first radial position detected by the first sensor and the second radial position detected by the second sensor, the variation amount being caused during the detection period due to thermal expansion caused in the first roll and the second roll, the detection period being provided repeatedly; moving the first roll in the first direction by use of the first-roll moving mechanism so as to offset the detected variation amount of the first gap; and starting detection in a new detection period after the movement of the first roll by the first-roll moving mechanism is finished, and then, a second-roll rotation time during which the second roll rotates by the first angle elapses after a previous detection period is finished.

The manufacturing method of the paste-layer-attached sheet uses the coating applicator in which the first roll and the third roll are placed around the second roll. In this coating applicator, even if the first roll is moved in the first direction in order to adjust the gap dimension of the first gap, this hardly affects a gap dimension of the second gap placed in the second direction perpendicular to this. Hereby, it is possible to move the first roll without considering the influence on the second gap. Note that it is found that a thickness of the second-roll coating film is equal to a dimension of the first gap at a time point of forming the second-roll coating film. In view of this, in a detection step, by use of the first sensor and the second sensor placed as mentioned earlier, the variation amount of the first gap, caused due to the thermal expansion of the first roll and the second roll during a detection period is detected every detection period, and at the time when the first roll is moved, the first roll is moved in the first direction by use of the first-roll moving mechanism so as to offset the detected variation amount of the first gap. Thus, a variation of the thickness of the second-roll coating film, caused due to a variation of the first gap, is eliminated every detection period, thereby making it possible to prevent accumulation of variations in the first gap. Thus, with the manufacturing method, the influence of the thermal expansion of the first roll and the second roll on a thickness and a density of the paste layer formed on the substrate sheet is restrained, thereby making it possible to manufacture a paste-layer-attached sheet in which variations of the paste layer in a longitudinal direction of the substrate sheet are restrained.

Note that the new detection period is started after the movement of the first roll by the first-roll moving mechanism is finished, and then, the second-roll rotation time during which the second roll rotates by the first angle elapses after the previous detection period is finished. With such a configuration, a next detection period is started after a timing when the first gap is set to a new dimension by the movement of the first roll and a second-roll coating film formed by the first gap with such a new gap dimension can be detected by the first sensor, so that an output of the first sensor can be used at the beginning of the detection period.

Further, a radial position on a surface of the second roll or on the coating film surface of the second-roll coating film provided on the second roll indicates a position in a radial direction of the second roll on the basis of the second-roll central axis. The first sensor and the second sensor are displacement sensors configured to detect a radial position on the coating film surface of the second-roll coating film or on the second-roll surface, and an electrostatic-capacitance displacement meter, an optical displacement meter, a laser displacement meter, and the like that can detect the radial position on the coating film surface of the second-roll coating film or on the second-roll surface can be used, for example. Further, these sensors may detect the radial position on the coating film surface of the second-roll coating film or on the second-roll surface, on the basis of a radial position on the second-roll surface in a state where no thermal expansion is caused in the rolls (before manufacture of the paste-layer-attached sheet) before the paste is supplied to the first gap (in a state where the paste is not applied to the second-roll surface), for example.

The first angle position at which the first sensor detects the radial position on the coating film surface of the second-roll coating film is a position advanced from the first gap by the first angle θ1 in the second-roll rotation direction over the second-roll surface, and is selected from a range of θ1=0° to 90°. The first angle θ1 may be selected from a range of θ1=25° to 65°, further a range of θ1=40° to 50°. This is because the first sensor is easily placed between the first roll and the third roll without interfering with them. Further, as described above, the second sensor detects the second-roll radial position on the second-roll surface at the second angle position advanced from the first angle position by 180° in the second-roll rotation direction on the second-roll surface, that is, at the second angle position just opposite to the first angle position across the second-roll central axis.

On this account, a thickness of the second-roll coating film can be detected from the radial position on the coating film surface of the second-roll coating film, detected from an output of the first sensor, for example. In addition to this, a variation amount of the thickness of the second-roll coating film, caused during a detection period, that is, the variation amount of the gap dimension of the first gap can be detected, from changes of the outputs of the first sensor and the second sensor during the detection period.

An example is further described, more specifically. A variation amount of a radius R1 of the first roll, caused during a given detection period, is assumed ΔR1, a variation amount of a radius R2 of the second roll, caused during the detection period, is assumed ΔR2, a variation amount of the first gap KG1, caused during the detection period, is assumed ΔG1, a variation amount of the first radial position PR5s on the coating film surface of the second-roll coating film, the variation amount being caused during the detection period and detected by the first sensor, is assumed ΔPR5s, and a variation amount of the second radial position PR12s on the second-roll coating film, the variation amount being caused during the detection period and detected by the second sensor, is assumed ΔPR12s. Here, it is found that the thickness of the second-roll coating film formed on the second-roll surface is equal to the gap dimension of the first gap at a time point of forming the second-roll coating film. Further, from this, a variation amount of the thickness of the second-roll coating film, caused during a given detection period (from start to end of the detection period) is equal to a variation amount of the gap dimension of the first gap during the detection period.

When the radius R2 of the second roll expands only by the variation amount ΔR2 due to thermal expansion during the detection period, the second radial position PR12s on the second-roll coating film, detected by the second sensor, is also moved radially outwardly. More specifically, the second radial position PR12s is changed by a variation amount ΔPR12s=ΔR2. That is, the second sensor can detect the variation amount ΔR2 of the radius R2 due to the thermal expansion of the second roll. In the meantime, the first sensor detects the first radial position PR5s on the coating film surface of the second-roll coating film. The first radial position PR5s on the coating film surface of the second-roll coating film is a position obtained by adding the thickness of the second-roll coating film to the radius R2 of the second roll, that is, a position obtained by adding the gap dimension G1 of the first gap to the radius R2 of the second roll. This also corresponds to a radial position on the first roll surface of the first roll in the first gap. Accordingly, when the radius R1 of the first roll increases only by the variation amount ΔR1 due to thermal expansion, the first radial position PR5s on the coating film surface of the second-roll coating film, detected by the second sensor, is decreased (moved toward a center side) by just that much. That is, the variation amount ΔPR5s of the first radial position PR5s to be detected by the first sensor is equal to an inverse number of the variation amount ΔR1 of the radius R1 due to the thermal expansion of the first roll, caused during the detection period (ΔPR5s=−ΔR1). Further, when movements of the first-roll central axis and the second-roll central axis during the detection period are ignored, the gap dimension G1 of the first gap is decreased only by an amount corresponding to the thermal expansion caused in the first roll and the second roll during the detection period. That is, the variation amount ΔG1 of the gap dimension G1 corresponds to an inverse number of a sum of the variation amounts $\Delta R1$, $\Delta R2$ of the radii R1, R2, caused in the first roll and the second roll ($\Delta G1=-(\Delta R1+\Delta R2)$). Accordingly, the variation amount $\Delta G1$ of the gap dimension G1 can be detected from the variation amount $\Delta PR5s$ detected by the first sensor and the variation amount $\Delta PR12s$ detected by the second sensor.

As the detection period, detection periods divided by a predetermined time (e.g., one minute) can be used, for example. Further, at the beginning of start of the coating applicator, the detection period may be set to be relatively short (e.g., 30 seconds), and after a time passes from the start and the thermal expansion increases moderately, the detection period may be set to be relatively long (e.g., five minutes). Further, the detection period may be finished at a time point when a variation of the first gap from the start of the detection period exceeds a predetermined value, and a new detection period may be started after a first-roll moving step and an adjustment step.

Note that the "paste" is an application material in which a solute (e.g., active material particles and a binder) is mixed with a solvent, and includes an application material made of a plurality of wet granulated bodies. Here, the wet granulated body is a substance (granular material) in which a solvent is maintained (absorbed) by solute particles and the solute particles are aggregated (bonded). The wet granulated body may be obtained by mixing and granulating the active material particles, the binder, and the solvent. The wet granulated body is a substance (granular material) in which the solvent is maintained (absorbed) by the active material particles and the binder and they are aggregated (bonded).

The manufacturing method of the paste-layer-attached sheet may be a manufacturing method of the paste-layer-attached sheet in which, when the variation amount of the gap dimension of the first gap is detected, the variation amount of the first gap, caused during the detection period due to the thermal expansion, is acquired from a difference between a variation amount of the first radial position on the coating film surface of the second-roll coating film, the variation amount being caused during the detection period and detected by the first sensor, and a variation amount of the second radial position on the second-roll surface of the second roll, the variation amount being caused during the detection period and detected by the second sensor.

In the manufacturing method of the paste-layer-attached sheet, the variation amount of the gap dimension of the first gap, caused during the detection period, is acquired from the difference between the variation amount $\Delta PR5s$ of the first radial position $PR5s$ on the coating film surface of the second-roll coating film and the variation amount $\Delta PR12s$ of the second radial position $PR12s$ on the second-roll coating film of the second roll, the variation amounts being caused during the detection period. Thus, the variation amount $\Delta G1$ of the gap dimension G1 of the first gap can be acquired easily. That is, $\Delta G1=-(\Delta R1+\Delta R2)=\Delta PR5s-\Delta PR12s$ is established, and thus, the variation amount $\Delta G1$ of the gap dimension G1 can be easily acquired from the difference between the variation amount $\Delta PR5s$ and the variation amount $\Delta PR12s$.

Further, in the manufacturing method of the paste-layer-attached sheet, the first sensor may be a sensor configured to detect the first radial position on the coating film surface based on a preinitiation first radial position on the second-roll surface at the first angle position as a reference position, the preinitiation first radial position being measured by the first sensor before the supply of the paste to the first gap is started; and the second sensor may be a sensor configured to measure the second radial position on the second-roll surface based on a preinitiation second radial position on the second-roll surface at the second angle position as a reference position, the preinitiation second radial position being measured by the second sensor before the supply of the paste to the first gap is started. The manufacturing method may include: measuring, by the first sensor, an initial first radial position on the coating film surface of the second-roll coating film based on the preinitiation first radial position as the reference position, after the second roll rotates by the first angle or more, but before the second roll makes a first predetermined number of rotations, counting from the start of the supply of the paste to the first gap at a time of starting a first detection period among the detection periods provided repeatedly; measuring, by the second sensor, an initial second radial position on the second-roll surface based on the preinitiation second radial position as the reference position; measuring, by the first sensor, an end first radial position on the coating film surface of the second-roll coating film based on the preinitiation first radial position as the reference position at an end of each of the detection periods after the initial first radial position and the initial second radial position are measured; measuring, by the second sensor, an end second radial position on the second-roll surface based on the preinitiation second radial position as the reference position; and calculating a value of $\Delta G1$, which is a variation amount of the first gap, caused due to the thermal expansion during each of the detection periods, by use of a relational expression of $\Delta G1=(L12-L22)-(L11-L21)$, where L11 indicates a value of the initial first radial position, L21 indicates a value of the initial second radial position, L12 indicates a value of the end first radial position, and L22 indicates a value of the end second radial position.

When the supply of the paste to the first gap is started to start machining of compressing and depositing the paste (forming a coating film) between the first roll and the second roll, a machining reaction force (a reaction force to a compressive force applied to the paste at the time of compressing and depositing the paste between the first roll and the second roll) is applied to the first roll and the second roll. Right after the processing starts, a large machining reaction force is suddenly applied to the first roll and the second roll. Accordingly, the first roll and the second roll may move in the first direction due to the machining reaction force, so that the gap dimension of the first gap between the first roll and the second roll might increase (a rotating shaft of the first roll might be displaced in a direction distanced from the second roll, and a rotating shaft of the second roll might be displaced in a direction distanced from the first roll). Particularly, in a case where an application material made of wet granulated bodies having a high solid fraction (with a small solvent amount) is used as the paste, the machining reaction force increases, which easily causes the displacements of the first roll and the second roll. This results in that the gap dimension of the first gap between the first roll and the second roll changes.

Further, soon after the start of the machining of compressing and depositing the paste between the first roll and the second roll, the first roll and the second roll thermally expand due to frictional heat generated near the first gap. Particularly, in a case where an application material made of wet granulated bodies having a high solid fraction (with a small solvent amount) is used as the paste, a generation amount of frictional heat is large, which easily causes thermal expansion of the first roll and the second roll. This thermal expansion also changes the gap dimension of the first gap between the first roll and the second roll.

In the meantime, most of the displacements of the first roll and the second roll due to the machining reaction force occur right after the start of the processing (e.g., until the second roll rotates once from the start of the processing), but the displacements do not occur about the time when thermal expansion of the first roll and the second roll occurs after that (e.g., at the time when the number of rotations of the second roll exceeds 30 from the start of the processing) (even if the displacements occur, they can be ignored). Accordingly, it can be considered that, after the gap dimension of the first gap changes along with the displacements of the first roll and the second roll due to the machining reaction force, the gap dimension of the first gap changes along with the thermal expansion of the first roll and the second roll.

In view of this, in the above manufacturing method, a gap dimension of the first gap after the first gap changes along with the displacements of the first roll and the second roll due to the machining reaction force (before the first roll and the second roll thermally expand) is assumed a target gap dimension (a first-gap target value) of the first gap, and a variation amount of the gap dimension of the first gap, the variation amount being changed from the first-gap target value due to the thermal expansion of the first roll and the second roll during the detection period, is calculated as a variation amount $\Delta G1$. Then, in the first-roll moving step, the first roll is moved so as to offset the variation amount $\Delta G1$, so that the gap dimension of the first gap is adjusted to the first-gap target value.

That is, in the above manufacturing method, a gap dimension of the first gap after the first gap changes along with the displacements of the first roll and the second roll due to the machining reaction force (before the first roll and the second roll thermally expand) is assumed a target gap dimension (the first-gap target value) of the first gap, and a feedback control is performed so that the gap dimension of the first gap reaches the first-gap target value during a manufacture period. With such a configuration, a thickness of a coating film to be formed through between the first roll and the second roll can be adjusted to the first-gap target value or a dimension close to this over the entire manufacture period.

More specifically, in the manufacturing method, in a first initial detection step included in the detection step, the initial first radial position and the initial second radial position are measured by the first sensor and the second sensor, after the second roll rotates by the first angle $\theta 1$ or more, but before the second roll makes a predetermined number of rotations, counting from the start of the supply of the paste to the first gap. More specifically, the first sensor measures, as a radial position on the coating film surface of the second-roll coating film, the initial first radial position on the coating film surface (in other words, a second-roll radial distance from a preinitiation first radial position as a reference position) based on the "preinitiation first radial position on the second-roll surface at the first angle position, measured in advance by the first sensor before the supply of the paste to the first gap is started" being taken as the reference position (zero reference).

Further, the second sensor measures, as a radial position on the second-roll surface of the second roll, the initial second radial position on the second-roll surface of the second roll (in other words, a second-roll radial distance from a preinitiation second radial position as a reference position) based on the "preinitiation second radial position on the second-roll surface at the second angle position, measured in advance by the second sensor before the supply of the paste to the first gap is started" being taken as the reference position (zero reference).

Note that, at the time when the second roll rotates only by the first angle $\theta 1$, counting from the start of the supply of the paste to the first gap, a tip end (a tip end in a circumferential direction of the second roll) of the second-roll coating film reaches the "first angle position at which the first sensor detects the radial position on the coating film surface of the second-roll coating film." Further, until the second roll makes a predetermined number of rotations, counting from the start of the supply of the paste to the first gap, thermal expansion has not occurred in the first roll and the second roll, or even if thermal expansion occurs, an expansion amount is very small, which can be ignored.

Accordingly, L11 measured by the first sensor at the time of measuring the initial first radial position and the initial second radial position is a radial position on the coating film surface of the second-roll coating film (in other words, a second-roll radial distance from the preinitiation first radial position as the reference position) after the first gap changes along with the displacements of the first roll and the second roll due to the machining reaction force, but before the first roll and the second roll thermally expand (or at the time when an expansion amount is very small so the expansion amount can be ignored even if thermal expansion occurs).

Further, L21 measured by the second sensor in the first initial detection step is a radial position on the second-roll surface (in other words, a second-roll radial distance from the preinitiation second radial position as the reference position) after the first gap changes along with the displacements of the first roll and the second roll due to the machining reaction force, but before the first roll and the second roll thermally expand (or at the time when an expansion amount is very small so the expansion amount can be ignored even if thermal expansion occurs).

Further, in the manufacturing method, the end first radial position and the end second radial position are measured by the first sensor and the second sensor, at the time of the end of each detection period after the initial first radial position and the initial second radial position are measured.

More specifically, the first sensor measures, as a radial position on the coating film surface of the second-roll coating film, the end first radial position on the coating film surface (in other words, a second-roll radial distance from the preinitiation first radial position as the reference position) based on the preinitiation first radial position as a reference position (zero reference).

Further, the second sensor measures, as a radial position on the second-roll surface of the second roll, the end second radial position on the second-roll surface of the second roll (in other words, a second-roll radial distance from the preinitiation second radial position as the reference position) based on the preinitiation second radial position as a reference position (zero reference).

Note that, at the time of the end of each detection period after the initial first radial position and the initial second radial position are measured, it is considered that the first roll and the second roll thermally expand to no small extent. Accordingly, L12 measured by the first sensor in a first-period-end detection step is a radial position on the coating film surface of the second-roll coating film (in other words, a second-roll radial distance from the preinitiation first radial position as the reference position) after the first gap changes along with the displacements of the first roll and the second roll due to the machining reaction force, and after the first roll and the second roll thermally expand.

Further, L22 measured by the second sensor is a radial position on the second-roll surface (in other words, a second-roll radial distance from the preinitiation second radial position as the reference position) after the first gap changes along with the displacements of the first roll and the second roll due to the machining reaction force, and after the first roll and the second roll thermally expand. Further, in the above manufacturing method, $\Delta G1$, which is a variation amount of the first gap, caused due to the thermal expansion during each of the detection periods, is calculated by use of the relational expression of $\Delta G1=(L12-L22)-(L11-L21)$.

Note that the relational expression is derived as follows. First, a setting value of the gap dimension of the first gap (the gap dimension of the first gap before the manufacture is started) is assumed G1S. Further, a displacement amount of the first roll moved (displaced) in the first direction due to the machining reaction force is assumed $\Delta X1$. Further, an increasing amount of the radius of the first roll due to the thermal expansion is assumed $\Delta R1$. Further, a displacement amount of the second roll moved (displaced) in the first direction due to the machining reaction force is assumed $\Delta X2$. Further, a displacement amount of the second roll moved (displaced) in the second direction due to a machining reaction force caused between the second roll and the third roll is assumed $\Delta Y2$. Further, an increasing amount of the radius of the second roll due to the thermal expansion is assumed $\Delta R2$.

With such a setting, a gap dimension G1 of the first gap at the time when L11 and L21 are measured in the first initial detection step is expressed by $G1=G1S+\Delta X1+\Delta X2$ . . . (Expression 1).

Further, $L11=\Delta X2 \cos \theta 1 + \Delta Y2 \sin \theta 1$ . . . (Expression 2) is established.

Also, $L21=-\Delta X2 \cos \theta 1 - \Delta Y2 \sin \theta 1 - G1 = -\Delta X2 \cos \theta 1 - \Delta Y2 \sin \theta 1 - (G1S+\Delta X1+\Delta X2)$ . . . (Expression 3) is established.

Furthermore, a gap dimension G1 of the first gap at the time when L12 and L22 are measured in the first-period-end detection step is expressed by $G1=G1S+\Delta X1+\Delta X2-\Delta R1-\Delta R2$ . . . (Expression 4).

Further, $L12=\Delta X2 \cos \theta 1 + \Delta Y2 \sin \theta 1 - \Delta R2$ . . . (Expression 5) is established.

Also, $L22=-\Delta X2 \cos \theta 1 - \Delta Y2 \sin \theta 1 - \Delta R2 - G1 = -\Delta X2 \cos \theta 1 - \Delta Y2 \sin \theta 1 - \Delta R2 - (G1S+\Delta X1+\Delta X2-\Delta R1-\Delta R2)$ . . . (Expression 6) is established.

Note that, when the values of L11, L21, L12, L22 measured by the first sensor and the second sensor are on an inner side (a roll center side) relative to a reference position (the reference position is assumed 0) in terms of a second-roll radial direction, they are considered "positive values," and when they are on an outer side relative to the reference position in terms of the second-roll radial direction, they are considered "negative values."

Here, the first-gap target value G1T (a target value of the gap dimension of the first gap) is equal to the gap dimension G1 of the first gap at the time when L11 and L21 are measured in the first initial detection step, and therefore, $G1T=G1S+\Delta X1+\Delta X2=L11-L21+2(\Delta X2 \cos \theta 1 + \Delta Y2 \sin \theta 1)$ . . . (Expression 7) is established from (Expression 1), (Expression 2), and (Expression 3).

Further, a gap dimension G1N of the first gap at the time when the radius of the first roll is increased by $\Delta R1$ due to the thermal expansion and the radius of the second roll is increased by $\Delta R2$ due to the thermal expansion is equal to the gap dimension G1 of the first gap at the time when L12 and L22 are measured in the first-period-end detection step, and therefore, $G1N=G1S+\Delta X1+\Delta X2-\Delta R1-\Delta R2=L12-L22+2(\Delta X2 \cos \theta 1+\Delta Y2 \sin \theta 1)$ . . . (Expression 8) is established from (Expression 4), (Expression 5), and (Expression 6).

Further, $\Delta G1$, which is a variation amount of the first gap, caused due to the thermal expansion during each detection period, can be derived as $\Delta G1=G1N-G1T=(L12-L22)-(L11-L21)$ from (Expression 7) and (Expression 8). Accordingly, in the above manufacturing method, when the first roll is moved in the first-roll moving step so as to offset the variation amount $\Delta G1=(L12-L22)-(L11-L21)$, the gap dimension of the first gap can be adjusted (restored) to the first-gap target value.

Any of the above manufacturing methods of the paste-layer-attached sheet may be a manufacturing method of a paste-layer-attached sheet in which: the first sensor includes a first-side first sensor and a second-side first sensor, and the second sensor includes a first-side second sensor and a second-side second sensor, such that the first-side first sensor and the first-side second sensor are placed to be opposed to each other via a first end of the second roll and the second-side first sensor and the second-side second sensor are placed to be opposed to each other via a second end of the second roll; the first-roll moving mechanism includes a first-side first-roll moving mechanism configured to move a first end of the first roll in the first direction, and a second-side first-roll moving mechanism configured to move a second end of the first roll in the first direction; when the variation amount of the gap dimension of the first gap is detected, a variation amount of a gap dimension of a first end of the first gap is detected by use of the first-side first sensor and the first-side second sensor, and a variation amount of a gap dimension of a second end of the first gap is detected by use of the second-side first sensor and the second-side second sensor; and when the first roll is moved in the first direction, the first end of the first roll is moved by use of the first-side first-roll moving mechanism so as to offset the detected variation amount of the gap dimension of the first end of the first gap, and the second end of the first roll is moved by use of the second-side first-roll moving mechanism so as to offset the detected variation amount of the gap dimension of the second end of the first gap.

In the manufacturing method of the paste-layer-attached sheet, a pair of first sensors, a pair of second sensors, and a pair of first-roll moving mechanisms are each provided such that one of the pair is provided in the first end of the second roll and the other one of the pair is provided in the second end thereof, and the detection step and the first-roll moving step are performed on each of the first end of the second roll and the second end thereof. Thus, a variation of the thickness of the second-roll coating film, caused due to a variation of the first gap, can be eliminated every detection period over the second-roll axis direction. Thus, with the manufacturing method, the influence of the thermal expansion of the first roll and the second roll on a thickness and a density of the paste layer formed on the substrate sheet is restrained, thereby making it possible to manufacture a paste-layer-attached sheet in which variations of the paste layer are restrained in a width direction and a longitudinal direction of the substrate sheet.

Any of the above manufacturing methods of the paste-layer-attached sheet may be a manufacturing method of a paste-layer-attached sheet in which: the coating applicator includes: a third sensor configured to detect a third radial position on a layer surface of the paste layer transferred on the substrate sheet wound around the third roll, the third radial position being at a third angle position on the layer surface of the paste layer, the third angle position being advanced from the second gap by a third angle in the third-roll rotation direction over a third-roll surface of the third roll, the third angle being larger than 0° but smaller than 90°; a fourth sensor placed so as to be opposed to the third sensor across the third roll, the fourth sensor being configured to detect a fourth radial position on the third-roll surface of the third roll or a radially outer surface of the substrate sheet wound around the third roll, the fourth radial position being at a fourth angle position on the third-roll surface or the radially outer surface, the fourth angle position being returned by 180° in the third-roll rotation direction from the third angle position; and a third-roll moving mechanism configured to move the third roll in a second direction connecting the second roll to the third roll. The manufacturing method of the paste-layer-attached sheet may include: detecting, every detection period, a variation amount of a gap dimension of the second gap from the third radial position detected by the third sensor and the fourth radial position detected by the fourth sensor, the variation amount being caused during the detection period due to thermal expansion caused in the second roll and the third roll; moving the third roll in the second direction by use of the third-roll moving mechanism so as to offset the detected variation amount of the second gap; and starting the new detection period after the movement of the first roll by the first-roll moving mechanism is finished and the movement of the third roll by the third-roll moving mechanism is finished, and then, a second-roll ¼-rotation time during which the second roll makes a quarter turn elapses and further a third-roll rotation time during which the third roll rotates by the third angle elapses after the previous detection period is finished.

The above manufacturing method of the paste-layer-attached sheet uses the coating applicator in which the first roll and the third roll are placed around the second roll, as described above. Accordingly, in the coating applicator, even if the third roll is moved in the second direction in order to adjust the gap dimension of the second gap, this hardly affects the gap dimension of the first gap. Accordingly, the third roll can be moved to offset a variation of the gap dimension of the second gap due to the thermal expansion of the second roll and the third roll and to maintain a dimension of the second gap appropriately without considering the influence on the first gap. In view of this, by use of the third sensor and the fourth sensor placed as mentioned earlier, a variation amount of the second gap, caused due to the thermal expansion of the second roll and the third roll is detected every detection period, and the third roll is moved in the second direction by use of the third-roll moving mechanism so as to offset the detected variation amount of the second gap. Thus, a variation of a thickness of the paste layer transferred onto the substrate sheet, the variation being caused due to a variation of the second gap, is eliminated every detection period, thereby making it possible to prevent accumulation of variations in the second gap. Thus, with the manufacturing method, the influence of the thermal expansion of the second roll and the third roll on a thickness and a density of the paste layer formed on the substrate sheet is restrained, thereby making it possible to manufacture a paste-layer-attached sheet in which variations of the paste layer are further restrained in the longitudinal direction.

Note that the detection period is started after the movements of the first and third rolls by the first-roll and third-roll moving mechanisms are finished, and then, the second-roll ¼-rotation time longer than the second-roll rotation time elapses and the third-roll rotation time further elapses after a previous detection period is finished. On this account, a next detection period is started after a timing in which the first gap and the second gap are set to new dimensions by the movements of the first and third rolls, the second-roll coating film formed through the first gap with such a new dimension reaches the second gap, and further, the paste layer from the second gap can be detected by the third sensor. Thus, outputs of the first sensor and the third sensor can be used from the beginning of the detection period.

Further, a radial position on the third-roll surface, the radially outer surface of the substrate sheet wound around the third roll, or the layer surface of the paste layer indicates a position in the third-roll radial direction on the basis of a third-roll central axis. The third sensor and the fourth sensor are displacement sensors configured to detect respective radial positions on the layer surface of the paste layer and on the third-roll surface or the radially outer surface of the substrate sheet wound around the third roll, and an electrostatic-capacitance displacement meter, an optical displacement meter, or a laser displacement meter that can detect the radial position on the layer surface of the paste layer, or on the third-roll surface or the radially outer surface of the substrate sheet can be used, for example. Further, these sensors may detect the radial positions on the layer surface of the paste layer and on the third-roll surface or the radially outer surface of the substrate sheet, on the basis of a radial position on the radially outer surface of the substrate sheet or the third-roll surface in a state where no thermal expansion is caused in the rolls (before manufacture of the paste-layer-attached sheet) before the paste is supplied to the first gap (in a state where the paste is not applied to the second-roll surface and the paste layer is not formed) though the substrate sheet is wound around the third roll, for example.

The third angle position at which the third sensor detects the third radial position on the layer surface of the paste layer is a position advanced from the second gap by the third angle θ3 in a third-roll rotation direction over the third-roll surface, and is selected from a range of θ3=0° to 90°. Preferably, the third angle θ3 may be selected from a range of θ3=25° to 65°, further a range of θ3=25° to 50°. This is because the third sensor is easily placed between the second roll and the third roll without interfering with them. Further, as described above, the fourth sensor detects the fourth radial position on the third-roll surface or the radially outer surface of the substrate sheet at the fourth angle position returned from the third angle position by 180° in the third-roll rotation direction on the third-roll surface or the radially outer surface of the substrate sheet, that is, at the fourth angle position just opposite to the third angle position across the third-roll central axis.

On this account, the thickness of the paste layer formed on the substrate sheet can be detected from the third radial position on the layer surface of the paste layer, detected from an output of the third sensor, for example. In addition to this, a variation amount of the thickness of the paste layer, caused during a detection period, eventually, the variation amount of the gap dimension of the second gap can be detected from changes of the outputs of the third sensor and the fourth sensor during the detection period.

An example is further described, more specifically. A variation amount of the radius R2 of the second roll, caused during a given detection period, is assumed $\Delta R2$, a variation amount of the radius R3 of the third roll, caused during the detection period, is assumed $\Delta R3$, a variation amount of the second gap KG2, caused during the detection period, is assumed $\Delta G2$, a variation amount of the third radial position PR6s on the layer surface of the paste layer, the variation amount being caused during the detection period and detected by the third sensor, is assumed $\Delta PR6s$, and a variation amount of the fourth radial position $PR13s$ or $PR2s$ on the third-roll surface or the radially outer surface of the substrate sheet, the variation amount being caused during the detection period and detected by the fourth sensor, is assumed $\Delta PR13s$ or $\Delta PR2s$.

Here, it is found that the thickness of the substrate sheet is uniform in the longitudinal direction, and a total thickness of the substrate sheet and the paste layer formed on the radially outer surface thereof is equal to the gap dimension of the second gap at a time point of forming the paste layer. Further, from this, a variation amount of the total thickness of the substrate sheet and the paste layer, caused during a given detection period (from start to end of the detection period) is equal to the variation amount of the gap dimension of the second gap during the detection period.

When the radius R3 of the third roll expands only by the variation amount $\Delta R3$ due to thermal expansion during the detection period, the fourth radial position $PR13s$ on the third-roll surface, detected by the fourth sensor, or the fourth radial position $PR2s$ on the radially outer surface of the substrate sheet wound around the third roll moves radially outwardly. More specifically, the fourth radial position $PR13s$ or the fourth radial position $PR2s$ is changed only by a variation amount $\Delta PR13s = \Delta R3$ (or $\Delta PR2s = \Delta R3$). Accordingly, the fourth sensor can detect the variation amount $\Delta R3$ of the radius R3 due to the thermal expansion of the third roll. In the meantime, the third sensor detects the third radial position $PR6s$ on the layer surface of the paste layer. The third radial position $PR6s$ on the layer surface of the paste layer is a position obtained by adding the gap dimension G2 of the second gap to the radius R3 of the third roll. This also corresponds to a radial position on the second-roll surface of the second roll in the second gap. Accordingly, when the radius R2 of the second roll increases only by the variation amount $\Delta R2$ due to thermal expansion, the third radial position $PR6s$ on the layer surface of the paste layer, detected by the third sensor, is decreased (moved toward a center side) by just that much. That is, the variation amount $\Delta PR6s$ of the third radial position $PR6s$ to be detected by the third sensor is equal to an inverse number of the variation amount $\Delta R2$ of the radius R2 due to the thermal expansion of the second roll, caused during the detection period ($\Delta PR6s = -\Delta R2$). When movements of the second-roll central axis and the third-roll central axis during the detection period are ignored, the gap dimension G2 of the second gap is decreased only by an amount corresponding to the thermal expansion caused in the second roll and the third roll during the detection period. That is, the variation amount $\Delta G2$ of the gap dimension G2 corresponds to an inverse number of a sum of the variation amounts $\Delta R2$, $\Delta R3$ of the radii R2, R3, caused in the second roll and the third roll ($\Delta G2 = -(\Delta R2 + \Delta R3)$). Accordingly, the variation amount $\Delta G2$ of the gap dimension G2 can be detected from the variation amount $\Delta PR6s$ detected by the third sensor and the variation amount $\Delta PR13s$ detected by the fourth sensor.

Note that, as described above, the variation amount $\Delta PR6s$ of the third radial position $PR6s$ to be detected by the third sensor is equal to the inverse number of the variation amount $\Delta R2$ of the radius R2 due to the thermal expansion of the second roll, caused during the detection period ($\Delta PR6s = -\Delta R2$). In the meantime, as described above, the variation amount $\Delta PR12s$ of the second radial position $PR12s$ on the second-roll surface to be detected by the second sensor is equal to the variation amount $\Delta R2$ of the radius R2 due to the thermal expansion of the second roll.

From this point, the variation amount $\Delta R2$ of the radius R2 may be obtained such that variation amounts $\Delta R2$ of the radius R2, obtained from the outputs of the second sensor and the third sensor, are compared to each other or averaged.

Further, the above manufacturing method of the paste-layer-attached sheet may be a manufacturing method of a paste-layer-attached sheet in which: when the variation amount of the gap dimension of the second gap is detected, the variation amount of the second gap, caused during the detection period due to the thermal expansion of the second roll and the third roll, is acquired from a difference between a variation amount of the third radial position on the layer surface of the paste layer, the variation amount being caused during the detection period and detected by the third sensor, and a variation amount of the fourth radial position on the third-roll surface or the radially outer surface, the variation amount being caused during the detection period and detected by the fourth sensor.

In the manufacturing method of the paste-layer-attached sheet, in the detection step, the variation amount $\Delta G2$ of the gap dimension G2 of the second gap, caused during the detection period, is acquired from a difference between the variation amount $\Delta PR6s$ of the third radial position $PR6s$ on the layer surface of the paste layer and the variation amount $\Delta PR13s$ or $\Delta PR2s$ of the fourth radial position $PR13s$ or $PR2s$ on the third-roll surface or the radially outer surface of the substrate sheet, the variation amounts being caused during the detection period. Accordingly, the variation amount $\Delta G2$ of the gap dimension G2 of the second gap KG2 can be acquired easily. That is, $\Delta G2 = -(\Delta R2 + \Delta R3) = \Delta PR6s - \Delta PR13s$ (or $= \Delta PR6s - \Delta PR2s$) is established, and therefore, the variation amount $\Delta G2$ of the gap dimension G2 can be easily acquired from the difference between the variation amount $\Delta PR6s$ and the variation amount $\Delta PR13s$ or $\Delta PR2s$.

Further, in the above manufacturing method of the paste-layer-attached sheet, the third sensor may be a sensor configured to measure the third radial position on the layer surface of the paste layer based on a preinitiation third radial position on the third-roll surface at the third angle position as a reference position, the preinitiation third radial position being measured by the third sensor before the supply of the paste to the first gap is started; the fourth sensor may be a sensor configured to measure the fourth radial position on the radially outer surface of the substrate sheet or the third-roll surface based on a preinitiation fourth radial position on the third-roll surface at the fourth angle position as a reference position, the preinitiation fourth radial position being measured by the fourth sensor before the supply of the paste to the first gap is started. The manufacturing method may include: measuring, by the third sensor, an initial third radial position on the layer surface of the paste layer based on the preinitiation third radial position as the reference position after the third roll rotates by the third angle or more, but before the third roll makes a second predetermined number of rotations, counting from a time when the second-roll coating film first reaches the second gap at a time of starting the first detection period among the detection periods provided repeatedly; measuring, by the fourth sensor, an initial fourth radial position on the radially outer surface of the substrate sheet or the third-roll surface based on the preinitiation fourth radial position as the reference position; measuring, by the third sensor, an end third radial position on the layer surface of the paste layer based on the preinitiation third radial position as the reference position at an end of each of the detection periods after the initial third radial position and the initial fourth radial position are measured; measuring, by the fourth sensor, an end fourth radial position on the radially outer surface of the substrate sheet or the third-roll surface based on the preinitiation fourth radial position as the reference position; and calculating a value of $\Delta G2$, which is a variation amount of the second gap and caused due to the thermal expansion during the each of the detection periods, by use of a relational expression of $\Delta G2=(L42-L32)-(L41-L31)$, where L31 indicates a value of the initial third radial position, L41 indicates a value of the initial fourth radial position, L32 indicates a value of the end third radial position, and L42 indicates a value of the end fourth radial position.

When the second-roll coating film reaches the second gap and machining of compressing a coating film between the second roll and the third roll so as to form the paste layer is started, its machining reaction force is applied to the second roll and the third roll. Right after the machining starts, a large machining reaction force is suddenly applied to the second roll and the third roll. Accordingly, the second roll and the third roll might move in the second direction due to the machining reaction force, so that the second gap between the second roll and the third roll might increase (a rotating shaft of the second roll might be displaced in a direction distanced from the third roll, and a rotating shaft of the third roll might be displaced in a direction distanced from the second roll). Particularly, in a case where an application material made of wet granulated bodies having a high solid fraction (with a small solvent amount) is used as the paste, the machining reaction force is large, which easily causes the displacements of the second roll and the third roll. This results in that the gap dimension of the second gap between the second roll and the third roll changes.

Further, soon after the start of the machining of compressing and forming the paste layer between the second roll and the third roll, the second roll and the third roll thermally expand due to frictional heat generated near the second gap. Particularly, in a case where an application material made of wet granulated bodies having a high solid fraction (with a small solvent amount) is used as the paste, a generation amount of frictional heat is large, which easily causes thermal expansion of the second roll and the third roll. This thermal expansion also changes the gap dimension of the second gap between the second roll and the third roll.

In the meantime, most of the displacements of the second roll and the third roll due to the machining reaction force occur right after the start of the machining (e.g., until the third roll rotates once from the start of the machining), but the displacements do not occur about the time when thermal expansion of the second roll and the third roll occurs after that (e.g., at the time when the number of rotations of the third roll exceeds 30 from the start of the machining) (even if the displacements occur, they can be ignored). Accordingly, it can be considered that, after the gap dimension of the second gap changes along with the displacements of the second roll and the third roll due to the machining reaction force, the gap dimension of the second gap changes along with the thermal expansion of the second roll and the third roll.

In view of this, in the above manufacturing method, a gap dimension of the second gap after the second gap changes along with the displacements of the second roll and the third roll due to the machining reaction force (before the second roll and the third roll thermally expand) is assumed a target gap dimension (a second-gap target value) of the second gap, and a variation amount of the gap dimension of the second gap, the variation amount being changed from the second-gap target value due to the thermal expansion of the second roll and the third roll during the detection period, is calculated as a variation amount $\Delta G2$. Then, the third roll is moved in a third-roll moving step so as to offset the variation amount $\Delta G2$, so that the gap dimension of the second gap is adjusted (restored) to the second-gap target value.

That is, in the above manufacturing method, a gap dimension of the second gap after the second gap changes along with the displacements of the second roll and the third roll due to the machining reaction force (before the second roll and the third roll thermally expand) is assumed a target gap dimension (the second-gap target value) of the second gap, and a feedback control is performed so that the gap dimension of the second gap reaches the second-gap target value during a manufacture period. With such a configuration, a thickness of the paste-layer-attached sheet to be formed through between the second roll and the third roll can be adjusted to the second-gap target value or a dimension close to this over the entire manufacture period. Accordingly, the thickness of the paste layer can be adjusted to a dimension obtained by subtracting the thickness of the substrate sheet from the second-gap target value or a dimension close to this over the entire manufacture period.

More specifically, in the manufacturing method, the initial third radial position and the initial fourth radial position are measured by the third sensor and the fourth sensor, after the third roll rotates by the third angle $\theta 3$ or more, but before the third roll makes a predetermined number of rotations, counting from a time when the second-roll coating film first reaches the second gap.

More specifically, the third sensor measures, as a radial position on the layer surface of the paste layer, the third radial position on the layer surface of the paste layer (in other words, a third-roll radial distance on the layer surface from the preinitiation third radial position as the reference position) based on the "preinitiation third radial position as a radial position on the third-roll surface at the third angle position, measured by the third sensor before the supply of the paste to the first gap is started" being taken as the reference position (zero reference).

Further, the fourth sensor detects, as a radial position on the radially outer surface of the substrate sheet or the third-roll surface, the fourth radial position on the radially outer surface of the substrate sheet or the third-roll surface (in other words, a third-roll radial distance on the radially outer surface or the third-roll surface from the preinitiation fourth radial position as the reference position) based on the "preinitiation fourth radial position as a radial position on the third-roll surface at the fourth angle position, measured by the fourth sensor before the supply of the paste to the first gap is started" being taken as the reference position (zero reference).

Note that, at the time when the third roll rotates by the third angle $\theta 3$ or more, counting from a time when the second-roll coating film reaches the second gap for the first time, a tip end (a tip end in a circumferential direction of the third roll) of the paste layer reaches the "third angle position at which the third sensor detects the third radial position on the layer surface of the paste layer." Further, until the third roll makes a predetermined number of rotations, counting from the time when the second-roll coating film reaches the second gap for the first time, thermal expansion has not occurred in the second roll and the third roll, or even if thermal expansion occurs, an expansion amount is very small, which can be ignored.

Accordingly, L31 measured by the third sensor is a radial position on the layer surface of the paste layer (in other words, a third-roll radial distance on the layer surface from the preinitiation third radial position as the reference position) after the second gap changes along with the displacements of the second roll and the third roll due to the machining reaction force, but before the second roll and the third roll thermally expand (or at the time when an expansion amount is very small so the expansion amount can be ignored even if thermal expansion occurs).

Further, L41 measured by the fourth sensor in the second initial detection step is a radial position on the radially outer surface of the substrate sheet or the third-roll surface (in other words, a third-roll radial distance on the radially outer surface or the third-roll surface from the preinitiation fourth radial position as the reference position) after the second gap changes along with the displacements of the second roll and the third roll due to the machining reaction force, but before the second roll and the third roll thermally expand (or at the time when an expansion amount is very small so the expansion amount can be ignored even if thermal expansion occurs).

Further, in the above manufacturing method, the end third radial position and the end fourth radial position are measured by the third sensor and the fourth sensor, at the end of each detection period after the initial third radial position and the initial fourth radial position are measured.

More specifically, the third sensor measures, as a radial position on the layer surface of the paste layer, the end third radial position on the layer surface of the paste layer (in other words, a third-roll radial distance on the layer surface from the preinitiation third radial position as the reference position) based on the preinitiation third radial position as the reference position (zero reference).

Further, the fourth sensor measures, as a radial position on the radially outer surface of the substrate sheet or the third-roll surface, the fourth radial position on the radially outer surface of the substrate sheet or the third-roll surface (in other words, a third-roll radial distance on the radially outer surface or the third-roll surface from the preinitiation fourth radial position as the reference position) based on the preinitiation fourth radial position as the reference position (zero reference).

Note that, at the end of each detection period, it is considered that the second roll and the third roll thermally expand to no small extent. Accordingly, L32 measured by the third sensor in a second-period-end detection step is a radial position on the layer surface of the paste layer (in other words, a third-roll radial distance on the layer surface from the preinitiation third radial position as the reference position) after the second gap changes along with the displacements of the second roll and the third roll due to the machining reaction force, and after the second roll and the third roll thermally expand.

Further, L42 measured by the fourth sensor in the second-period-end detection step is a radial position on the radially outer surface of the substrate sheet or the third-roll surface (in other words, a third-roll radial distance on the radially outer surface or the third-roll surface from the preinitiation fourth radial position as the reference position) after the second gap changes along with the displacements of the second roll and the third roll due to the machining reaction force, and after the second roll and the third roll thermally expand.

Further, in the above manufacturing method, $\Delta G2$, which is a variation amount of the second gap and caused due to the thermal expansion during each of the detection periods, is calculated by use of the relational expression of $\Delta G2=(L42-L32)-(L41-L31)$.

Here, how to derive the relational expression is described. Note that the following describes a case where the fourth sensor detects the fourth radial position on the radially outer surface of the substrate sheet. Note that the relational expression can be also derived in the same manner in a case where the fourth sensor detects the fourth radial position on the third-roll surface.

First, a setting value of the gap dimension of the second gap (the gap dimension of the second gap before the manufacture is started) is assumed G2S. Further, a displacement amount of the third roll moved (displaced) in the second direction due to the machining reaction force is assumed $\Delta Y3$. Further, an increasing amount of the radius of the third roll due to the thermal expansion is assumed $\Delta R3$. Further, a displacement amount of the second roll moved (displaced) in the first direction due to a machining reaction force caused between the first roll and the second roll is assumed $\Delta X2$. Further, a displacement amount of the second roll moved (displaced) in the second direction due to a machining reaction force caused between the second roll and the third roll is assumed $\Delta Y2$. Further, an increasing amount of the radius of the second roll due to the thermal expansion is assumed $\Delta R2$. Further, a thickness of the substrate sheet is assumed TH.

In such a setting, a gap dimension G2 of the second gap at the time when L31 and L41 are measured in the second initial detection step is expressed by $G2=G2S+\Delta Y2+\Delta Y3-TH$ ... (Expression 11).

Further, $L31=\Delta Y3 \cos\theta3-TH-G2=\Delta Y3 \cos\theta3-TH-(G2S+\Delta Y2+\Delta Y3-TH)$ ... (Expression 12) is established. Further, $L41=-\Delta Y3 \cos\theta3-TH$ ... (Expression 13) is established. Further, a gap dimension G2 of the second gap at the time when L32 and L42 are measured in the second-period-end detection step is expressed by $G2=G2S+\Delta Y2+\Delta Y3-TH-\Delta R2-\Delta R3$ ... (Expression 14).

Further, $L32=\Delta Y3 \cos\theta3-TH-\Delta R3-G2=\Delta Y3 \cos\theta3-TH-\Delta R3-(G2S+\Delta Y2+\Delta Y3-TH-\Delta R2-\Delta R3)$ ... (Expression 15) is established. Further, $L42=-\Delta Y3 \cos\theta3-TH-\Delta R3$ ... (Expression 16) is established. Note that, when the values of L31, L41, L32, L42 measured by the second sensor and the third sensor are on an inner side (a roll center side) relative to a reference position (the reference position is assumed 0) in terms of the third-roll radial direction, they are considered "positive values," and when they are on an outer side relative to the reference position in terms of the third-roll radial direction, they are considered "negative values."

Here, the second-gap target value G2T (a target value of the gap dimension of the second gap) is equal to the gap dimension G2 of the second gap at the time when L31 and L41 are measured in the second initial detection step, and therefore, $G2T=G2S+\Delta Y2+\Delta Y3-TH=L41-L31+2\Delta Y3 \cos\theta3$ ... (Expression 17) is established from (Expression 11), (Expression 12), and (Expression 13).

Further, a gap dimension G2N of the second gap at the time when the radius of the second roll is increased by $\Delta R2$ due to the thermal expansion and the radius of the third roll is increased by $\Delta R3$ due to the thermal expansion is equal to the gap dimension G2 of the second gap at the time when L32 and L42 are measured in the second-period-end detection step, and therefore, $G2N=G2S+\Delta Y2+\Delta Y3-TH-\Delta R2-\Delta R3=L42-L32+2\Delta Y3 \cos\theta3$ ... (Expression 18) is established from (Expression 14), (Expression 15), and (Expression 16).

Further, $\Delta G2$, which is a variation amount of the second gap and caused due to the thermal expansion during each of the detection periods, can be derived as $\Delta G2=G2N-G2T=(L42-L32)-(L41-L31)$ from (Expression 17) and (Expression 18). Accordingly, in the above manufacturing method, when the third roll is moved in the third-roll moving step so as to offset the variation amount $\Delta G2=(L42-L32)-(L41-L31)$, the gap dimension of the second gap can be adjusted (restored) to the second-gap target value.

Further, in any of the manufacturing methods of the paste-layer-attached sheet, the third sensor may include a first-side third sensor and a second-side third sensor, and the fourth sensor may include a first-side fourth sensor and a second-side fourth sensor, such that the first-side third sensor and the first-side fourth sensor are placed to be opposed to each other via a first end of the third roll and the second-side third sensor and the second-side fourth sensor are placed to be opposed to each other via a second end of the third roll; and the third-roll moving mechanism may include a first-side third-roll moving mechanism configured to move the first end of the third roll in the second direction, and a second-side third-roll moving mechanism configured to move the second end of the third roll in the second direction. When the variation amount of the gap dimension of the second gap is detected, a variation amount of a gap dimension of a first end of the second gap may be detected by use of the first-side third sensor and the first-side fourth sensor, and a variation amount of a gap dimension of a second end of the second gap may be detected by use of the second-side third sensor and the second-side fourth sensor; and when the third roll is moved in the second direction, the first end of the third roll may be moved by the first-side third-roll moving mechanism so as to offset the detected variation amount of the gap dimension of the first end of the second gap, and the second end of the third roll may be moved by the second-side third-roll moving mechanism so as to offset the detected variation amount of the gap dimension of the second end of the second gap.

In the manufacturing method of the paste-layer-attached sheet, a pair of third sensors, a pair of fourth sensors, and a pair of third-roll moving mechanisms are each provided such that one of the pair is provided in the first end of the third roll and the other one of the pair is provided in the second end thereof, and the detection step and the third-roll moving step are performed on each of the first end of the third roll and the second end thereof. Thus, a variation of a thickness of the paste layer on the substrate sheet, caused due to a variation of the second gap, can be eliminated every detection period over the second-roll axis direction. Thus, with the manufacturing method, the influence of the thermal expansion of the second roll and the third roll on the thickness and the density of the paste layer formed on the substrate sheet is restrained, thereby making it possible to manufacture a paste-layer-attached sheet in which variations of the thickness of the paste layer are restrained in the width direction and the longitudinal direction of the substrate sheet.

Another means for solving the problem is a coating applicator for providing a belt-shaped paste layer made of a paste on a belt-shaped substrate sheet, and the coating applicator includes: a first roll; a second roll placed in parallel with the first roll via a first gap and configured to rotate in a second-roll rotation direction reverse to the first roll; a third roll placed in parallel with the second roll via a second gap and configured to rotate in a reverse direction to the second roll so as to convey the substrate sheet passing through the second gap, the first roll, the second roll, and the third roll being placed such that a first virtual surface connecting a second-roll central axis of the second roll to a first-roll central axis of the first roll and a second virtual surface connecting the second-roll central axis of the second roll to a third-roll central axis of the third roll intersect with each other at right angles at the second-roll central axis and the second gap is formed in a part advanced by a quarter turn from the first gap in the second-roll rotation direction over a second-roll surface of the second roll; a first sensor configured to detect a first radial position on a coating film surface of a second-roll coating film made of the paste applied to the second-roll surface, the first radial position being at a first angle position on the coating film surface of the second-roll coating film, the first angle position being advanced by a first angle from the first gap in the second-roll rotation direction over the second-roll surface, the first angle being larger than 0° but smaller than 90°; a second sensor placed to be opposed to the first sensor across the second roll and configured to detect a second radial position on the second-roll surface of the second roll, the second radial position being at a second angle position on the second-roll surface, the second angle position being advanced from the first angle position by 180° in the second-roll rotation direction; a first-roll moving mechanism configured to move the first roll in a first direction connecting the second roll to the first roll; a first-gap variation detection portion configured to detect, every detection period, a variation amount of a gap dimension of the first gap to be caused during the detection period due to thermal expansion caused in the first roll and the second roll, by use of the first radial position on the coating film surface of the second-roll coating film, detected by the first sensor, and the second radial position on the second-roll surface, detected by the second sensor, the detection period being provided repeatedly, the thermal expansion being caused along with continuous formation of the paste layer on the substrate sheet such that the paste is supplied to the first gap and the second-roll coating film applied to the second-roll surface is passed through the second gap so as to be transferred onto the substrate sheet conveyed by the third roll; a first-roll movement instruction portion configured to instruct the first-roll moving mechanism to move the first roll in the first direction so as to offset the variation amount of the first gap, detected by the first-gap variation detection portion; and an adjustment portion configured to start a new detection period after the movement of the first roll by the first-roll moving mechanism is finished, and then, a second-roll rotation time during which the second roll rotates by the first angle elapses after a previous detection period is finished.

In the above coating applicator, the first roll and the third roll are placed at right angles to each other around the second roll. On this account, even if the first roll is moved in the first direction in order to adjust the gap dimension of the first gap, this hardly affects a gap dimension of the second gap placed in the second direction perpendicular to this. Hereby, it is possible to move the first roll without considering the influence on the second gap. Note that it is found that a thickness of the second-roll coating film is equal to a dimension of the first gap at a time point of forming the second-roll coating film. In this coating applicator, the first-gap variation detection portion detects, every detection period, a variation amount of the gap dimension of the first gap during the detection period by use of the radial positions on the coating film surface of the second-roll coating film and on the second-roll surface, detected by the first, second sensors. Further, the first-roll movement instruction portion instructs the first-roll moving mechanism to move the first roll in the first direction so as to offset the detected variation amount of the first gap. Thus, a variation of the thickness of the second-roll coating film, caused due to a variation of the first gap, is eliminated every detection period, thereby making it possible to prevent accumulation of variations in the first gap. Thus, with the use of the coating applicator, it is possible to restrain variations of the thickness of the second-roll coating film due to the thermal expansion of the first roll and the second roll, thereby eventually making it possible to apply, onto the substrate sheet, the paste layer in which variations of a thickness and a density are restrained in terms of a longitudinal direction of the substrate sheet.

Note that the adjustment portion starts the new detection period after the movement of the first roll by the first-roll moving mechanism is finished, and then, the second-roll θ1-rotation time during which the second roll rotates by the first angle θ1 elapses after the previous detection period is finished. Hereby, a next detection period is started after a timing when the first gap is set to a new dimension by the movement of the first roll and the second-roll coating film formed by the first gap with such a new gap dimension can be detected by the first sensor, so that an output of the first sensor can be used from the beginning of the detection period.

The above coating applicator may be a coating applicator in which the first-gap variation detection portion acquires the variation amount of the first gap, caused during the detection period due to the thermal expansion of the first roll and the second roll, from a difference between a variation amount of the first radial position on the coating film surface of the second-roll coating film, the variation amount being caused during the detection period and detected by the first sensor, and a variation amount of the second radial position on the second-roll surface of the second roll, the variation amount being caused during the detection period and detected by the second sensor.

In this coating applicator, the first-gap variation detection portion acquires the variation amount of the gap dimension of the first gap, caused during the detection period, from the difference between the variation amount of the first radial position on the coating film surface of the second-roll coating film and the variation amount of the second radial position on the second-roll coating film of the second roll, the variation amounts being caused during the detection period. Accordingly, the variation amount of the gap dimension of the first gap can be acquired easily.

Further, the coating applicator may be a coating applicator in which: the first sensor is a sensor configured to detect the first radial position on the coating film surface based on a preinitiation first radial position on the second-roll surface at the first angle position as a reference position, the preinitiation first radial position being measured by the first sensor before the supply of the paste to the first gap is started; the second sensor is a sensor configured to detect the second radial position on the second-roll surface based on a preinitiation second radial position on the second-roll surface at the second angle position as a reference position, the preinitiation second radial position being measured by the second sensor before the supply of the paste to the first gap is started; the first-gap variation detection portion causes the first sensor to measure an initial first radial position on the coating film surface based on the preinitiation first radial position as the reference position and causes the second sensor to measure an initial second radial position on the second-roll surface based on the preinitiation second radial position as the reference position, so as to acquire a value of the measured initial first radial position on the coating film surface and a value of the measured initial second radial position on the second-roll surface, after the second roll rotates by the first angle or more, but before the second roll makes a first predetermined number of rotations, counting from the start of the supply of the paste to the first gap at a time of starting a first detection period among the detection periods provided repeatedly; after that, the first-gap variation detection portion causes the first sensor to measure an end first radial position on the coating film surface based on the preinitiation first radial position as the reference position and causes the second sensor to measure an end second radial position on the second-roll surface based on the preinitiation second radial position as the reference position, at an end of each of the detection periods, so as to acquire a value of the measured end first radial position on the coating film surface and a value of the measured end second radial position on the second-roll surface; and the first-gap variation detection portion calculates a value of $\Delta G1$, which is a variation amount of the first gap, caused due to the thermal expansion during the each of the detection periods, by use of a relational expression of $\Delta G1=(L12-L22)-(L11-L21)$, where $L11$ indicates a value of the initial first radial position, $L21$ indicates a value of the initial second radial position, $L12$ indicates a value of the end first radial position, and $L22$ indicates a value of the end second radial position.

In the above coating applicator, the first-gap variation detection portion acquires a value of the initial first radial position $L11$ on the coating film surface, measured by the first sensor, and a value of the initial second radial position $L21$ on the second-roll surface, measured by the second sensor. Further, the first-gap variation detection portion acquires a value of the end first radial position $L12$ on the coating film surface, measured by the first sensor, and a value of the send second radial position $L22$ on the second-roll surface, measured by the second sensor. Further, the first-gap variation detection portion calculates a value of $\Delta G1$, which is a variation amount of the first gap and caused due to the thermal expansion during each of the detection periods, by use of the relational expression of $\Delta G1=(L12-L22)-(L11-L21)$. Note that how to derive this relational expression is just what is described in the above manufacturing method.

Accordingly, similarly to the above manufacturing method, in the above coating applicator, when the first roll is moved by the first-roll moving mechanism so as to offset the variation amount $\Delta G1=(L12-L22)-(L11-L21)$, the gap dimension of the first gap can be adjusted (restored) to the first-gap target value. Hereby, a thickness of a coating film to be formed through between the first roll and the second roll can be adjusted to the first-gap target value or a dimension close to this over an entire manufacture period.

Any of the above coating applicators may be a coating applicator in which: the first sensor includes a first-side first sensor and a second-side first sensor, and the second sensor includes a first-side second sensor and a second-side second sensor, such that the first-side first sensor and the first-side second sensor are placed to be opposed to each other via a first end of the second roll and the second-side first sensor and the second-side second sensor are placed to be opposed to each other via a second end of the second roll; the first-roll moving mechanism includes a first-side first-roll moving mechanism configured to move a first end of the first roll in the first direction, and a second-side first-roll moving mechanism configured to move a second end of the first roll in the first direction; the first-gap variation detection portion detects a variation amount of a gap dimension of a first end of the first gap by use of the first-side first sensor and the first-side second sensor, and detects a variation amount of a gap dimension of a second end of the first gap by use of the second-side first sensor and the second-side second sensor;

and the first-roll movement instruction portion instructs the first-side first-roll moving mechanism to move the first end of the first roll so as to offset the detected variation amount of the gap dimension of the first end of the first gap, and instructs the second-side first-roll moving mechanism to move the second end of the first roll so as to offset the detected variation amount of the gap dimension of the second end of the first gap.

In the coating applicator, a pair of first sensors, a pair of second sensors, and a pair of first-roll moving mechanisms are each provided such that one of the pair is provided in the first end of the second roll and the other one of the pair is provided in the second end thereof, the first-gap variation detection portion detects variation amounts of respective gap dimensions of the first end and the second end of the first gap, and the first-roll movement instruction portion instructs the pair of first-roll moving mechanisms to move the first end and the second end of the first roll, respectively. Thus, a variation of the thickness of the second-roll coating film, caused due to a variation of the first gap, can be eliminated every detection period over a second-roll axis direction. Thus, with the use of the coating applicator, it is possible to restrain influence of the thermal expansion of the first roll and the second roll on the thickness of the second-roll coating film, thereby making it possible to apply, onto the substrate sheet, the paste layer in which variations of a thickness and a density are restrained in terms of a width direction and a longitudinal direction of the substrate sheet.

Any of the coating applicators may be a coating applicator further including: a third sensor configured to detect a third radial position on a layer surface of the paste layer transferred on the substrate sheet wound around the third roll, the third radial position being at a third angle position on the layer surface of the paste layer, the third angle position being advanced from the second gap by a third angle in the third-roll rotation direction over a third-roll surface of the third roll, the third angle being larger than 0° but smaller than 90°; a fourth sensor placed so as to be opposed to the third sensor across the third roll, the fourth sensor being configured to detect a fourth radial position on the third-roll surface of the third roll or a radially outer surface of the substrate sheet wound around the third roll, the fourth radial position being at a fourth angle position on the third-roll surface or the radially outer surface, the fourth angle position being returned by 180° in the third-roll rotation direction from the third angle position; and a third-roll moving mechanism configured to move the third roll in a second direction connecting the second roll to the third roll; a second-gap variation detection portion configured to detect, every detection period, a variation amount of a gap dimension of the second gap to be caused during the detection period due to thermal expansion caused in the second roll and the third roll, by use of the third radial position detected by the third sensor and the fourth radial position detected by the fourth sensor; and a third-roll movement instruction portion configured to instruct the third-roll moving mechanism to move the third roll in the second direction so as to offset the variation amount of the second gap, detected by the second-gap variation detection portion, wherein the adjustment portion starts the new detection period after the movement of the first roll by the first-roll moving mechanism is finished and the movement of the third roll by the third-roll moving mechanism is finished, and then, a second-roll ¼-rotation time elapses and further a third-roll rotation time during which the third roll rotates by the third angle elapses after the previous detection period is finished.

In the above coating applicator, the first roll and the third roll are placed around the second roll as described earlier. On this account, even if the third roll is moved in the second direction in order to adjust the gap dimension of the second gap, this hardly affects the gap dimension of the first gap placed in the first direction perpendicular to this. Hereby, it is possible to move the third roll without considering the influence on the first gap. In the coating applicator, the second-gap variation detection portion detects, every detection period, a variation amount of the gap dimension of the second gap during the detection period by use of the radial positions on the layer surface of the paste layer and on the third-roll surface or the radially outer surface of the substrate sheet, detected by the third and fourth sensors. Further, the third-roll movement instruction portion instructs the third-roll moving mechanism to move the third roll in the second direction so as to offset the detected variation amount of the second gap. Thus, a variation of a thickness of the paste layer, caused due to a variation of the second gap, is eliminated every detection period, thereby making it possible to prevent accumulation of variations in the second gap. Thus, with the use of the coating applicator, it is possible to restrain not only the influence of the thermal expansion of the first roll and the second roll, but also influence of the thermal expansion of the third roll, thereby making it possible to apply, onto the substrate sheet, the paste layer in which variations of the thickness are restrained in terms of the longitudinal direction of the substrate sheet.

Note that the adjustment portion starts the new detection period after the movements of the first and third rolls by the first-roll moving mechanism and the third-roll moving mechanism are finished, and then, the second-roll ¼-rotation time longer than the second-roll θ1-rotation time elapses and the third-roll θ3-rotation time further elapses after the previous detection period is finished. On this account, a next detection period is started after a timing in which the first gap and the second gap are set to new dimensions by the movements of the first and third rolls, and the second-roll coating film formed through the first gap with such a new dimension reaches the second gap, and further, the paste layer from the second gap can be detected by the third sensor. Thus, outputs of the first sensor and the third sensor can be used from the beginning of the detection period.

Further, the above coating applicator may be a coating applicator in which the second-gap variation detection portion acquires the variation amount of the second gap, caused during the detection period due to the thermal expansion of the second roll and the third roll, from a difference between a variation amount of the third radial position on the layer surface of the paste layer, the variation amount being caused during the detection period and detected by the third sensor, and a variation amount of the fourth radial position on the third-roll surface or the radially outer surface, the variation amount being caused during the detection period and detected by the fourth sensor.

In the coating applicator, the second-gap variation detection portion acquires the variation amount of the gap dimension of the second gap, caused during the detection period, from the difference between the variation amount of the third radial position on the layer surface of the paste layer and the variation amount of the fourth radial position on the third-roll surface or the radially outer surface of the substrate sheet, the variation amounts being caused during the detection period. Accordingly, the variation amount of the gap dimension of the second gap can be acquired easily.

Further, the coating applicator may be a coating applicator in which the third sensor is a sensor configured to measure the third radial position on the layer surface of the paste layer based on a preinitiation third radial position on the third-roll surface at the third angle position as a reference position, the preinitiation third radial position being measured by the third sensor before the supply of the paste to the first gap is started; the fourth sensor is a sensor configured to measure the fourth radial position on the radially outer surface of the substrate sheet or the third-roll surface based on a preinitiation fourth radial position on the third-roll surface at the fourth angle position as a reference position, the preinitiation fourth radial position being measured by the fourth sensor before the supply of the paste to the first gap is started; the second-gap variation detection portion causes the third sensor to measure an initial third radial position on the layer surface of the paste layer based on the preinitiation third radial position as the reference position and causes the fourth sensor to measure an initial fourth radial position on the radially outer surface of the substrate sheet or the third-roll surface based on the preinitiation fourth radial position as the reference position, so as to acquire a value of the measured initial third radial position on the layer surface of the paste layer and a value of the measured initial fourth radial position on the radially outer surface of the substrate sheet or the third-roll surface, after the third roll rotates by the third angle or more, but before the third roll makes a second predetermined number of rotations, counting from a time when the second-roll coating film first reaches the second gap at a time of starting the first detection period among the detection periods provided repeatedly; after that, the second-gap variation detection portion causes the third sensor to measure an end third radial position on the layer surface of the paste layer based on the preinitiation third radial position as the reference position and causes the fourth sensor to measure an end fourth radial position on the radially outer surface of the substrate sheet or the third-roll surface based on the preinitiation fourth radial position as the reference position, at an end of each of the detection periods, so as to acquire a value of the measured end third radial position on the layer surface of the paste layer and a value of the measured end fourth radial position on the radially outer surface of the substrate sheet or the third-roll surface; and the second-gap variation detection portion calculates a value of $\Delta G2$, which is a variation amount of the second gap, caused due to the thermal expansion during the each of the detection periods, by use of a relational expression of $\Delta G2=(L42-L32)-(L41-L31)$, where L31 indicates a value of the initial third radial position, L41 indicates a value of the initial fourth radial position, L32 indicates a value of the end third radial position, and L42 indicates a value of the end fourth radial position.

In the above coating applicator, the second-gap variation detection portion acquires a value of the initial third radial position L31 on the layer surface of the paste layer, measured by the third sensor, and a value of the initial fourth radial position L41 on the radially outer surface of the substrate sheet or the third-roll surface, measured by the fourth sensor. Further, the second-gap variation detection portion acquires a value of the end third radial position L32 on the layer surface of the paste layer, measured by the third sensor, and a value of the end fourth radial position L42 on the radially outer surface of the substrate sheet or the third-roll surface, measured by the fourth sensor. Further, the second-gap variation detection portion calculates a value of $\Delta G2$, which is a variation amount of the second gap and caused due to the thermal expansion during each of the detection periods, by use of the relational expression of $\Delta G2=(L42-L32)-(L41-L31)$. Note that how to derive this relational expression is just what is described in the above manufacturing method.

Accordingly, similarly to the above manufacturing method, in the above coating applicator, when the third roll is moved by the third-roll moving mechanism so as to offset the variation amount $\Delta G2=(L42-L32)-(L41-L31)$, the gap dimension of the second gap can be adjusted (restored) to the second-gap target value. Hereby, a thickness of a coating film to be formed through between the second roll and the third roll can be adjusted to the second-gap target value or a dimension close to this over an entire manufacture period.

Further, any of the above coating applicators may be a coating applicator in which: the third sensor includes a first-side third sensor and a second-side third sensor, and the fourth sensor includes a first-side fourth sensor and a second-side fourth sensor, such that the first-side third sensor and the first-side fourth sensor are placed to be opposed to each other via a first end of the third roll and the second-side third sensor and the second-side fourth sensor are placed to be opposed to each other via a second end of the third roll; the third-roll moving mechanism includes a first-side third-roll moving mechanism configured to move the first end of the third roll in the second direction, and a second-side third-roll moving mechanism configured to move the second end of the third roll in the second direction; the second-gap variation detection portion detects a variation amount of a gap dimension of a first end of the second gap by use of the first-side third sensor and the first-side fourth sensor, and a variation amount of a gap dimension of a second end of the second gap by use of the second-side third sensor and the second-side fourth sensor; and the third-roll movement instruction portion instructs the first-side third-roll moving mechanism to move the first end of the third roll so as to offset the detected variation amount of the gap dimension of the first end of the second gap, and instructs the second-side third-roll moving mechanism to move the second end of the third roll so as to offset the detected variation amount of the gap dimension of the second end of the second gap.

In the coating applicator, a pair of third sensors, a pair of fourth sensors, and a pair of third-roll moving mechanisms are each provided such that one of the pair is provided in the first end of the third roll and the other one of the pair is provided in the second end thereof; the second-gap variation detection portion detects variation amounts of respective gap dimensions of the first end and the second end in the second gap, and the third-roll movement instruction portion instructs the pair of third-roll moving mechanisms to move the first end and the second end of the third roll, respectively. Thus, a variation of the thickness of the paste layer, caused due to a variation of the second gap, can be eliminated every detection period over the second-roll axis direction. Thus, with the use of the coating applicator, it is possible to restrain not only the influence of the thermal expansion of the first roll and the second roll, but also influence of the third roll on the thickness of the paste layer formed on the substrate sheet, thereby making it possible to apply, onto the substrate sheet, the paste layer in which variations of the thickness are restrained in terms of the width direction and the longitudinal direction of the substrate sheet.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Embodiment

Figure 1:
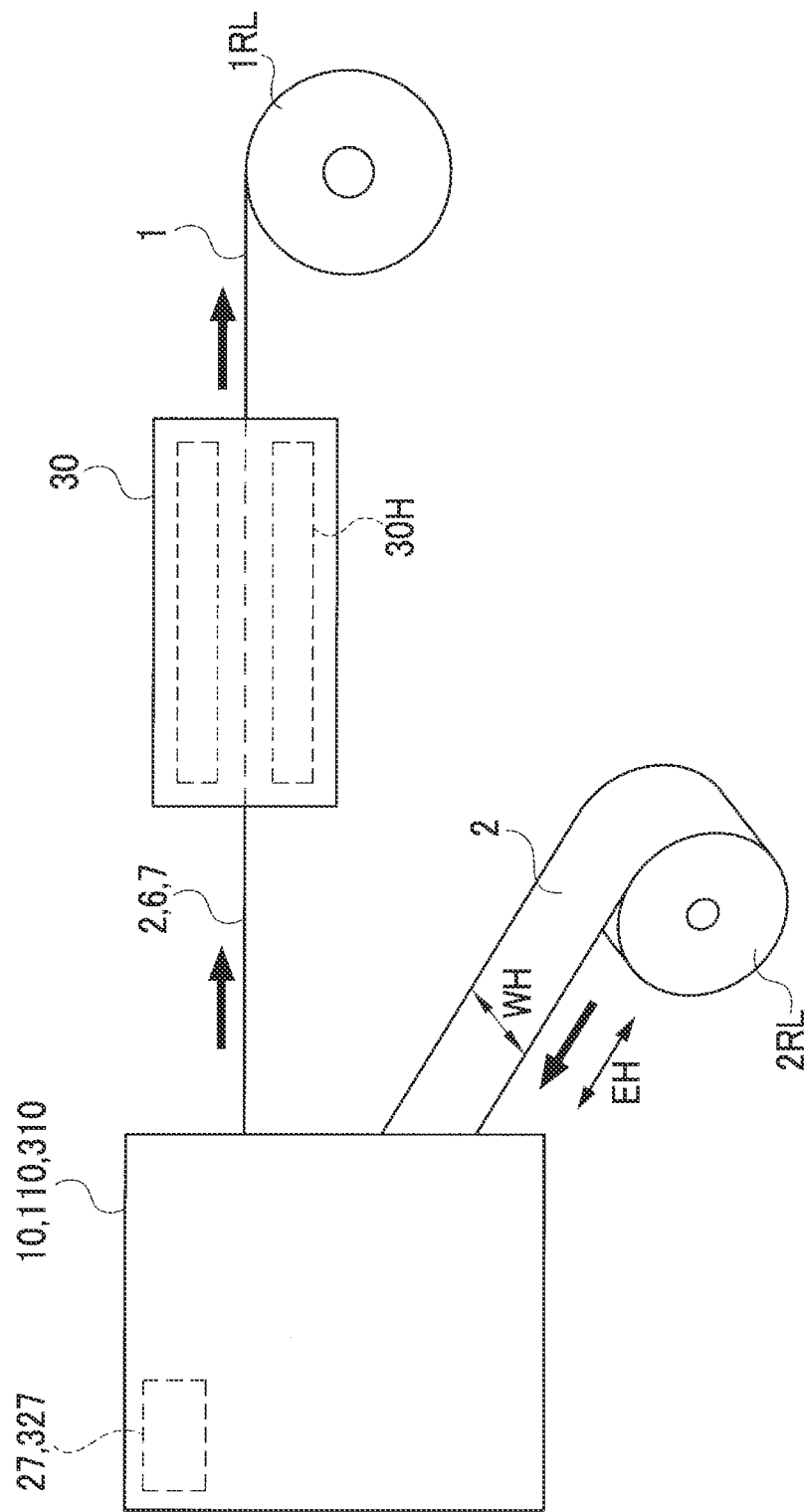
FIG. 1 is an explanatory view illustrating an outline of a coating applicator and a dryer for manufacturing an electrode plate (a dry-paste-layer-attached sheet) according to an embodiment.
Figure 2:
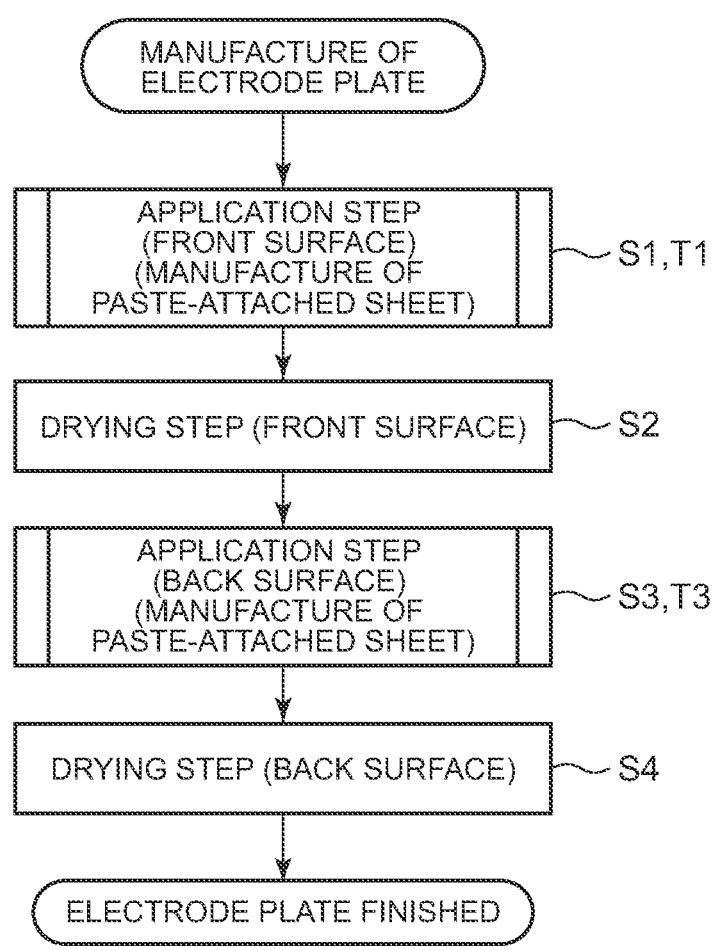
FIG. 2 is a flowchart illustrating steps of manufacturing the electrode plate, according to the embodiment.
Figure 3:
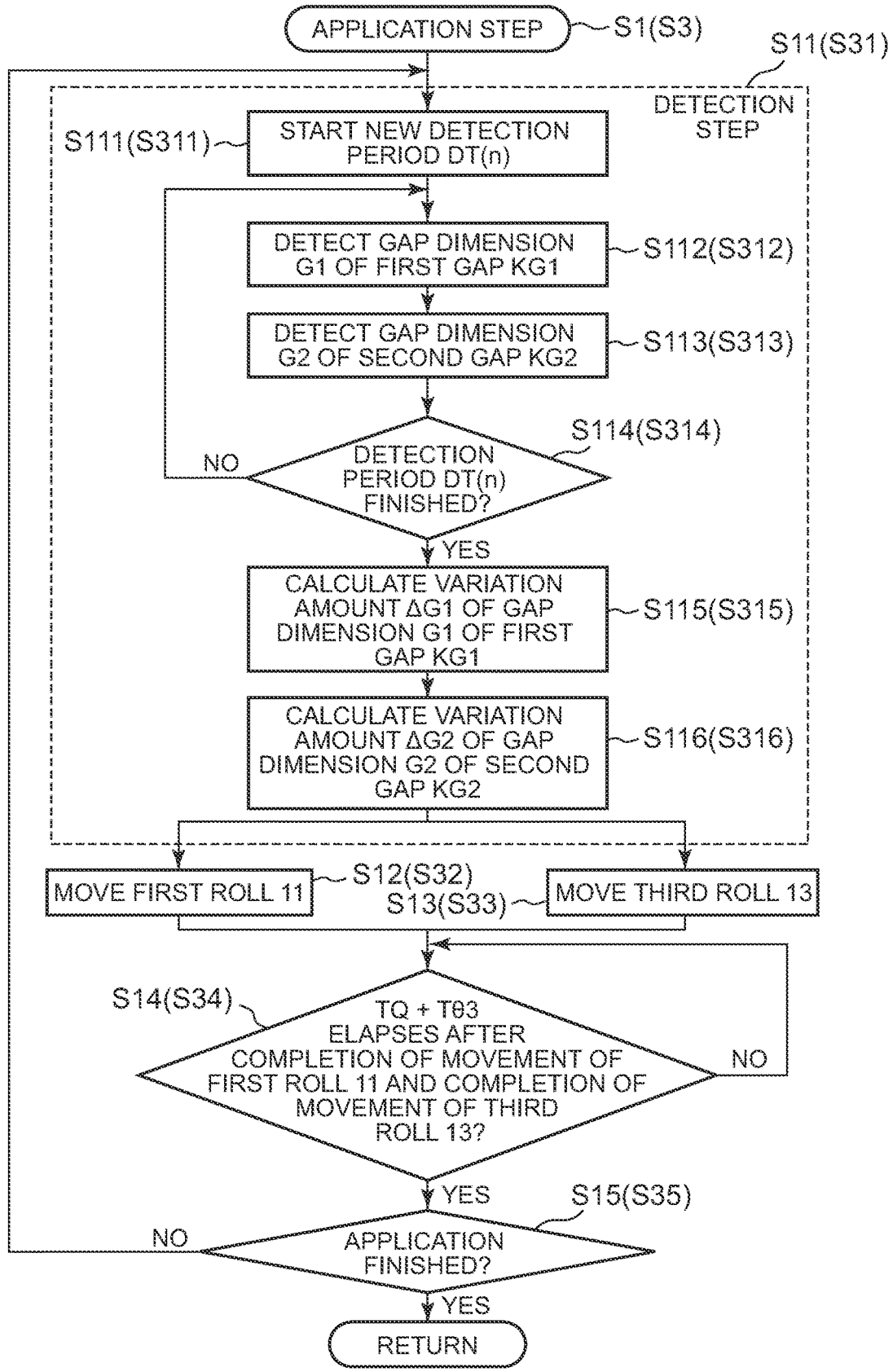
FIG. 3 is a flowchart illustrating a content of an application step.

Referring to the drawings, an embodiment of the present disclosure will be described below. FIG. 1 illustrates how an electrode plate 1 is manufactured by use of a coating applicator 10 and a dryer 30 according to the present embodiment. Further, FIGS. 2, 3 are flowcharts illustrating steps of manufacturing the electrode plate 1, and FIGS. 4 to 14 illustrate details of the coating applicator 10 and how a second-roll coating film 5 and a wet active material layer 6 are formed by use of rolls 11, 12, 13.

As illustrated in FIG. 1, in the present embodiment, with the use of the coating applicator 10, a wet electrode plate 7 in which a wet active material layer 6 is applied onto a surface 2s of a current collector foil 2 made of a belt-shaped aluminum foil and supplied from a current collector foil roll 2RL is formed. Further, the wet electrode plate 7 is heated and dried by a heater of the dryer 30, so as to form an electrode plate 1 in which an active material layer 3 is provided on the current collector foil 2 in a belt shape, and the electrode plate 1 is wound up as an electrode plate roll 1RL. Note that the active material layer 3 is made of well-known positive-electrode active material particles, conductive material particles, and a binder.

With reference to the flowchart of FIG. 2, a manufacturing method of the electrode plate 1 will be described more specifically. First, in an application step in step S1, a wet active material layer 6 is applied onto a first surface 2sa of a current collector foil 2 so as to manufacture a wet electrode plate 7 by use of the coating applicator 10. Subsequently, in a drying step in step S2, the wet active material layer 6 thus applied is dried by use of the dryer 30 so as to form an active material layer 3, and an electrode plate 1 thus formed is wound up once as an electrode plate roll 1RL. Subsequently, in an application step in step S3, the current collector foil 2 (the active material layer 3 is formed on a reverse surface) is supplied to the coating applicator 10 again with the electrode plate roll 1RL being as a current collector foil roll 2RL, and a wet active material layer 6 is applied onto a second surface (back surface) 2sb of the current collector foil 2 so as to manufacture a wet electrode plate 7. In a drying step in step S4, the wet active material layer 6 thus applied is dried by use of the dryer 30, and the electrode plate 1 is wound up as the electrode plate roll 1RL. Thus, the electrode plate 1 having the active material layers 3, 3 on respective surfaces 2sa, 2sb of the current collector foil 2 is completed.

Figure 4:
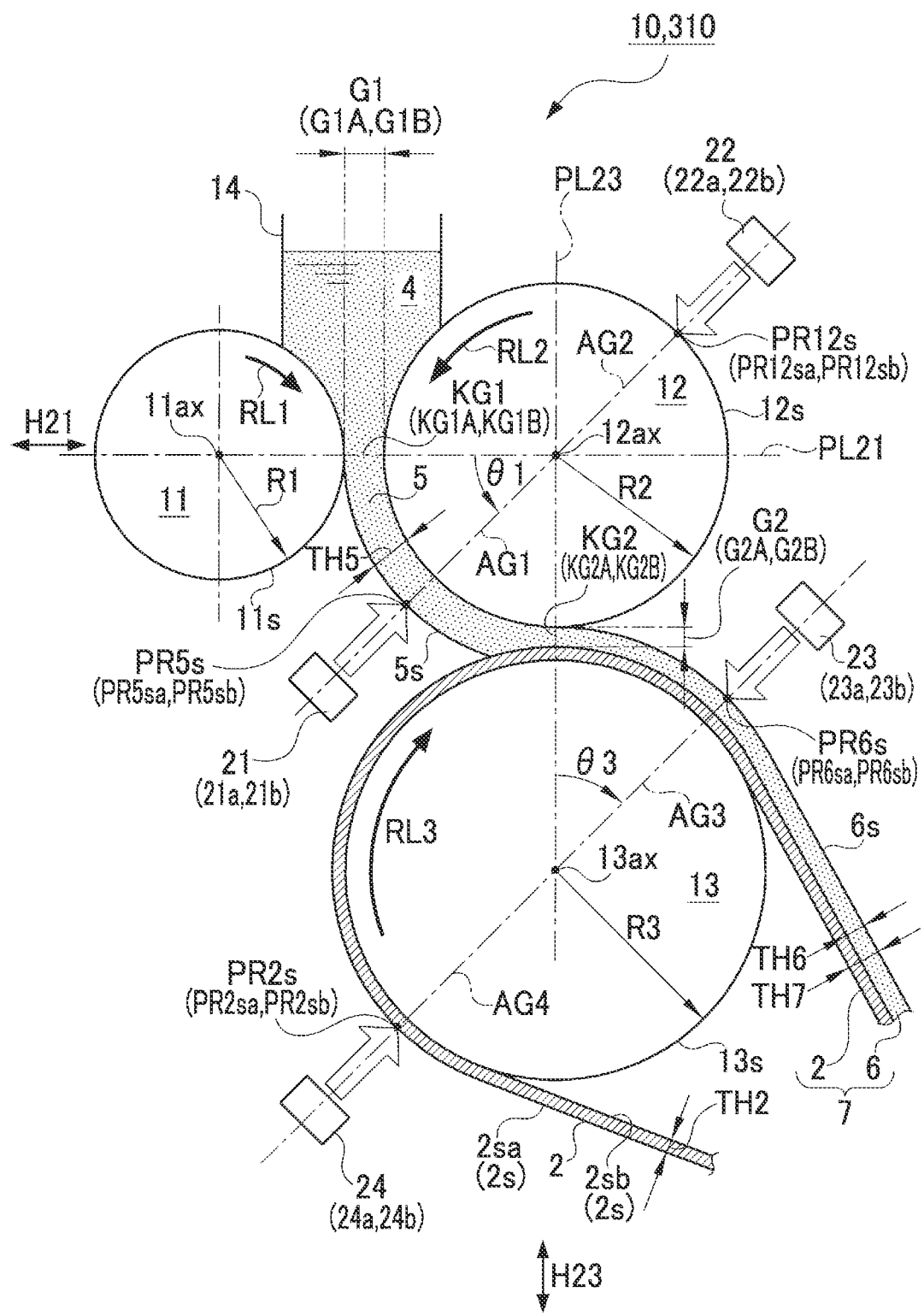
FIG. 4 relates to the embodiment and is an explanatory view illustrating the coating applicator including three rolls and how to manufacture a wet electrode plate by use of this.

As illustrated in FIG. 4, the coating applicator 10 includes a first roll 11 having a radius R1, a second roll 12 having a radius R2 and placed in parallel with the first roll 11 via a first gap KG1, and a third roll 13 having a radius R3 and placed in parallel with the second roll 12 via a second gap KG2. In addition, as will be described later, the second roll 12 and the third roll 13 include four pairs of displacement sensors, i.e., first sensors 21 (21a, 21b) to fourth sensors 24 (24a, 24b) (see FIG. 4, FIG. 5, FIG. 7). Further, the first roll 11 and the third roll 13 include a pair of first-roll moving mechanisms 25 (25a, 25b) and a third-roll moving mechanisms 26 (26a, 26b), respectively, so as to move the first roll 11 and the third roll 13. Note that detection and processing of outputs of the first to fourth sensors 21 to 24 and controls of the first-roll and third-roll moving mechanisms 25, 26 are performed by a controlling portion 27 (see FIG. 1, FIG. 12).

The first to third rolls 11, 12, 13 are placed such that the first roll 11 and the third roll 13 are placed at right angles around the second roll 12. More specifically, the first to third rolls 11, 12, 13 are placed such that a first virtual surface PL21 connecting a second-roll central axis 12ax of the second roll 12 to a first-roll central axis flax of the first roll 11 and a second virtual surface PL23 connecting the second-roll central axis 12ax of the second roll 12 to a third-roll central axis 13ax of the third roll 13 intersect with each other at right angles at the second roll central axis 12ax. Besides, they are placed such that the second gap KG2 is formed in a part advanced from the first gap KG1 by a quarter turn in a second-roll rotation direction RL2 on a second-roll surface 12s of the second roll 12.

As illustrated in FIG. 4, the first to third rolls 11, 12, 13 rotate such that a first-roll rotation direction RL1 of the first roll 11 and a third-roll rotation direction RL3 of the third roll 13 are the same direction (a clockwise direction in the figure), and only the second-roll rotation direction RL2 of the second roll 12 is a reverse direction (a counterclockwise direction in the figure) to them. Further, circumferential speeds of the first roll 11, the second roll 12, and the third roll 13 are increased in this order.

Further, a paste holding portion 14 configured to keep an active material paste 4 therein and to supply the active material paste 4 to the first gap KG1 is provided above the first gap KG1 between the first roll 11 and the second roll 12.

When the active material paste 4 is supplied to the paste holding portion 14, a second-roll coating film 5 is formed on the second-roll surface 12s of the second roll 12 through the first gap KG1. The current collector foil 2 is wound around the third roll 13, and conveyed along with a rotation of the third roll 13 through the second gap KG2. On this account, the second-roll coating film 5 on the second-roll surface 12s is transferred onto the current collector foil 2 on a third-roll-13 side in the second gap KG2, and the wet electrode plate 7 in the wet active material layer 6 is formed on the surface 2s of the current collector foil 2 is manufactured. After that, as described above, the wet electrode plate 7 is sent to the dryer 30, in which the wet active material layer 6 is dried to become the active material layer 3, and thus, the belt-shaped electrode plate 1 is formed. Note that, in a case where the active material layer 3 is provided on either surface of the current collector foil 2, as described above, the electrode plate roll 1RL obtained by winding the electrode plate 1 in which the active material layer 3 is formed on one surface is used as the current collector foil roll 2RL, and the wet active material layer 6 is formed on the other surface 2s of the current collector foil 2 by use of the coating applicator 10 so as to manufacture the wet electrode plate 7, and then dried by the dryer 30.

The first sensor 21 and the second sensor 22 as the displacement sensors are placed around the second roll 12 in the coating applicator 10. The first sensor 21 and the second sensor 22 are laser displacement meters (e.g., product no. LK-H022 made by Keyence Corporation). Among them, the first sensor 21 is placed to detect a first radial position PR5s on a coating film surface 5s of the second-roll coating film 5 made of the active material paste 4 applied to the second-roll surface 12s, the first radial position PR5s being at a first angle position AG1 on the coating film surface 5s of the second-roll coating film 5, the first angle position AG1 being advanced from the first gap KG1 in the second-roll rotation direction RL2 by a first angle $\theta 1$ (note that $0°<\theta 1<90°$, in the present embodiment, $\theta 1=45°$) over the second-roll surface 12s.

In the meantime, the second sensor 22 is placed to be opposed to the first sensor 21 across the second roll 12. That is, the second sensor 22 is placed so as to detect a second radial position PR12s on the second-roll surface 12s at a second angle position AG2 advanced from the first angle position AG1 by 180° in the second-roll rotation direction RL2 on the second-roll surface 12s of the second roll 12.

Further, the third sensor 23 and the fourth sensor 24 are placed around the third roll 13. The third sensor 23 and the fourth sensor 24 are also laser displacement meters, similarly to as the first and second sensors 21, 22. Among them, the third sensor is placed so as to detect a third radial position PR6s on a layer surface 6s of the wet active material layer 6 transferred onto the current collector foil 2 wound around the third roll 13, the third radial position PR6s being at a third angle position AG3 on the layer surface 6s of the wet active material layer 6, the third angle position AG3 being advanced from the second gap KG2 by a third angle $\theta 3$ (note that $0°<\theta 3<90°$, in the present embodiment, $\theta 3=45°$) in the third-roll rotation direction RL3 over a third-roll surface 13s of the third roll 13.

Further, the fourth sensor 24 is placed to be opposed to the third sensor 23 across the third roll 13. That is, the fourth sensor 24 is placed so as to detect a fourth radial position PR2s on a radially outer surface 2sa (facing radially outwardly) of the current collector foil 2 wound around the third roll 13, the fourth radial position PR2s being at a fourth angle position AG4 on the radially outer surface 2sa of the current collector foil 2, the fourth angle position AG4 being returned from the third angle position AG3 by 180°.

The first sensor 21 and the second sensor 22 detect displacement of the first radial position PR5s on the coating film surface 5s of the second-roll coating film 5 and displacement of the second radial position PR12s on the second-roll surface 12s, respectively, based on the second-roll surface 12s measured in a state where the active material paste 4 is not supplied to the paste holding portion 14 and thermal expansion (described later) does not occur in the first, second rolls 11, 12. Further, the third sensor 23 and the fourth sensor 24 detect displacement of the third radial position PR6s on the layer surface 6s of the wet active material layer 6 and displacement of the fourth radial position PR2s of the radially outer surface 2sa of the current collector foil 2, respectively, based on the radially outer surface 2sa of the current collector foil 2 wound around the third roll 13, the radially outer surface 2sa being measured in a state where the current collector foil 2 is wound around the third roll without supplying the active material paste 4 to the paste holding portion 14 and in a state where thermal expansion (described later) does not occur in the first to third rolls 11 to 13.

Thus, a thickness TH5 of the second-roll coating film 5 can be detected from an output of the first sensor 21. Further, a thickness TH6 of the wet active material layer 6 or a thickness TH7 of the wet electrode plate 7 can be detected from an output of the third sensor 23.

Figure 9:
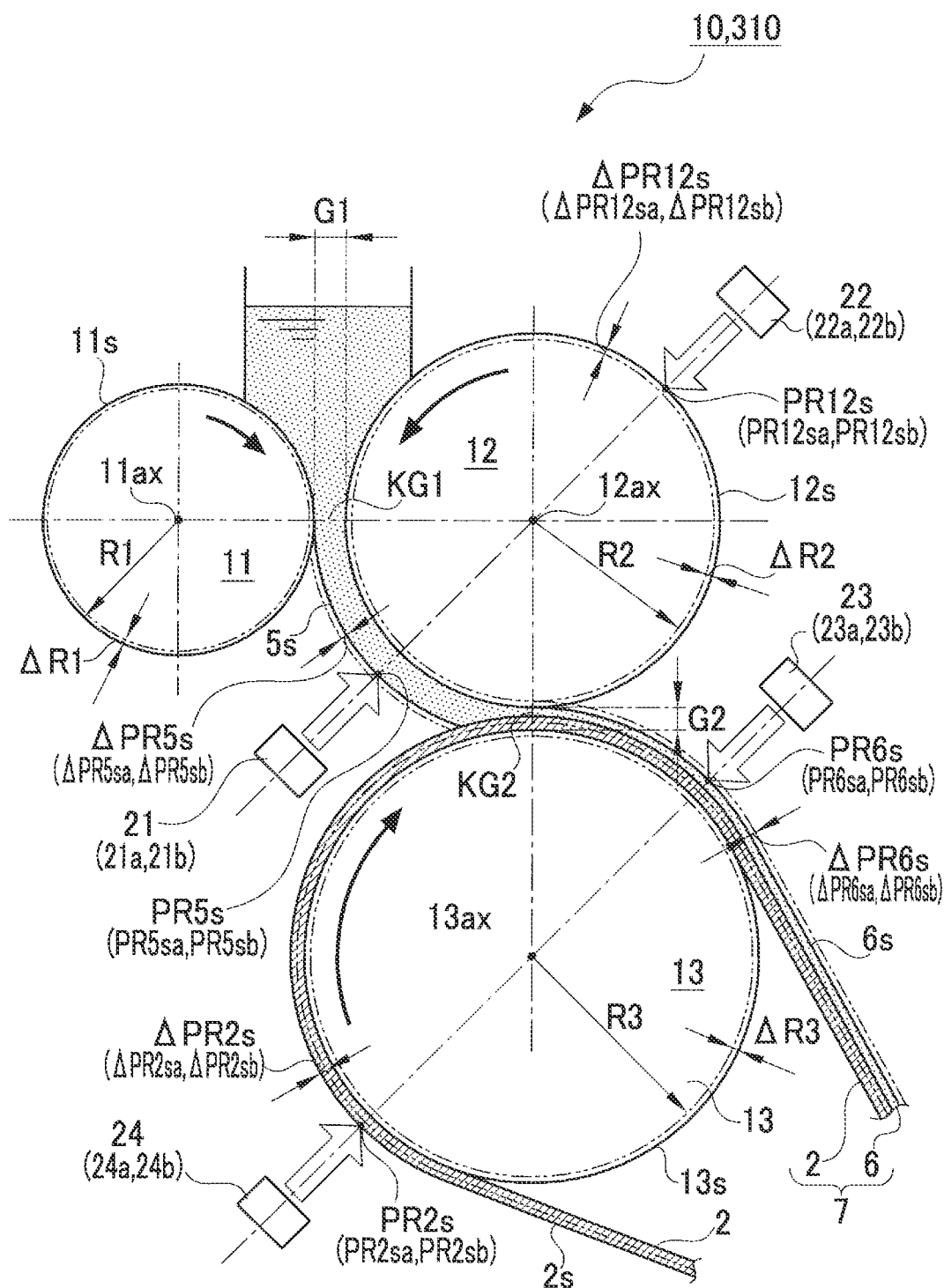
FIG. 9 relates to the embodiment and is an explanatory view illustrating changes of respective roll surfaces, the second-roll coating film, and the wet electrode plate in a case where three rolls of the coating applicator illustrated in FIG. 5 thermally expand.
Figure 10:
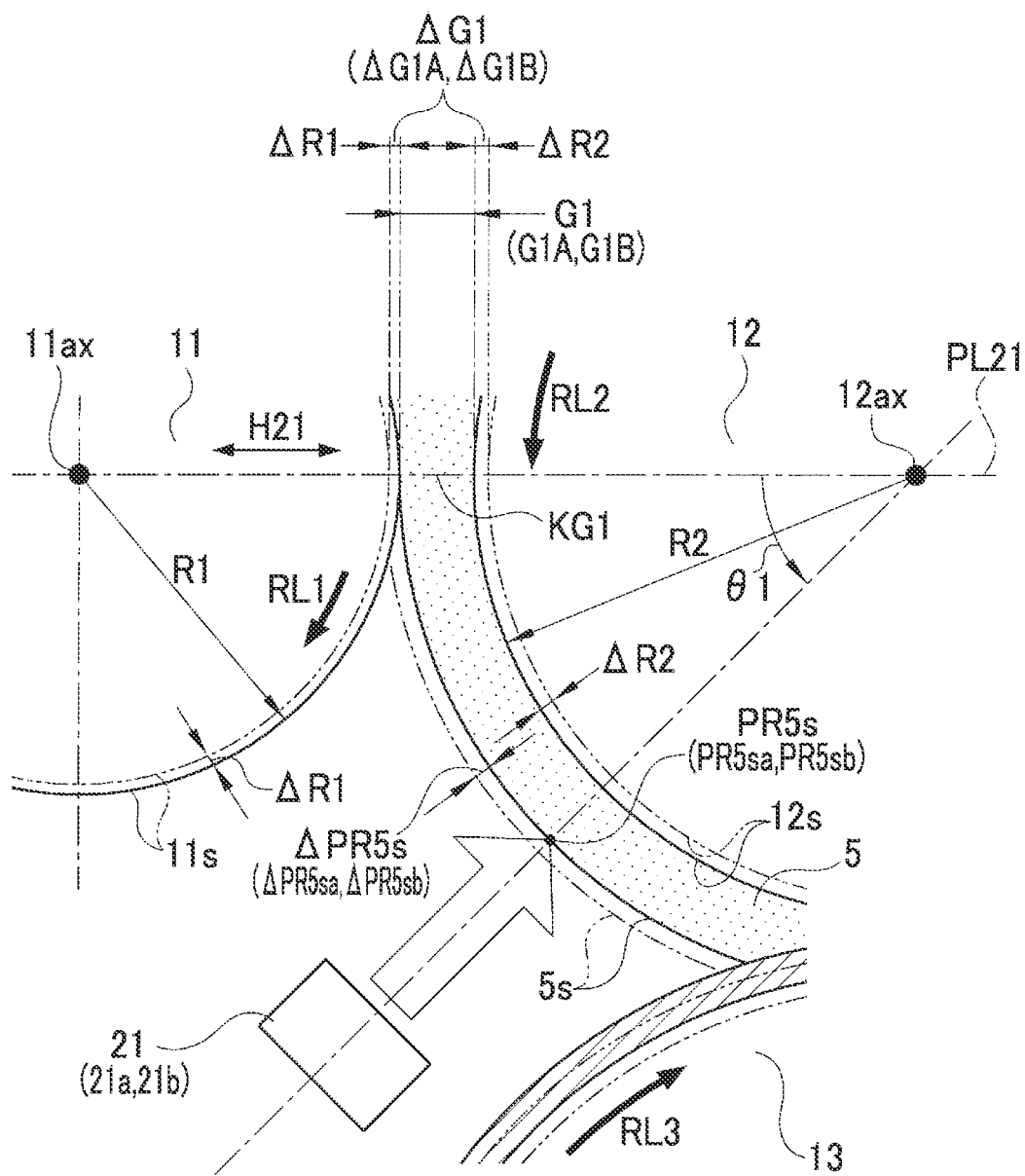
FIG. 10 relates to the embodiment and is an enlarged explanatory view illustrating changes of a first-roll surface, a second-roll surface, and the second-roll coating film, and a measuring position of the first sensor in FIG. 9 in an enlarged manner.
Figure 11:
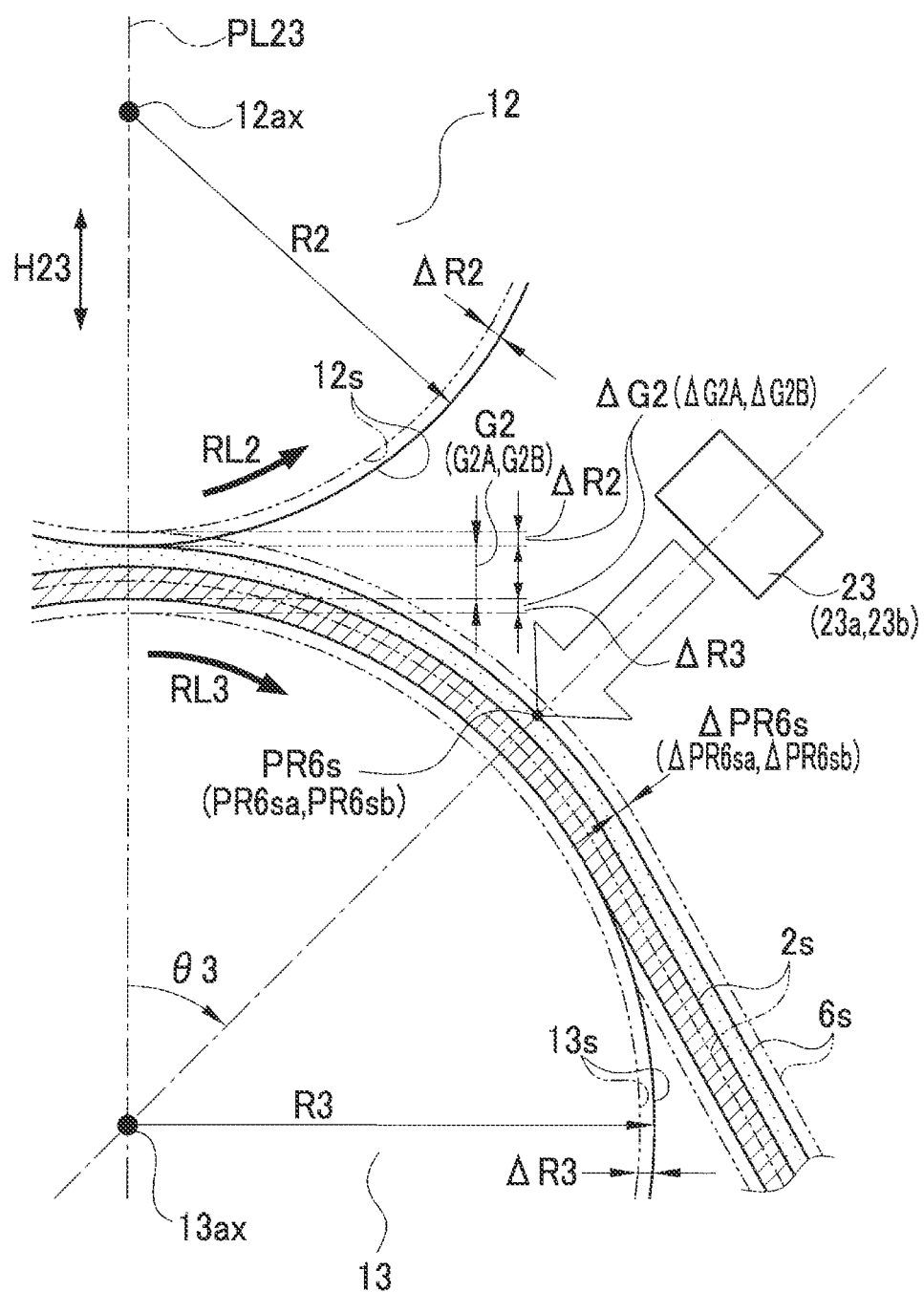
FIG. 11 relates to the embodiment and is an enlarged explanatory view illustrating changes of the second-roll surface, a third-roll surface, and the wet electrode plate, and a measuring position of the third sensor in FIG. 9 in an enlarged manner.

In the meantime, as described above, in the coating applicator 10, when the wet active material layer 6 is continuously applied to the long belt-shaped current collector foil 2, temperatures of the rolls 11 to 13 increase due to frictional heat or the like to be generated near the first gap KG1 and the second gap KG2, so that the radii R1 to R3 of the rolls 11 to 13 gradually increase due to thermal expansion. That is, as illustrated in FIGS. 9 to 11, the rolls 11 to 13 indicated by an alternate long and two short dashes line gradually increase due to the thermal expansion to a state indicated by a continuous line. As a result, as is easily understood from FIGS. 9, 10, as the radii R1, R2 of the first roll 11 and the second roll 12 gradually increase due to the thermal expansion, a gap dimension G1 of the first gap KG1 gradually decreases. On this account, the thickness TH5 of the second-roll coating film 5 formed on the second-roll surface 12s gradually decreases. As a result, the thickness TH6 of the wet active material layer 6 formed on the current collector foil 2 also gradually decreases.

Further, as the radii R2, R3 of the second roll 12 and the third roll 13 gradually increase due to the thermal expansion, a gap dimension G2 of the second gap KG2 gradually decreases. This also results in that the thickness TH6 of the wet active material layer 6 formed on the radially outer surface 2sa of the current collector foil 2 gradually decreases.

In the meantime, it is assumed that, due to thermal expansion caused during a given detection period (from start to end of the detection period), the radii R1, R2, R3 of the rolls change during the detection period such that R1→R1+ΔR1, R2→R2+ΔR2, R3→R3+ΔR3. Further, it is assumed that the gap dimension G1 of the first gap KG1 decreases such that G1→G1−ΔG1. As a result, as is easily understood from FIGS. 9, 10, a variation amount ΔG1 of the gap dimension G1 is equal to an inverse number of a sum of a variation amount ΔR1 of the radius R1 of the first roll 11 and a variation amount ΔR2 of the radius R2 of the second roll 12 (ΔG1=−(ΔR1+ΔR2)).

Similarly, as is easily understood from FIGS. 9, 11, it is assumed that a gap dimension G2 of the second gap KG2 decreases such that G2→G2−ΔG2, along with thermal expansion of the second, third rolls 12, 13. In the meantime, a variation amount ΔG2 of the gap dimension G2 is equal to an inverse number of a sum of the variation amount ΔR2 of the radius R2 of the second roll 12 and a variation amount ΔR3 of the radius R3 of the third roll 13 (ΔG2=−(ΔR2+ΔR3)).

Further, as is easily understood from FIG. 9, a variation amount ΔPR12s caused during a given detection period at the second radial position PR12s on the second-roll surface 12s to be detected by the second sensor 22 is equal to the variation amount ΔR2 of the radius R2 of the second roll 12, caused during the detection period (ΔPR12s=ΔR2). In the meantime, as is easily understood from FIGS. 9, 10, a variation amount ΔPR5s caused during the detection period at the first radial position PR5s on the coating film surface 5s of the second-roll coating film 5, the first radial position PR5s being detected by the first sensor 21, is equal to an inverse number −ΔR1 of the variation amount ΔR1 of the radius R1 of the first roll 11, caused in the detection period (ΔPR5s=−ΔR1).

Accordingly, by use of outputs of the first sensor 21 and the second sensor 22, it is possible to calculate the variation amount ΔG1 of the gap dimension G1 of the first gap KG1, caused during the detection period. More specifically, ΔG1=−(ΔR1+ΔR2)=ΔPR5s−ΔPR12s is established, and therefore, it is found that the variation amount ΔG1 of the gap dimension G1 can be obtained from a difference (ΔPR5s−ΔPR12s) between the variation amount ΔPR5s obtained from the output of the first sensor 21 and the variation amount ΔPR12s obtained from the output of the second sensor 22.

Further, as is easily understood from FIGS. 9, 11, a variation amount ΔPR2s caused during a given detection period at the fourth radial position PR2s on the radially outer surface 2sa of the current collector foil 2, the fourth radial position PR2s being detected by the fourth sensor 24, is equal to the variation amount ΔR3 of the radius R3 of the third roll 13, caused during the detection period (ΔPR2s=ΔR3). In the meantime, a variation amount ΔPR6s caused during the detection period at the third radial position PR6s on the layer surface 6s of the wet active material layer 6, the third radial position PR6s being detected by the third sensor 23, is equal to an inverse number −ΔR2 of the variation amount ΔR2 of the radius R2 of the second roll 12, caused during the detection period (ΔPR6s=−ΔR2).

Accordingly, by use of outputs of the third sensor 23 and the fourth sensor 24, it is possible to calculate the variation amount ΔG2 of the gap dimension G2 of the second gap KG2, caused during the detection period. More specifically, ΔG2=−(ΔR2+ΔR3)=ΔPR6s−ΔPR2s is established, and therefore, it is found that the variation amount ΔG2 of the gap dimension G2 can be obtained from a difference (ΔPR6s−ΔPR2s) between the variation amount ΔPR6s obtained from the output of the third sensor 23 and the variation amount ΔPR2s obtained from the output of the fourth sensor 24.

Figure 5:
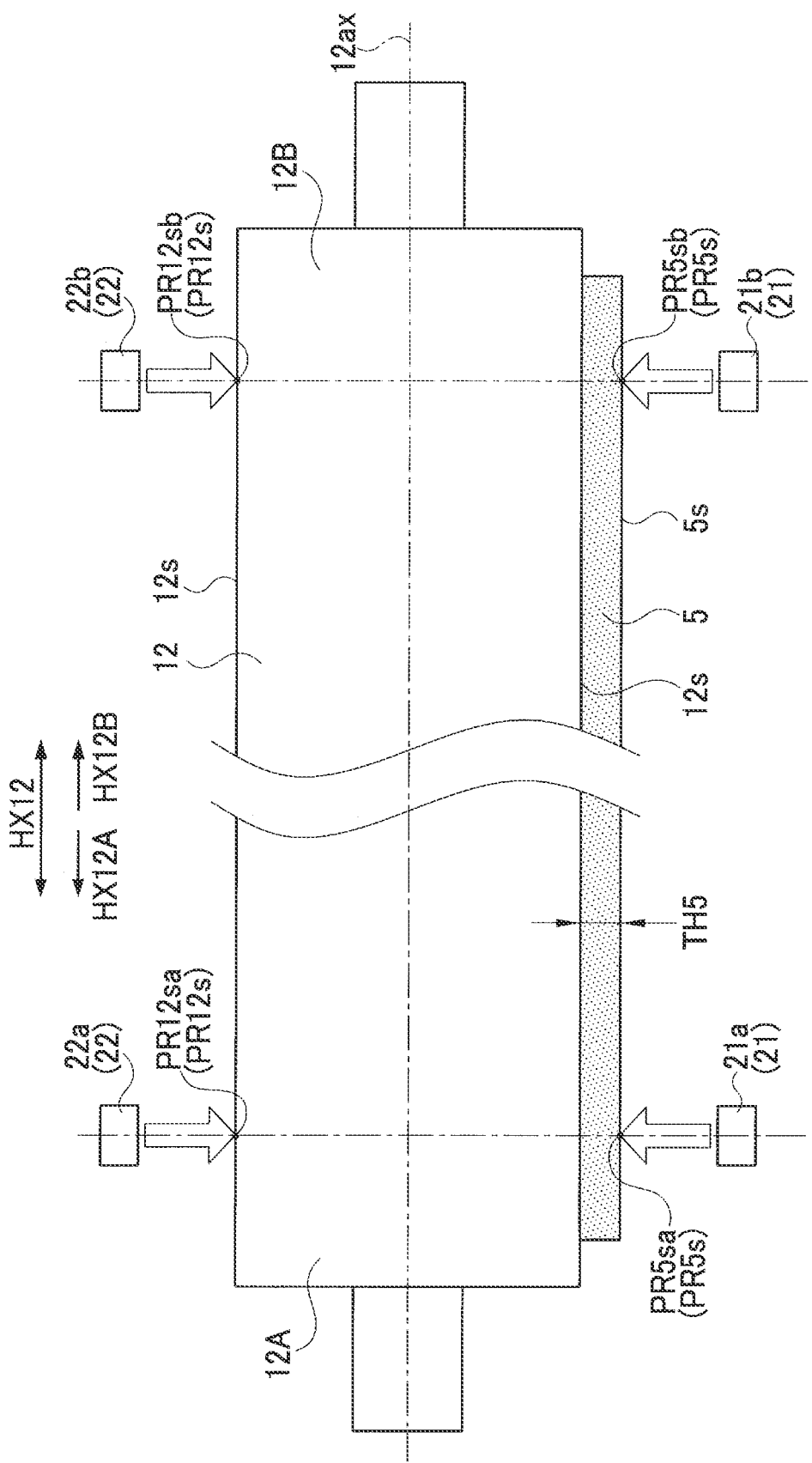
FIG. 5 relates to the embodiment and is an explanatory view illustrating a relationship of a second roll and a second-roll coating film with respect to a first sensor and a second sensor in terms of a second-roll axis direction.

In the meantime, in the coating applicator 10 of the present embodiment, as illustrated in FIG. 5, a pair of first sensors 21 and a pair of second sensors 22 are each provided such that one of the pair is provided in a first end 12A of the second roll 12 on a first side HX12A (a left side in FIG. 5) in a second-roll axis direction HX12 along the second-roll central axis 12ax, and the other one of the pair is provided in a second end 12B thereof on a second side HX12B (a right side in FIG. 5) in the second-roll axis direction HX12. That is, the coating applicator 10 includes a first-side first sensor 21a and a first-side second sensor 22a placed to be opposed to each other via the first end 12A of the second roll 12, and a second-side first sensor 21b and a second-side second sensor 22b placed to be opposed to each other via the second end 12B of the second roll 12. This is to detect variations in the gap dimension G1 of the first gap KG1 over the second-roll axis direction HX12.

In view of this, in the present embodiment, a variation amount ΔG1A of a gap dimension G1A (see FIGS. 4, 6) of a first end KG1A of the first gap KG1, the variation amount ΔG1A being caused during the detection period, is calculated by use of outputs of the first-side first sensor 21a and the first-side second sensor 22a. More specifically, ΔG1A=−(ΔR1+ΔR2)=ΔPR5sa−ΔPR12sa is established, and therefore, the variation amount ΔG1A of the gap dimension G1A of the first end KG1A of the first gap KG1 is obtained from a difference (ΔPR5sa−ΔPR12sa) between a variation amount ΔPR5sa detected by the first-side first sensor 21a and a variation amount ΔPR12sa detected by the first-side second sensor 22a.

Further, a variation amount ΔG1B of a gap dimension G1B of a second end KG1B of the first gap KG1, the variation amount ΔG1B being caused during the detection period, is calculated by use of outputs of the second-side first sensor 21b and the second-side second sensor 22b. More specifically, $\Delta G1B=-(\Delta R1+\Delta R2)=\Delta PR5sb-\Delta PR12sb$ is established, and therefore, the variation amount $\Delta G1B$ of the gap dimension G1B of the second end KG1B of the first gap KG1 is obtained from a difference ($\Delta PR5sb-\Delta PR12sb$) between a variation amount $\Delta PR5sb$ detected by the second-side first sensor 21b and a variation amount $\Delta PR12sb$ detected by the second-side second sensor 22b.

Figure 7:
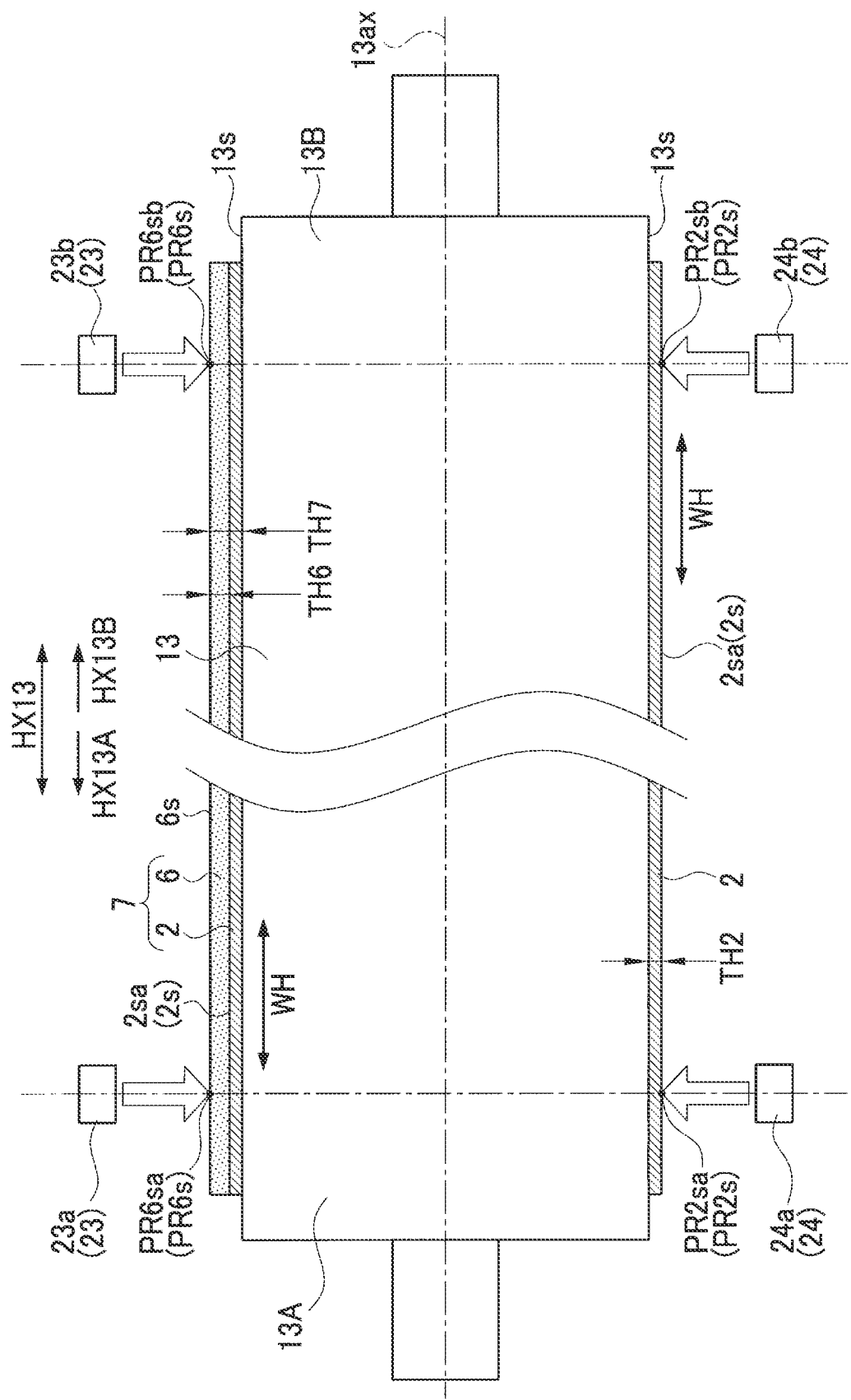
FIG. 7 relates to the embodiment and is an explanatory view illustrating a relationship of a third roll, a current collector foil, and a wet electrode plate with a third sensor and a fourth sensor in terms of a third-roll axis direction.

Further, as illustrated in FIG. 7, the coating applicator 10 includes a pair of third sensors 23 and a pair of fourth sensors 24 each provided such that one of the pair is provided in a first end 13A of the third roll 13 on a first side HX13A (a left side in FIG. 7) in a third-roll axis direction HX13 along the third-roll central axis 13ax, and the other one of the pair is provided in a second end 13B thereof on a second side HX13B (a right side in FIG. 7) in the third-roll axis direction HX13. That is, the coating applicator 10 includes a first-side third sensor 23a and a first-side fourth sensor 24a placed to be opposed to each other via the first end 13A of the third roll 13, and a second-side third sensor 23b and a second-side fourth sensor 24b placed to be opposed to each other via the second end 13B of the third roll 13.

Accordingly, a variation amount $\Delta G2A$ of a gap dimension G2A (see FIGS. 4, 8) of a first end KG2A of the second gap KG2, the variation amount $\Delta G2A$ being caused during the detection period, is calculated by use of outputs of the first-side third sensor 23a and the first-side fourth sensor 24a. More specifically, $\Delta G2A=-(\Delta R2+\Delta R3)=\Delta PR6sa-\Delta PR2sa$ is established, and therefore, the variation amount $\Delta G2A$ of the gap dimension G2A of the first end KG2A of the second gap KG2 is obtained from a difference ($\Delta PR6sa-\Delta PR2sa$) between a variation amount $\Delta PR6sa$ detected by the first-side third sensor 23a and a variation amount $\Delta PR2sa$ detected by the first-side fourth sensor 24a.

Further, a variation amount $\Delta G2B$ of a gap dimension G2B of a second end KG2B of the second gap KG2, the variation amount $\Delta G2B$ being caused during the detection period, is calculated by use of outputs of the second-side third sensor 23b and the second-side fourth sensor 24b. More specifically, $\Delta G2B=-(\Delta R2+\Delta R3)=\Delta PR6sb-\Delta PR2sb$ is established, and therefore, the variation amount $\Delta G2B$ of the gap dimension G2B of the second end KG2B of the second gap KG2 is obtained from a difference ($\Delta PR6sb-\Delta PR2sb$) between a variation amount $\Delta PR6sb$ detected by the second-side third sensor 23b and a variation amount $\Delta PR2sb$ detected by the second-side fourth sensor 24b.

In view of this, in the coating applicator 10 (see FIGS. 1, 12) of the present embodiment, the controlling portion 27 uses the first-roll and third-roll moving mechanisms 25, 26 to move the first roll 11 or the third roll 13 intermittently by use of the outputs of the sensors 21 to 24, so as to perform a control to offset variations of the first gap KG1 or the second gap KG2 due to thermal expansion of the rolls 11 to 13.

Figure 6:
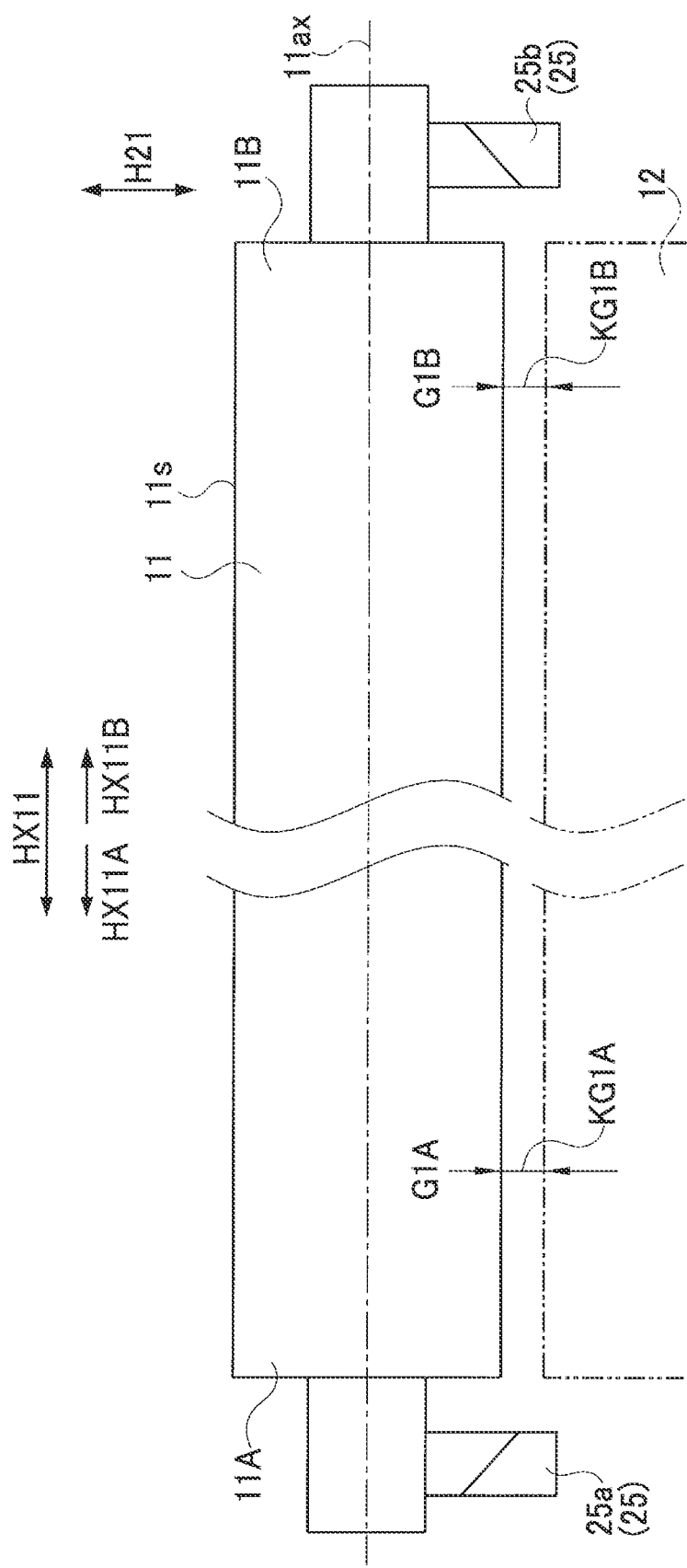
FIG. 6 relates to the embodiment and is an explanatory view illustrating a first roll and a pair of first-roll moving mechanisms configured to move a first end and a second end of the first roll in a first direction.

Before describing a content of the control, the following describes the first-roll and third-roll moving mechanisms 25, 26. As illustrated in FIG. 6, the coating applicator 10 of the present embodiment includes the first-roll moving mechanism 25 (25a, 25b) configured to move the first roll 11 in a first direction H21 (an up-down direction in FIG. 6, a right-left direction in FIG. 4). More specifically, the coating applicator 10 includes a first-side first-roll moving mechanism 25a configured to move, in the first direction H21, a first end 11A of the first roll 11 on a first side HX11A (a left side in FIG. 6) in a first-roll axis direction HX11 along the first-roll central axis 11ax. Further, the coating applicator 10 includes a second-side first-roll moving mechanism 25b configured to move, in the first direction H21, a second end 11B of the first roll 11 on a second side HX11B (a right side in FIG. 6) in the first-roll axis direction HX11.

Figure 8:
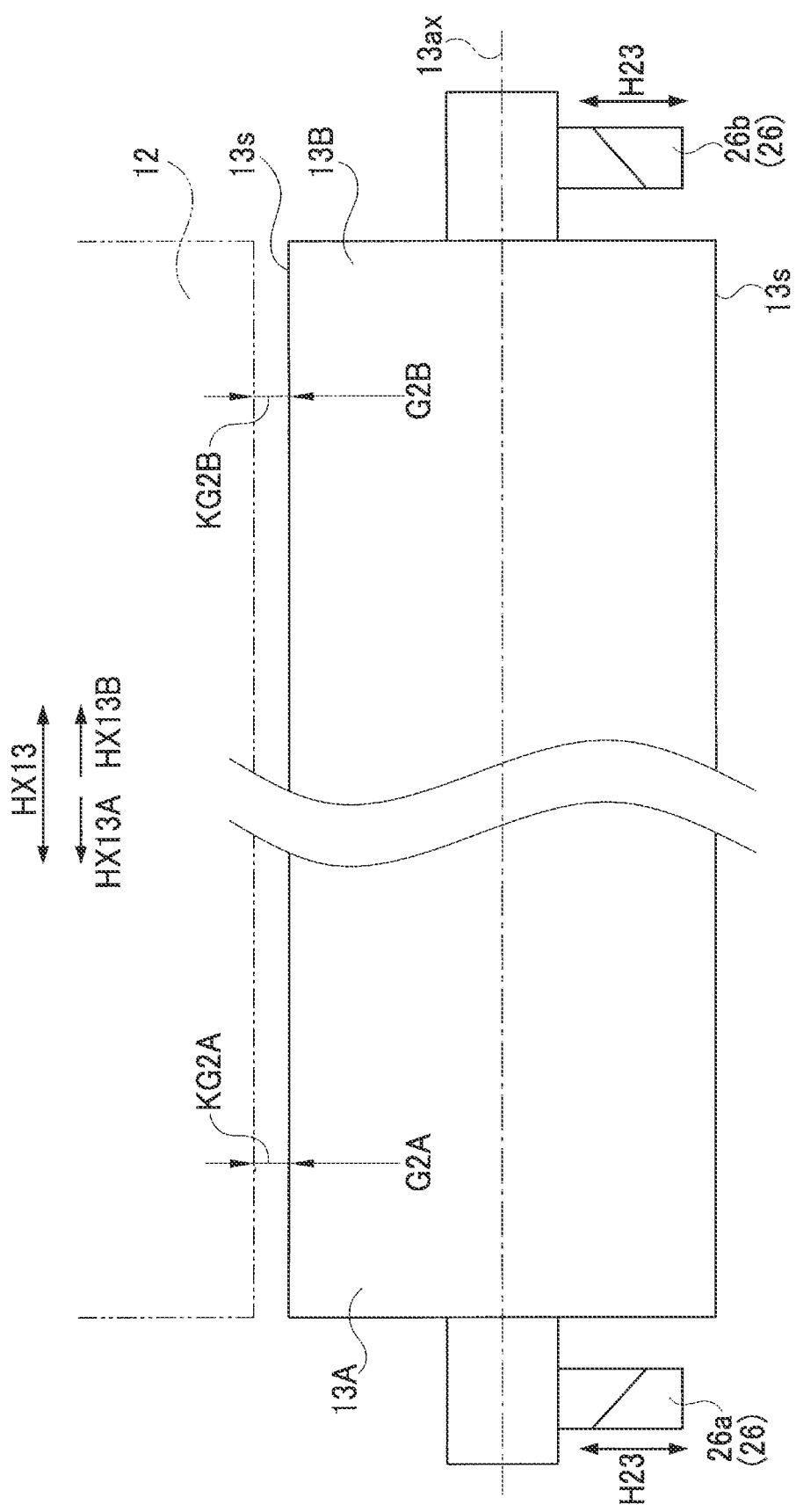
FIG. 8 relates to the embodiment and is an explanatory view illustrating the third roll and a pair of third-roll moving mechanisms configured to move a first end and a second end of the third roll in a second direction.

Further, as illustrated in FIG. 8, the coating applicator 10 of the present embodiment includes the third-roll moving mechanism 26 (26a, 26b) configured to move the third roll 13 in a second direction H23 (an up-down direction in FIGS. 8, 4). More specifically, the coating applicator 10 includes a first-side third-roll moving mechanism 26a configured to move, in the second direction H23, the first end 13A of the third roll 13 on the first side HX13A (a left side in FIG. 8) in the third-roll axis direction HX13 along the third-roll central axis 13ax. Further, the coating applicator 10 includes a second-side third-roll moving mechanism 26b configured to move, in the second direction H23, the second end 13B of the third roll 13 on the second side HX13B (a right side in FIG. 8) in the third-roll axis direction HX13.

Figure 12:
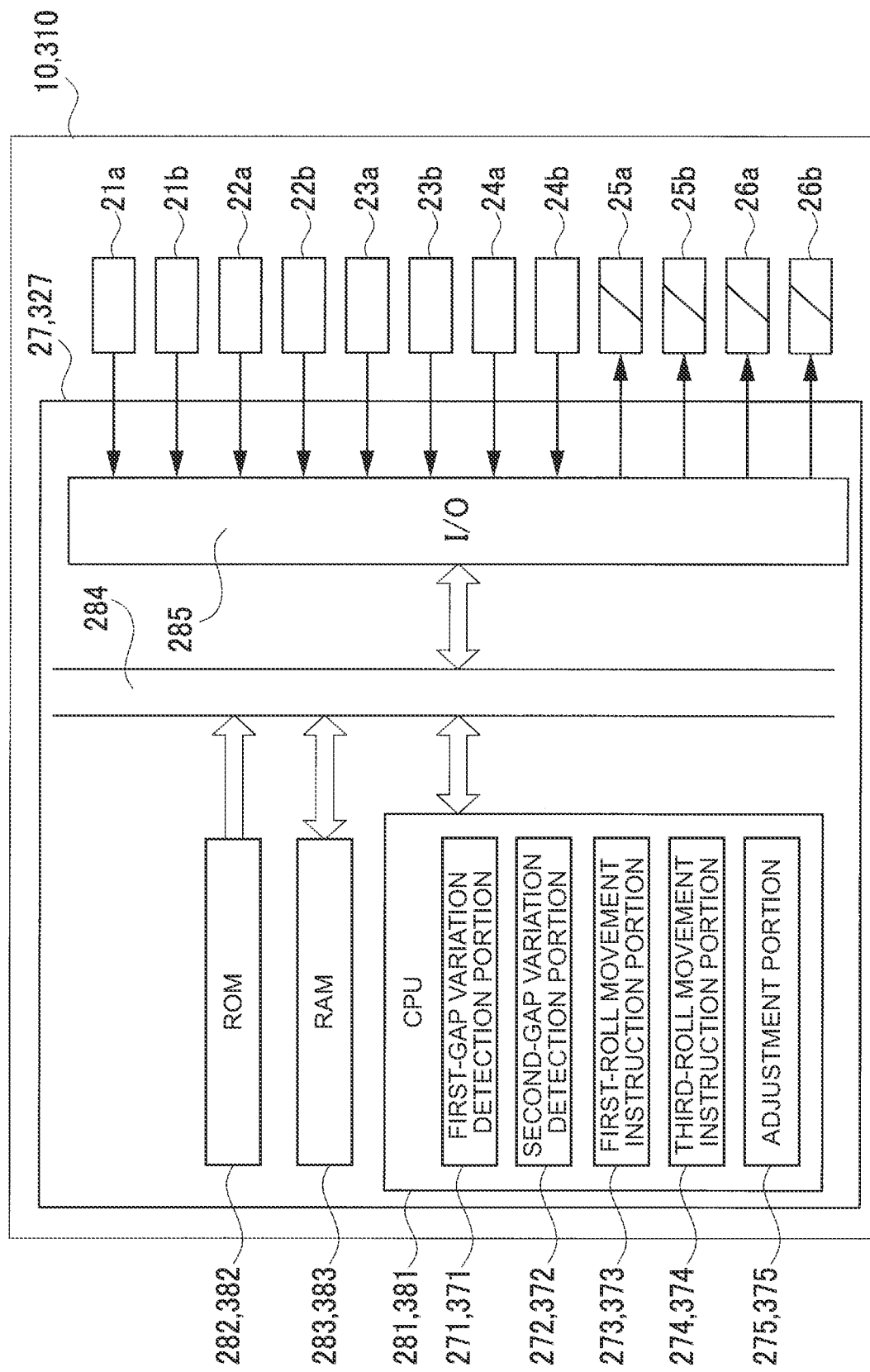
FIG. 12 relates to the embodiment and is an explanatory view illustrating a relationship among a controlling portion of the coating applicator, first to fourth sensors, and first-roll and third-roll moving mechanisms.

In the meantime, as illustrated in FIG. 12, the controlling portion 27 of the coating applicator 10 is a computer including a CPU (central processing unit) 281, a ROM 282 in which a predetermined program is stored, a RAM 283, an input-output circuit 285, and a bus 284 to which they are connected. The outputs from the sensors 21a, 21b to 24a, 24b are input into the bus 284, and the bus 284 sends outputs to instruct respective moving amounts to the roll moving mechanisms 25a to 26b. Further, in respective stages of the control, the CPU 281 functions as a first-gap variation detection portion 271, a second-gap variation detection portion 272, a first-roll movement instruction portion 273, a third-roll movement instruction portion 274, and an adjustment portion 275, which will be described later.

The coating applicator 10 of the present embodiment uses the first-side first-roll moving mechanism 25a to move the first end 11A of the first roll 11 in the first direction H21 so as to offset the variation amount $\Delta G1A$ of the gap dimension G1A in the first end KG1A of the first gap KG1, the variation amount $\Delta G1A$ being calculated as described above. Thus, the gap dimension G1A in the first end KG1A of the first gap KG1 is maintained generally constant. Similarly, the coating applicator 10 of the present embodiment uses the second-side first-roll moving mechanism 25b to move the second end 11B of the first roll 11 in the first direction H21 so as to offset the variation amount $\Delta G1B$ of the gap dimension G1B in the second end KG1B of the first gap KG1, the variation amount $\Delta G1B$ being calculated as described above. Thus, the gap dimension G1B in the second end KG1B of the first gap KG1 is also maintained generally constant. On this account, a variation in the gap dimension G1 of the first gap KG1, the variation being caused due to thermal expansion of the first roll 11 and the second roll 12, can be offset over the second-roll axis direction HX12 by the movement of the first roll 11 in the first direction H21, so that the gap dimension G1 of the first gap KG1 can be maintained generally constant, thereby making it possible to prevent accumulation of variations in the first gap KG1 due to the thermal expansion.

Further, the first-side third-roll moving mechanism 26a is used to move the first end 13A of the third roll 13 in the second direction H23 so as to offset the variation amount $\Delta G2A$ of the gap dimension G2A in the first end KG2A of the second gap KG2, the variation amount $\Delta G2A$ being calculated as described above. Thus, the gap dimension G2A in the first end KG2A of the second gap KG2 is maintained generally constant. Similarly, the second-side third-roll moving mechanism 26b is used to move the second end 13B of the third roll 13 in the second direction H23 so as to offset the variation amount $\Delta G2B$ of the gap dimension G2B in the second end KG2B of the second gap KG2, the variation amount ΔG2B being calculated as described above. Thus, the gap dimension G2B in the second end KG2B of the second gap KG2 is also maintained generally constant. On this account, a variation in the gap dimension G2 of the second gap KG2, the variation being caused due to thermal expansion of the second roll 12 and the third roll 13, can be offset over the third-roll axis direction HX13 by the movement of the third roll 13 in the second direction H23, so that the gap dimension G2 of the second gap KG2 can be maintained generally constant, thereby making it possible to prevent accumulation of variations in the second gap KG2 due to the thermal expansion.

More specifically, in an application step (see FIG. 2) in step S1 in which the wet active material layer 6 is applied onto the first surface 2s (2sa) of the current collector foil 2 supplied from the current collector foil roll 2RL so as to form the wet electrode plate 7, processes of the following steps S11 to S15 are performed (see FIG. 3). Note that, as described above, in the coating applicator 10 of the present embodiment, the sensors 21 to 24 and the roll moving mechanisms 25, 26 are provided in respective pairs on the first side and on the second side and similar steps are performed, so that the gap dimensions G1A, G1B on the first side and the second side of the first gap KG1 and the gap dimensions G2A, G2B on the first side and the second side of the second gap KG2 are independently maintained constant. In view of this, in order to avoid redundant descriptions, the following description is made without distinguishing the first side and the second side from each other.

First, in step S11, which is a detection step, a variation amount ΔG1 (ΔG1A, ΔG1B) of the gap dimension G1 of the first gap KG1 to be caused during a repeatedly provided detection period DT(n) due to thermal expansion caused in the first roll 11 and the second roll 12 is detected every detection period DT(n). Further, a variation amount ΔG2 (ΔG2A, ΔG2B) of the gap dimension G2 of the second gap KG2 to be caused during the detection period DT(n) due to thermal expansion caused in the second roll 12 and the third roll 13 is detected every detection period DT(n). Note that n is a natural number. Further, in the present embodiment, a length of the detection period DT(n) is a predetermined length, more specifically, one minute.

In the detection step (step S11), a process illustrated in FIG. 3 is performed. More specifically, first, a new detection period DT(n) is started in step S111. In step S112, a gap dimension G1 of a first gap KG1 at each time point including the beginning of the detection period DT(n) is calculated by use of the outputs (the first radial position PR5s and the second radial position PR12s) of the first sensor 21 and the second sensor 22, the outputs being input via the input-output circuit 285. Further, in step S113, a gap dimension G2 of a second gap KG2 at each time point including the beginning of the detection period DT(n) is calculated by use of the outputs (the third radial position PR6s and the fourth radial position PR2s) of the third sensor 23 and the fourth sensor, the outputs being input via the input-output circuit 285.

In step S114, it is determined whether the detection period DT(n) is finished or not, and when the detection period DT(n) is not finished (No), steps S112, S113 are repeated. When the detection period DT(n) is finished (Yes), the process proceeds to step S115.

In step S115, a variation amount ΔG1 (ΔG1A, ΔG1B) of the gap dimension G1 of the first gap KG1, caused during the detection period, is calculated by use of the gap dimensions G1 of the first gap KG1 at respective time points, the gap dimensions G1 being detected in step S112. More specifically, the variation amount ΔG1 is calculated from a gap dimension G1 detected at the beginning of the detection period DT(n) and a gap dimension G1 detected just before the end of the detection period DT(n). Further, in step S116, a variation amount ΔG2 (ΔG2A, ΔG2B) of the gap dimension G2 of the second gap KG2, caused during the detection period, is calculated by use of the gap dimensions G2 of the second gap KG2 at respective time points, the gap dimensions G2 being detected in step S113. More specifically, the variation amount ΔG2 is calculated from a gap dimension G2 detected at the beginning of the detection period DT(n) and a gap dimension G2 detected just before the end of the detection period DT(n).

Subsequently, in step S12 as a first-roll moving step, based on the variation amount ΔG1 of the gap dimension G1 of the first gap KG1, caused during the detection period DT(n) and detected in step S11 (step S115), the first-roll moving mechanism 25 is moved to offset this, and the process proceeds to step S14. Further, in parallel with step S12 described above, in step S13 as a third-roll moving step, based on the variation amount ΔG2 of the gap dimension G2 of the second gap KG2, detected in step S11 (step S116), the third-roll moving mechanism 26 is moved to offset this, and the process proceeds to step S14.

Further, in step S14 as an adjustment step, after a previous detection period DT(n) is finished, it is determined whether or not a second-roll ¼-rotation time TQ during which the second roll 12 makes a quarter turn has elapsed and a third-roll θ3-rotation time Tθ3 during which the third roll 13 rotates by a third angle θ3 has further elapsed after the movement of the first roll 11 by the first-roll moving mechanism 25 is completed and the movement of the third roll 13 by the third-roll moving mechanism 26 is completed. In a case where the third-roll θ3-rotation time Tθ3 has not elapsed (No in step S14), step S14 is repeated to wait until the time has elapsed. In the meantime, in a case of Yes in step S14, the process is returned to step S11 (S111) via step S15, and a new detection period DT(n+1) is started.

The reason why the adjustment step is provided is as follows. When the movement of the first roll 11 is completed, the gap dimension G1 of the first gap KG1 is set to a predetermined target dimension. Further, when the movement of the third roll 13 is completed, the gap dimension G2 of the second gap KG2 is set to a predetermined target dimension. However, in order that the second-roll coating film 5 (having a thickness TH5 of the target dimension) formed by the first gap KG1 changed in dimension reaches the second gap KG2, the second-roll ¼-rotation time TQ necessary for the second roll 12 to make a quarter turn is further required. In addition, in order that the third sensor can subsequently detect the wet active material layer 6 (having a thickness TH6 of the target dimension) formed by the second gap KG2 changed in dimension, the third-roll θ3-rotation time Tθ3 necessary for the third roll 13 to rotate by the third angle θ3 is further required to elapse. In the adjustment step (step S14), the process is returned to step S111 after the above times have elapsed, so as to start the new detection period DT(n+1). Accordingly, in the new detection period DT(n+1), variation amounts ΔG1, ΔG2 of the gap dimensions G1, G2 can be obtained by use of outputs of the first sensor 21 and the third sensor 23 from the beginning of the new detection period DT(n+1).

Note that, in the adjustment step (step S14), a timing to return to the detection step (step S11) to start the new detection period DT(n+1) is also after the movement of the first roll 11 by the first-roll moving mechanism 25 is completed and the second-roll coating film 5 (having the thickness TH5 of the target dimension) formed by the first gap KG1 changed in dimension can be detected by the first sensor 21, that is, after a second-roll θ1-rotation time Tθ1 during which the second roll 12 rotates by a first angle θ1 has elapsed.

Subsequently, in step S15, it is detected whether application of the wet active material layer 6 to the current collector foil 2 is finished or not. In a case where the application is not finished (No), the process returns to step S11 (step S111). In the meantime, in a case where the application is finished (Yes), step S1 (the application step) is finished so as to return to a main routine (see FIG. 2).

Note that, as described above, in a case where the active material layer 3 is provided on either surface of the current collector foil 2, in an application step in step S3, a wet active material layer 6 is applied onto the second surface (back surface) 2sb of the current collector foil 2 so as to form a wet electrode plate 7 by use of the coating applicator 10 again. Even in this case, steps similar to the above are performed, and further, a back-surface side is also dried in step S4.

Figure 13:
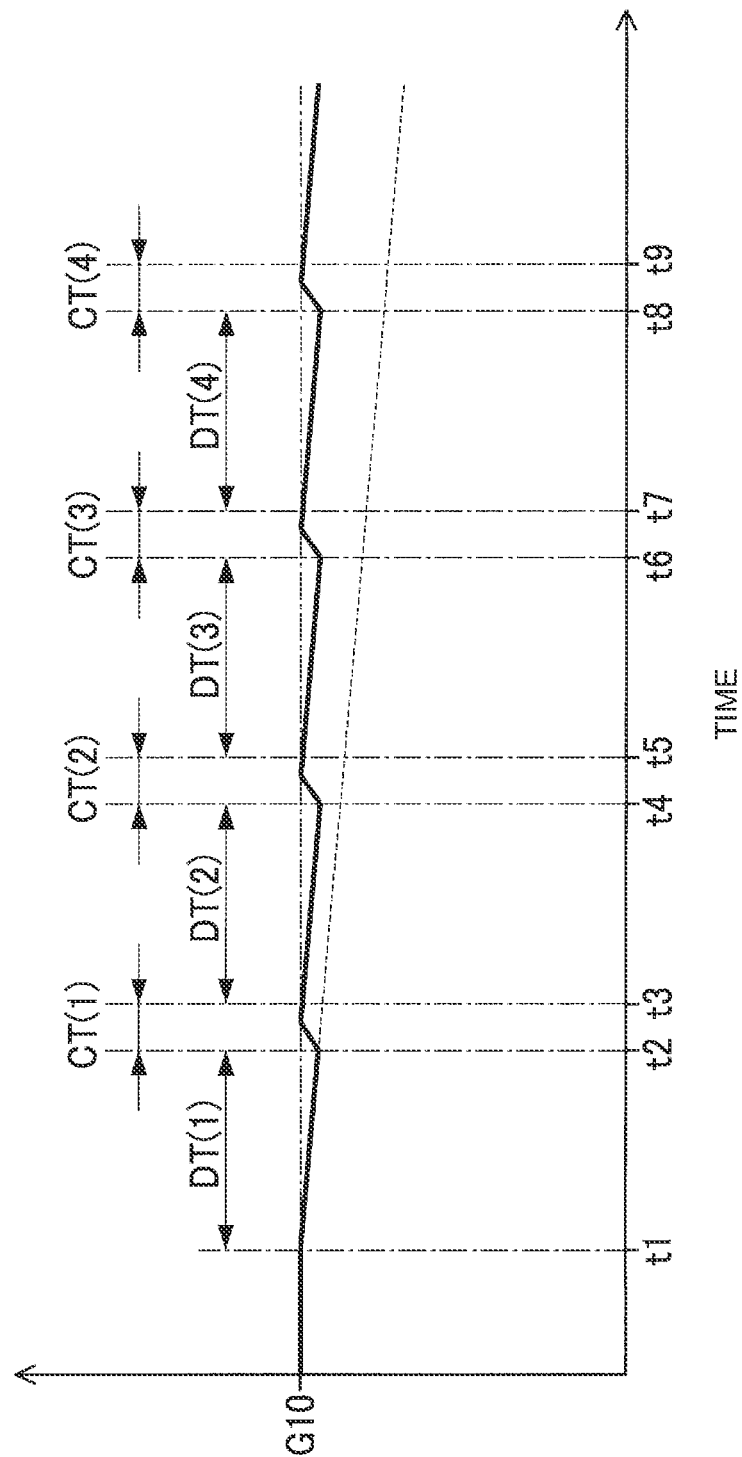
FIG. 13 relates to the embodiment and is a graph indicating a temporal variation of a gap dimension of a first gap: a continuous line indicates a case where variations due to thermal expansion of the first, second rolls are offset every detection period; and a broken line indicates a case where they are not offset.
Figure 14:
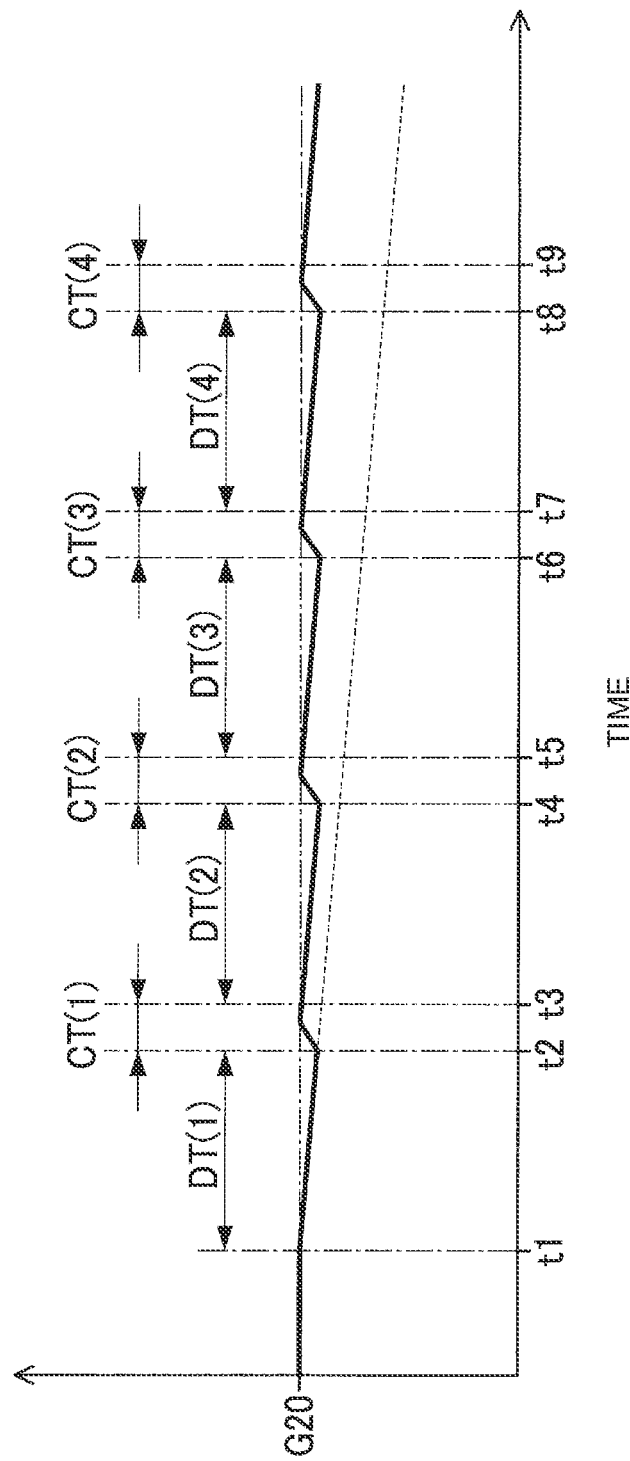
FIG. 14 relates to the embodiment and is a graph indicating a temporal variation of a gap dimension of a second gap: a continuous line indicates a case where variations due to thermal expansion of the second, third rolls are offset every detection period; and a broken line indicates a case where they are not offset.

Thus, the gap dimension G1 of the first gap KG1 can be maintained generally constant, thereby making it possible to prevent accumulation of variations in the first gap KG1 due to thermal expansion. Further, the gap dimension G2 of the second gap KG2 can be maintained generally constant, thereby making it possible to prevent accumulation of variations in the second gap KG2 due to thermal expansion. Details will be described below with reference to FIGS. 13, 14. FIG. 13 is a graph indicating a temporal variation of the gap dimension G1 of the first gap KG1. The gap dimension G1 of the first gap KG1 is a predetermined target gap dimension G10 at the beginning. The active material paste 4 is supplied to the first gap KG1, and a detection period DT(1) is started from a time t1. Further, FIG. 14 is a graph indicating a temporal variation of the gap dimension G2 of the second gap KG2. The gap dimension G2 of the second gap KG2 is a predetermined target gap dimension G20 at the beginning.

The first, second rolls 11, 12 thermally expand due to friction over time. On this account, as indicated by a broken line in FIG. 13, the gap dimension G1 of the first gap KG1 gradually decreases over time. That is, influence of the thermal expansion of the first, second rolls 11, 12 accumulates. As a result, the thickness TH5 of the second-roll coating film 5 formed on the second roll 12 also gradually decreases (becomes thinner) over time, which is unfavorable.

Further, the third roll 13 also thermally expand due to friction over time. On this account, as indicated by a broken line in FIG. 14, the gap dimension G2 of the second gap KG2 also gradually decreases over time. That is, influence of the thermal expansion of the second, third rolls 12, 13 accumulates. As a result, the thickness TH6 of the wet active material layer 6 formed on the current collector foil 2 also decreases (becomes thinner) over time, which is unfavorable.

In the meantime, in the coating applicator 10 of the present embodiment, the variation amount ΔG1 of the gap dimension G1 of the first gap KG1 is offset by use of the outputs of the first sensor 21 and the second sensor 22 every detection period DT(n), as mentioned earlier. When a predetermined time elapses from the time t1 and the detection period DT(1) is finished at a time t2, a variation amount ΔG1 is calculated and the first roll 11 is moved by use of the first-roll moving mechanism 25, so as to offset a variation in the gap dimension G1 of the first gap KG1. That is, as indicated by a continuous line in FIG. 13, the gap dimension G1 is restored to the target gap dimension G10 (G1=G10). Note that, the thermal expansion of the first, second rolls 11, 12 continues even after that, so the gap dimension G1 decreases again over time.

Further, in the coating applicator 10 of the present embodiment, the variation amount ΔG2 of the gap dimension G2 of the second gap KG2 is offset by use of the outputs of the third sensor 23 and the fourth sensor 24 every detection period DT(n). When a predetermined time elapses from the time t1 and the detection period DT(1) is finished at the time t2, a variation amount ΔG2 is calculated and the third roll 13 is moved by use of the third-roll moving mechanism 26, so as to offset a variation in the gap dimension G2 of the second gap KG2. That is, as indicated by a continuous line in FIG. 14, the gap dimension G2 is restored to a target gap dimension G20 (G2=G20). Note that the thermal expansion of the second, third rolls 12, 13 continues even after that, so the gap dimension G2 decreases again over time.

Then, as described above in terms of step S14 (see FIG. 3), a subsequent new detection period DT(2) is started at a time t3 after the second-roll ¼-rotation time TQ elapses and the third-roll θ3-rotation time Tθ3 further elapses after the movement of the first roll 11 by the first-roll moving mechanism 25 is finished and the movement of the third roll 13 by the third-roll moving mechanism 26 is finished. That is, as illustrated in FIGS. 13, 14, an adjustment period CT(1) is provided between two detection periods DT(1) and DT(2).

Similarly, after that, the detection period DT(n) and the adjustment period CT(n) are provided alternately, and the first roll 11 is moved to offset the variation amount ΔG1 of the gap dimension G1 of the first gap KG1 every detection period DT(n). Thus, in the coating applicator 10 of the present embodiment, as indicated by the continuous line in FIG. 13, the gap dimension G1 of the first gap KG1 is maintained at a generally uniform value close to the target gap dimension G10 at any time, thereby making it possible to prevent accumulation of variations in the first gap KG1 due to thermal expansion. This allows the thickness TH5 of the second-roll coating film 5 formed on the second roll 12 to be maintained at a generally uniform value.

Similarly, the third roll 13 is moved to offset the variation amount ΔG2 of the gap dimension G2 of the second gap KG2 every detection period DT(n). In the coating applicator 10 of the present embodiment, as indicated by the continuous line in FIG. 14, the gap dimension G2 of the second gap KG2 is maintained at a generally uniform value close to the target gap dimension G20 at any time, thereby making it possible to prevent accumulation of variations in the second gap KG2 due to thermal expansion. Thus, the thickness TH6 of the wet active material layer 6 formed on the current collector foil 2 can be maintained at a generally uniform value in terms of both a width direction WH and a longitudinal direction EH of the current collector foil 2. Hereby, a thickness of the active material layer 3 obtained by drying the wet active material layer 6 can be maintained generally constant in terms of both the width direction WH and the longitudinal direction EH of the current collector foil 2.

Note that, in the detection step (step S11), the CPU 281 that detects, every detection period DT(n), the variation amount ΔG1 of the gap dimension G1 of the first gap KG1 to be caused during the detection period DT(n) due to the thermal expansion of the first roll 11 and the second roll 12, by use of the first radial position PR5s on the coating film surface 5s of the second-roll coating film 5, detected by the first sensor 21, and the second radial position PR12s on the second-roll surface 12s, detected by the second sensor 22, corresponds to the first-gap variation detection portion 271.

Similarly, in the detection step (step S11), the CPU 281 that detects, every detection period DT(n), the variation amount ΔG2 of the gap dimension G2 of the second gap KG2 to be caused during the detection period DT(n) due to the thermal expansion of the second roll 12 and the third roll 13, by use of the third radial position PR6s on the layer surface 6s of the wet active material layer 6 (paste layer), detected by the third sensor 23, and the fourth radial position PR2s on the radially outer surface 2sa of the current collector foil 2, detected by the fourth sensor 24, corresponds to the second-gap variation detection portion 272.

Further, the CPU 281 that instructs the first-roll moving mechanism 25 to move the first roll 11 in the first direction H21 so as to offset the variation amount ΔG1 of the first gap KG1, detected by the first-gap variation detection portion 271, corresponds to the first-roll movement instruction portion 273.

Similarly, the CPU 281 that instructs the third-roll moving mechanism 26 to move the third roll 13 in the second direction H23 so as to offset the variation amount ΔG2 of the second gap KG2, detected by the second-gap variation detection portion 272, corresponds to the third-roll movement instruction portion 274.

Further, the CPU 281 that starts a new detection period DT(n+1) after the second-roll ¼-rotation time TQ elapses and the third-roll θ3-rotation time Tθ3 further elapses after a previous detection period DT(n) is finished and after the movement of the first roll 11 by the first-roll moving mechanism 25 is finished and the movement of the third roll 13 by the third-roll moving mechanism 26 is finished corresponds to the adjustment portion 275. Note that the adjustment portion 275 of the present embodiment starts the new detection period DT(n+1) after the movement of the first roll 11 by the first-roll moving mechanism 25 is finished, and then, the second-roll θ1-rotation time Tθ1 during which the second roll 12 rotates by the first angle θ1 elapses after the previous detection period DT(n) is finished.

(Modification 1)

Next will be described a coating applicator 110 according to Modification 1 of the above embodiment and manufacture of a wet electrode plate 7 by use of this, with reference to FIG. 15. In the coating applicator 10 of the above embodiment, the fourth sensor 24 (24a, 24b) detects the fourth radial position PR2s on the radially outer surface 2sa of the current collector foil 2 wound around the third roll 13 (see FIG. 4). In this regard, as illustrated in FIG. 15, the coating applicator 110 of Modification 1 is different from the above only in a winding form of a current collector foil 2 around a third roll 13 and in that a fourth radial position PR13s on a third-roll surface 13s of the third roll 13 is detected by a fourth sensor 24 (24a, 24b).

Figure 15:
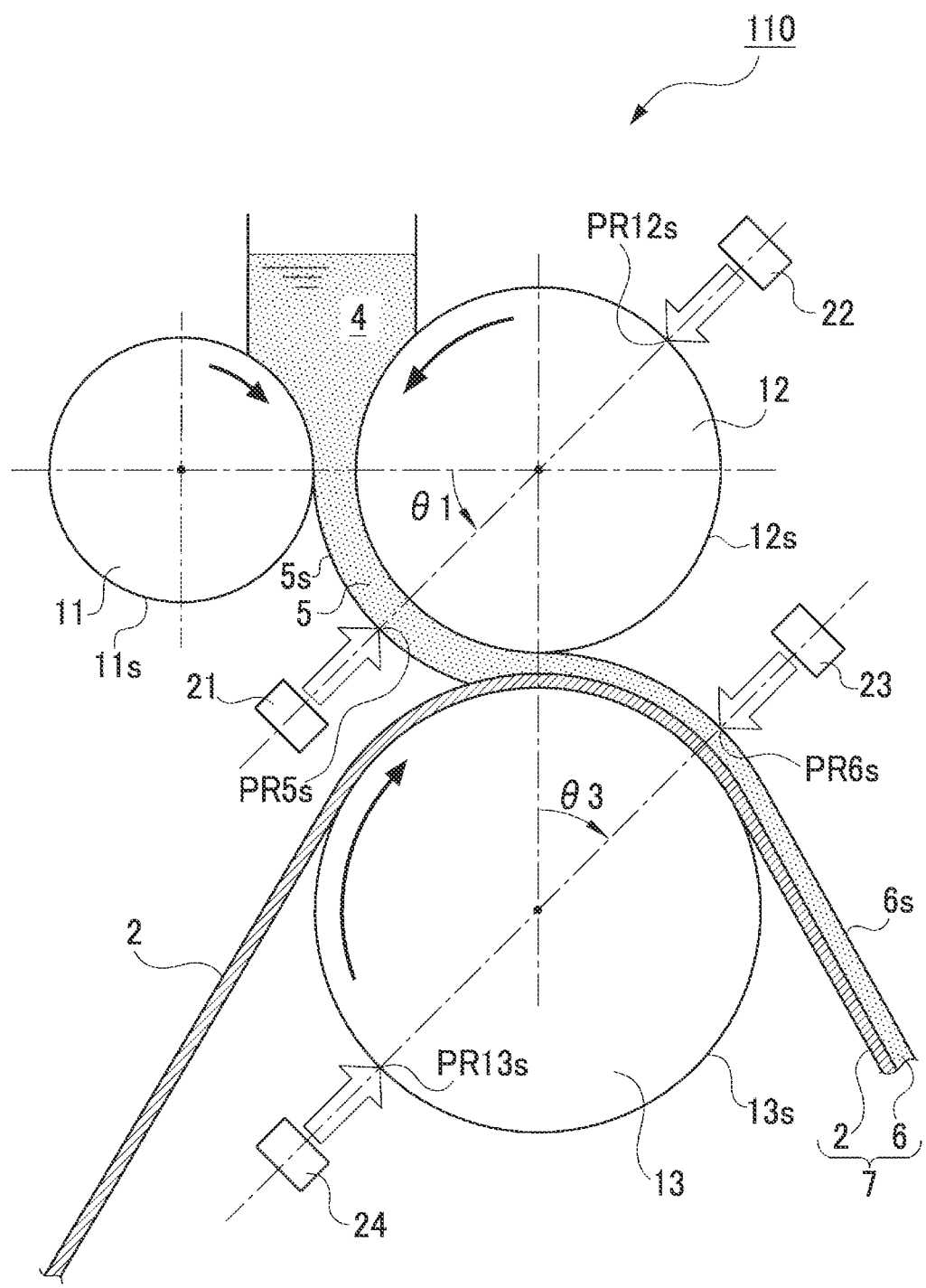
FIG. 15 relates to Modification 1 and is an explanatory view illustrating a coating applicator including three rolls and how to manufacture a wet electrode plate by use of this.

As is easily understood from FIG. 15, in the coating applicator 110 of Modification 1, a variation amount ΔPR13s caused during a given detection period at the fourth radial position PR13s on the third-roll surface 13s of the third roll 13, the fourth radial position PR13s being detected by the fourth sensor 24, is equal to a variation amount ΔR3 of a radius R3 of the third roll 13, caused during the detection period (ΔPR13s=ΔR3). This can be considered in the same manner as the above embodiment in which the variation amount ΔPR2s caused during a given detection period at the fourth radial position PR2s on the radially outer surface 2sa of the current collector foil 2, the fourth radial position PR2s being detected by the fourth sensor 24, is equal to a variation amount ΔR3 of the radius R3 of the third roll 13, caused during the detection period.

Accordingly, a variation amount ΔG2 of a gap dimension G2 of a second gap KG2, caused during the detection period, can be calculated by use of outputs of a third sensor 23 and the fourth sensor 24. More specifically, similarly to the above embodiment, ΔG2=−(ΔR2+ΔR3)=ΔPR6s−ΔPR13s is established, and therefore, it is found that the variation amount ΔG2 of the gap dimension G2 can be obtained from a difference (ΔPR6s−ΔPR13s) between the variation amount ΔPR6s obtained from the output of the third sensor 23 and the variation amount ΔPR13s obtained from the output of the fourth sensor 24. After that, the coating applicator 110 of Modification 1 operates similarly to the coating applicator 10 of the above embodiment.

Accordingly, in the coating applicator 110 of Modification 1, the variation amount ΔG2 of the gap dimension G2 is obtained by use of outputs of the third sensor 23 and the fourth sensor 24, and the third roll 13 is moved to offset the variation amount ΔG2 of the gap dimension G2 of the second gap KG2 every detection period DT(n). This can prevent accumulation of variations in the second gap KG2 due to thermal expansion. Hereby, a thickness TH6 of a wet active material layer 6 formed on the current collector foil 2 can be maintained generally constant in terms of both a width direction WH and a longitudinal direction EH of the current collector foil 2. Further, a thickness of an active material layer 3 obtained by drying the wet active material layer 6 can be maintained generally constant in terms of both the width direction WH and the longitudinal direction EH of the current collector foil 2.

(Modification 2)

Next will be described a coating applicator 310 according to Modification 2 and a manufacturing method of a wet electrode plate 7 by use of this. The coating applicator 310 of Modification 2 is different from the coating applicator 10 of the embodiment in a controlling portion, but other configurations are the same. Further, the manufacturing method of the wet electrode plate 7 of Modification 2 is different from the above embodiment in a detection step, but other steps are the same. Accordingly, points different from the embodiment will be mainly described here, and descriptions about similar points will be omitted or simplified.

Similarly to the embodiment, the coating applicator 310 of Modification 2 includes a first roll 11, a second roll 12, a third roll 13, a first sensor 21 (21a, 21b) to a fourth sensor 24 (24a, 24b), a first-roll moving mechanism 25 (25a, 25b), and a third-roll moving mechanism 26 (26a, 26b). Further, the coating applicator 310 of Modification 2 includes a controlling portion 327, which is different from the embodiment (see FIGS. 1, 12, and 16). The controlling portion 327 is a computer including a CPU (central processing unit) 381, a ROM 382 in which a predetermined program is stored, a RAM 383, an input-output circuit 285, and a bus 284 to which they are connected. In respective stages of the control, the CPU 381 functions as a first-gap variation detection portion 371, a second-gap variation detection portion 372, a first-roll movement instruction portion 373, a third-roll movement instruction portion 374, and an adjustment portion 375 (see FIG. 12).

Note that, similarly to the embodiment, in Modification 2, an application material, which is an application material obtained by mixing active material particles as a solute, a binder, and a solvent and which is made of a plurality of wet granulated bodies, is used as an active material paste 4. Here, the wet granulated body is a substance (granular material) in which a solvent is maintained (absorbed) by solute particles and the solute particles are aggregated (bonded). The wet granulated bodies constituting the active material paste 4 are obtained by mixing and granulating the active material particles, the binder, and the solvent. The wet granulated body is a substance (granular material) in which the solvent is maintained (absorbed) by the active material particles and the binder and they are aggregated (bonded).

Further, in Modification 2, "a preinitiation radial position, which is a second radial position PR12s (PR12sa and PR12sb) on a second-roll surface 12s at a first angle position AG1 and measured in advance by the first sensor 21 (a first-side first sensor 21a and a second-side first sensor 21b) before starting of manufacture of an electrode plate 1" is set to a measurement reference position (zero reference) for the first sensor 21 (the first-side first sensor 21a and the second-side first sensor 21b). Further, "a preinitiation radial position, which is a second radial position PR12s (PR12sa and PR12sb) on the second-roll surface 12s at a second angle position AG2 and measured in advance by the second sensor 22 (a first-side second sensor 22a and a second-side second sensor 22b) before starting of manufacture of the electrode plate 1" is set to a measurement reference position (zero reference) for the second sensor 22 (the first-side second sensor 22a and the second-side second sensor 22b) (see FIG. 16).

Further, in Modification 2, "a preinitiation radial position, which is a third radial position PR6s (PR6sa and PR6sb) of a third-roll surface 13s at a third angle position ΔG3 and measured in advance by the third sensor 23 (a first-side third sensor 23a and a second-side third sensor 23b) before starting of manufacture of the electrode plate 1" is set to a measurement reference position (zero reference) for the third sensor 23 (the first-side third sensor 23a and the second-side third sensor 23b). Furthermore, "a preinitiation radial position, which is a third-roll radial position PR13s (PR13sa and PR13sb) on the third-roll surface 13s at a fourth angle position AG4 and measured in advance by the fourth sensor 24 (a first-side fourth sensor 24a and a second-side fourth sensor 24b) before starting of manufacture of the electrode plate 1" is set to a measurement reference position (zero reference) for the fourth sensor 24 (the first-side fourth sensor 24a and the second-side fourth sensor 24b) (see FIG. 16).

In the meantime, when supply of the active material paste 4 to a first gap KG1 is started to start machining of compressing and depositing the active material paste 4 (forming a coating film) between the first roll 11 and the second roll 12, a machining reaction force (a reaction force to a compressive force applied to the active material paste 4 at the time of compressing and depositing the active material paste 4 between the first roll 11 and the second roll 12) is applied to the first roll 11 and the second roll 12. Right after the machining starts, a large machining reaction force is suddenly applied to the first roll 11 and the second roll 12. Accordingly, the first roll 11 and the second roll 12 might move in a first direction H21 (a right-left direction in FIG. 16) due to the machining reaction force, so that a gap dimension G1 of the first gap KG1 between the first roll 11 and the second roll 12 increases.

More specifically, a central axis 11ax of the first roll 11 might be displaced in a direction (a left direction in FIG. 16) to be distanced from the second roll 12, and a central axis 12ax of the second roll 12 might be displaced in a direction (a right direction in FIG. 16) to be distanced from the first roll 11. Particularly, in a case where an application material made of wet granulated bodies having a high solid fraction (with a small solvent amount) is used as the active material paste 4, a machining reaction force is large, which easily causes the displacements of the first roll 11 and the second roll 12. This results in that the gap dimension G1 of the first gap KG1 between the first roll 11 and the second roll 12 changes.

Further, soon after the start of the machining of compressing and depositing the active material paste 4 between the first roll 11 and the second roll 12, the first roll and the second roll thermally expand due to frictional heat generated near the first gap. Particularly, in a case where an application material made of wet granulated bodies having a high solid fraction (with a small solvent amount) is used as the active material paste 4, a generation amount of frictional heat is large, which easily causes thermal expansion of the first roll 11 and the second roll 12. This thermal expansion also changes the gap dimension G1 of the first gap KG1 between the first roll 11 and the second roll 12.

Further, most of the displacements of the first roll 11 and the second roll due to the machining reaction force occur right after the start of the processing (e.g., until the second roll 12 rotates once from the start of the processing), and after that, the displacements do not occur about the time when thermal expansion of the first roll 11 and the second roll 12 occurs (e.g., at the when the number of rotations of the second roll 12 exceeds 30 from the start of the processing) (even if the displacements occur, they can be ignored). Accordingly, it can be considered that, after the gap dimension G1 of the first gap KG1 changes along with the displacements of the first roll 11 and the second roll 12 due to the machining reaction force, the gap dimension G1 of the first gap KG1 changes along with the thermal expansion of the first roll 11 and the second roll 12.

In view of this, in Modification 2, a gap dimension G1 of the first gap KG1 after the gap dimension G1 of the first gap KG1 changes along with the displacements of the first roll 11 and the second roll 12 due to the machining reaction force (before the thermal expansion of the first roll 11 and the second roll 12 starts) is assumed a target gap dimension G1 (a first-gap target value G1T) of the first gap KG1, and after that, a variation amount of the gap dimension G1 of the first gap KG1, the variation amount being changed from the first-gap target value G1T due to the thermal expansion of the first roll 11 and the second roll 12 during the detection period DT(n), is calculated as a variation amount ΔG1. Then, the first roll 11 is moved by the first-roll moving mechanism 25 so as to offset the variation amount ΔG1, so that the gap dimension G1 of the first gap KG1 is adjusted to the first-gap target value G1T.

That is, in Modification 2, the gap dimension G1 after the gap dimension G1 of the first gap KG1 changes along with the displacements of the first roll 11 and the second roll 12 due to the machining reaction force (before the first roll 11 and the second roll 12 thermally expand) is assumed an adjustment target value (the first-gap target value G1T) of the gap dimension G1, and during the manufacture, a feedback control is performed so that the gap dimension G1 of the first gap KG1 is adjusted to the first-gap target value G1T. With such a configuration, a thickness TH5 of a coating film (a second-roll coating film 5) to be formed through between the first roll 11 and the second roll 12 can be adjusted to the first-gap target value G1T or a dimension close to this over an entire manufacture period.

Further, the description made above also applies to a gap dimension G2 of a second gap KG2. Accordingly, in Modification 2, a gap dimension G2 of the second gap KG2 after the gap dimension G2 of the second gap KG2 changes along with displacements of the second roll 12 and the third roll 13 due to a machining reaction force (before thermal expansion of the second roll 12 and the third roll 13 starts) is assumed a target gap dimension G2 (a second-gap target value G2T) of the second gap KG2, and a variation amount of the gap dimension G2 of the second gap KG2, the variation amount being changed from the second-gap target value G2T due to the thermal expansion of the second roll 12 and the third roll 13 during a detection period DT(n), is calculated as a variation amount ΔG2. The third roll 13 is moved by the third-roll moving mechanism 26 so as to offset the variation amount ΔG2, so that the gap dimension G2 of the second gap KG2 is adjusted to the second-gap target value G2T.

That is, in Modification 2, the gap dimension G2 of the second gap KG2 after the second gap KG2 changes along with the displacements of the second roll 12 and the third roll 13 due to the machining reaction force (before the second roll 12 and the third roll 13 thermally expand) is assumed an adjustment target value (the second-gap target value G2T) of the gap dimension G2, and during the manufacture, a feedback control is performed so that the gap dimension G2 of the second gap KG2 is adjusted to the second-gap target value G2T. With such a configuration, a thickness TH7 of a paste-layer-attached sheet (a wet electrode plate 7) to be formed through between the second roll 12 and the third roll 13 can be adjusted to the second-gap target value G2T or a dimension close to this over the entire manufacture period. Accordingly, over the entire manufacture period, a thickness TH6 of a paste layer (a wet active material layer 6) can be adjusted to a dimension (TH6=G2T−TH2) obtained by subtracting a thickness TH2 of a substrate sheet (the current collector foil 2) from the second-gap target value G2T, or a dimension close to this.

Figure 17:
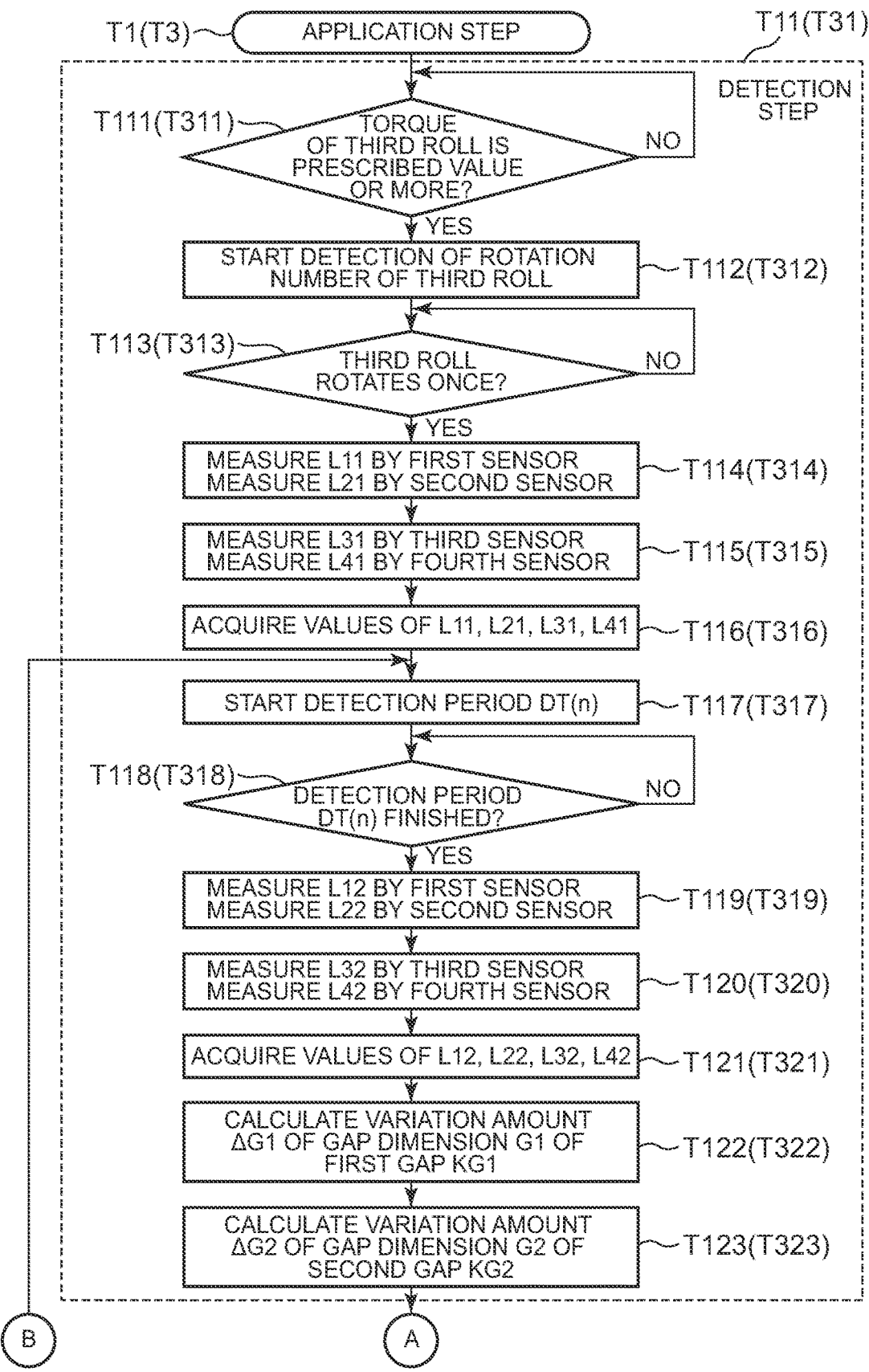
FIG. 17 is a part of a flowchart illustrating a content of an application step according to Modification 2.

Here, a manufacturing method of an electrode plate according to Modification 2 will be described. First, as illustrated in FIGS. 1 and 2, in a step T1 (an application step), a wet active material layer 6 is applied onto a first surface 2s (2sa) of a current collector foil 2 supplied from a current collector foil roll 2RL so as to form a wet electrode plate 7. More specifically, when supply of an active material paste 4 to the first gap KG1 is started, a process (see FIG. 17) of step T11 (a detection step) is performed first. More specifically, as illustrated in FIG. 17, first, in step T111, the second-gap variation detection portion 372 determines whether or not a rotating torque of the third roll 13 reaches a prescribed value or more. Note that, the rotating torque of the third roll 13 is measured by a torque sensor (not shown), and the second-gap variation detection portion 372 acquires this measured value and determines whether not the measured value is the prescribed value or more.

Here, the prescribed value of the rotating torque of the third roll 13 is set to a value between a value of a rotating torque at the time when the second-roll coating film 5 and the wet active material layer 6 are not provided in the second gap KG2 (an idling state) and a value of a rotating torque at the time when a tip end of the second-roll coating film 5 reaches (enters) the second gap KG2. Accordingly, when the rotating torque of the third roll 13 reaches the prescribed value or more, it can be determined that the tip end of the second-roll coating film 5 reaches (enters) the second gap KG2.

When it is determined that the rotating torque of the third roll 13 reaches the prescribed value or more (Yes) in step T111, the process proceeds to step T112, in which the second-gap variation detection portion 372 starts detection of the number of rotations of the third roll 13. Note that the number of rotations of the third roll 13 is acquired by measuring the number of rotations of a motor 47 (see FIG. 20) for driving the third roll 13 to rotate. Then, the process proceeds to step T113, in which it is determined whether or not the third roll 13 rotates once after the detection of the number of rotations of the third roll 13 is started (that is, after a tip end of the wet active material layer 6 reaches the second gap KG2).

Note that a time when the third roll 13 rotates once after the rotating torque of the third roll 13 reaches the prescribed value or more from the start of the supply of the active material paste 4 to the first gap KG1 is "after the second roll 12 rotates by a first angle θ1 or more, but before the second roll 12 makes a predetermined number of rotations, counting from the start of the supply of the active material paste 4 to the first gap KG1" and also "after the third roll 13 rotates by a third angle θ3 or more, but before the third roll 13 makes a predetermined number of rotations, counting from a time when the second-roll coating film 5 first reaches the second gap KG2."

Then, when it is determined that the third roll 13 rotates once (Yes), the process proceeds to step T114, in which second-roll radial positions L11 and L21 are measured by the first sensor 21 and the second sensor 22 based on a command from the first-gap variation detection portion 371. Further, the process proceeds to step T115, in which third-roll radial positions L31 and L41 are measured by the third sensor 23 and the fourth sensor 24 based on a command from the second-gap variation detection portion 372.

More specifically, a second-roll radial position L11 on a coating film surface 5s based on the above preinitiation radial position as a reference position (zero reference) (in other words, a second-roll radial distance on the coating film surface 5s from the preinitiation radial position as the reference position) is measured as a first radial position PR5s (PR5sa and PR5sb) on the coating film surface 5s of the second-roll coating film 5 by the first sensor 21 (the first-side first sensor 21a and the second-side first sensor 21b). Note that a measured value by the first-side first sensor 21a is assumed L11A, and a measured value by the second-side first sensor 21b is assumed L11B.

Further, a second-roll radial position L21 on the second-roll surface 12s based on the above preinitiation radial position as a reference position (zero reference) (in other words, a second-roll radial distance on the second-roll surface 12s from the preinitiation radial position as the reference position) is measured as a second radial position PR12s on the second-roll surface 12s of the second roll 12 by the second sensor 22 (the first-side second sensor 22a and the second-side second sensor 22b). Note that a measured value by the first-side second sensor 22a is assumed L21A, and a measured value by the second-side second sensor 22b is assumed L21B.

Further, a third-roll radial position L31 on a layer surface 6s of the wet active material layer 6 based on the above preinitiation radial position as a reference position (zero reference) (in other words, a third-roll radial distance on the layer surface 6s from the preinitiation radial position as the reference position) is measured as a third radial position PR6s on the layer surface 6s of the wet active material layer 6 (paste layer) by the third sensor 23 (the first-side third sensor 23a and the second-side third sensor 23b). Note that a measured value by the first-side third sensor 23a is assumed L31A, and a measured value by the second-side third sensor 23b is assumed L31B.

Further, a third-roll radial position L41 on a radially outer surface 2sa of the current collector foil 2 based on the above preinitiation radial position as a reference position (zero reference) (in other words, a third-roll radial distance on the radially outer surface 2sa from the preinitiation radial position as the reference position) is measured as a fourth radial position PR2s on the radially outer surface 2sa of the current collector foil 2 (substrate sheet) by the fourth sensor 24 (the first-side fourth sensor 24a and the second-side fourth sensor 24b). Note that a measured value by the first-side fourth sensor 24a is assumed L41A, and a measured value by the second-side fourth sensor 24b is assumed L41B.

Here, a time when the rotating torque of the third roll 13 reaches the prescribed value or more after the supply of the active material paste 4 to the first gap KG1 is started is a time when the tip end of the second-roll coating film 5 enters the second gap KG2 between the second roll 12 and the third roll 13. At this time, machining of compressing the second-roll coating film 5 between the second roll 12 and the third roll 13 so as to form the wet active material layer 6 on the radially outer surface 2sa of the current collector foil 2 is started, and its machining reaction force is applied to the second roll 12 and the third roll 13. The machining reaction force causes displacements of the second roll 12 and the third roll 13, thereby changing (increasing) the gap dimension G2 of the second gap KG2. Further, at this time, machining of compressing and depositing the active material paste 4 between the first roll 11 and the second roll 12 (forming the second-roll coating film 5) has been already started, and its machining reaction force causes displacements of the first roll 11 and the second roll 12, thereby changing (increasing) the gap dimension G1 of the first gap KG1.

Further, when the third roll 13 rotates once after the rotating torque of the third roll 13 reaches the prescribed value or more, counting from the start of the supply of the active material paste 4 to the first gap KG1, thermal expansion has not occurred in the first roll 11, the second roll 12, and the third roll 13, or even if thermal expansion occurs, an expansion amount is very small, which can be ignored.

Accordingly, values of L11 measured by the first sensor 21 and L21 measured by the second sensor 22 are measured values after the gap dimension G1 of the first gap KG1 changes along with the displacements of the first roll 11 and the second roll 12 due to the machining reaction force, but before the first roll 11 and the second roll 12 thermally expand (or when an expansion amount is very small so the expansion amount can be ignored even if thermal expansion occurs).

Further, values of L31 measured by the third sensor 23 and L41 measured by the fourth sensor 24 are measured values after the gap dimension G2 of the second gap KG2 changes along with the displacements of the second roll 12 and the third roll 13 due to the machining reaction force, but before the second roll 12 and the third roll 13 thermally expand (or when an expansion amount is very small so the expansion amount can be ignored even if thermal expansion occurs).

Then, the process proceeds to step T116, in which the values of L11 and L21 are acquired by the first-gap variation detection portion 371, and the values of L31 and L41 are acquired by the second-gap variation detection portion 372. Then, the process proceeds to step T117, in which a detection period DT(n) with a predetermined length (e.g., one minute) is started. After that, the process proceeds to step T118, in which it is determined whether or not the detection period DT(n) is finished.

When it is determined that the detection period DT(n) is finished in step T118 (Yes), the process proceeds to step T119, in which second-roll radial positions L12 and L22 are measured by the first sensor 21 and the second sensor 22 at the end of the detection period DT(n) based on a command from the first-gap variation detection portion 371. Further, in step T120, third-roll radial positions L32 and L42 are measured by the third sensor 23 and the fourth sensor 24 at the end of the detection period DT(n) based on a command from the second-gap variation detection portion 372.

More specifically, a second-roll radial position L12 on the coating film surface 5s based on the above preinitiation radial position as a reference position (zero reference) (in other words, a second-roll radial distance on the coating film surface 5s from the preinitiation radial position as the reference position) is measured as a first radial position PR5s (PR5sa and PR5sb) on the coating film surface 5s of the second-roll coating film 5 by the first sensor 21 (the first-side first sensor 21a and the second-side first sensor 21b). Note that a measured value by the first-side first sensor 21a is assumed L12A, and a measured value by the second-side first sensor 21b is assumed L12B.

Further, a second-roll radial position L22 on the second-roll surface 12s based on the above preinitiation radial position as a reference position (zero reference) (in other words, a second-roll radial distance on the second-roll surface 12s from the preinitiation radial position as the reference position) is measured as a second radial position PR12s on the second-roll surface 12s of the second roll 12 by the second sensor 22 (the first-side second sensor 22a and the second-side second sensor 22b). Note that a measured value by the first-side second sensor 22a is assumed L22A, and a measured value by the second-side second sensor 22b is assumed L22B.

Further, a third-roll radial position L32 on the layer surface 6s of the wet active material layer 6 based on the above preinitiation radial position as a reference position (zero reference) (in other words, a third-roll radial distance on the layer surface 6s from the preinitiation radial position as the reference position) is measured as a third radial position PR6s on the layer surface 6s of the wet active material layer 6 (paste layer) by the third sensor 23 (the first-side third sensor 23a and the second-side third sensor 23b). Note that a measured value by the first-side third sensor 23a is assumed L32A, and a measured value by the second-side third sensor 23b is assumed L32B.

Further, a third-roll radial position L42 on the radially outer surface 2sa of the current collector foil 2 based on the above preinitiation radial position as a reference position (zero reference) (in other words, a third-roll radial distance on the radially outer surface 2sa from the preinitiation radial position as the reference position) is measured as a fourth radial position PR2s on the radially outer surface 2sa of the current collector foil 2 (substrate sheet) by the fourth sensor 24 (the first-side fourth sensor 24a and the second-side fourth sensor 24b). Note that a measured value by the first-side fourth sensor 24a is assumed L42A, and a measured value by the second-side fourth sensor 24b is assumed L42B.

Note that, at the end of the detection period DT(n), that is, at the time of the measurement of L12, L22, L32, L42, it is considered that the first roll 11, the second roll 12, and the third roll 13 thermally expand to no small extent. Accordingly, a value of L12 measured by the first sensor 21 and a value of L22 measured by the second sensor 22 are values measured after the gap dimension G1 of the first gap KG1 changes along with the displacements of the first roll 11 and the second roll 12 due to the machining reaction force and after the first roll 11 and the second roll 12 thermally expand. Further, a value of L32 measured by the third sensor 23 and a value of L42 measured by the fourth sensor 24 are values measured after the gap dimension G2 of the second gap KG2 changes along with the displacements of the second roll 12 and the third roll 13 due to the machining reaction force and after the second roll 12 and the third roll 13 thermally expand.

Subsequently, the process proceeds to step T121, in which the values of L12 and L22 are acquired by the first-gap variation detection portion 371, and the values of L32 and L42 are acquired by the second-gap variation detection portion 372. After that, in step T122 (a variation amount $\Delta G1$ calculation step), a variation amount $\Delta G1$ of the gap dimension G1 of the first gap KG1, caused due to the thermal expansion during the detection period DT(n), is calculated by the first-gap variation detection portion 371. More specifically, as the variation amount $\Delta G1$, a variation amount $\Delta G1A$ of a gap dimension G1A of a first end KG1A of the first gap KG1 and a variation amount $\Delta G1B$ of a gap dimension G1B of a second end KG1B of the first gap KG1 are calculated.

Note that, in Modification 2, the calculation is performed by use of a relational expression of $\Delta G1=(L12-L22)-(L11-L21)$. More specifically, the variation amount $\Delta G1A$ of the gap dimension G1A of the first end KG1A of the first gap KG1 is calculated by use of a relational expression of $\Delta G1A=(L12A-L22A)-(L11A-L21A)$. Further, the variation amount $\Delta G1B$ of the gap dimension G1B of the second end KG1B of the first gap KG1 is calculated by use of a relational expression of $\Delta G1B=(L12B-L22B)-(L11B-L21B)$.

Note that the relational expressions are derived as follows. First, a setting value of the gap dimension G1 of the first gap KG1 (a gap dimension G1 of the first gap KG1 before the manufacture of the electrode plate 1 is started) is assumed G1S. Further, a displacement amount of the first roll 11 moved (displaced) in the first direction H21 due to the machining reaction force is assumed $\Delta X1$ (see FIG. 16). More specifically, a displacement amount of the first end 11A of the first roll 11 is assumed $\Delta X1A$, and a displacement amount of the second end 11B is assumed $\Delta X1B$. Further, an increasing amount of the radius R1 of the first roll 11 due to thermal expansion is assumed $\Delta R1$ (see FIG. 9). More specifically, an increasing amount in the first end 11A of the first roll 11 is assumed $\Delta R1A$, and an increasing amount in the second end 11B is assumed $\Delta R1B$.

Further, a displacement amount of the second roll 12 moved (displaced) in the first direction H21 due to the machining reaction force is assumed $\Delta X2$. More specifically, a displacement amount of the first end 12A of the second roll 12 is assumed $\Delta X2A$, and a displacement amount of the second end 12B is assumed $\Delta X2B$. Further, a displacement amount of the second roll 12 moved (displaced) in the second direction H23 due to the machining reaction force caused between the second roll 12 and the third roll 13 is assumed $\Delta Y2$. More specifically, a displacement amount of the first end 12A of the second roll 12 is assumed $\Delta Y2A$, and a displacement amount of the second end 12B is assumed $\Delta Y2B$. Further, an increasing amount of the radius R2 of the second roll 12 due to thermal expansion is assumed $\Delta R2$. More specifically, an increasing amount in the first end 12A of the second roll 12 is assumed $\Delta R2A$, and an increasing amount of the second end 12B is assumed $\Delta R2B$ (see FIGS. 9 and 16).

In such a setting, a gap dimension G1 of the first gap KG1 at the time when L11 and L21 are measured in step T114 (a first initial detection step) is expressed by $G1=G1S+\Delta X1+\Delta X2$ . . . (Expression 1). Further, $L11=\Delta X2 \cos \theta 1+\Delta Y2 \sin \theta 1$ . . . (Expression 2) is established. Also, $L21=-\Delta X2 \cos \theta 1 - \Delta Y2 \sin \theta 1 - G1 = -\Delta X2 \cos \theta 1 - \Delta Y2 \sin \theta 1 - (G1S+\Delta X1+\Delta X2)$ . . . (Expression 3) is established. Furthermore, a gap dimension G1 of the first gap KG1 at the time when L12 and L22 are measured in step T119 (a first-period-end detection step) is expressed by $G1=G1S+\Delta X1+\Delta X2-\Delta R1-\Delta R2$ . . . (Expression 4).

Further, $L12=\Delta X2 \cos \theta 1+\Delta Y2 \sin \theta 1-\Delta R2$ . . . (Expression 5) is established. Also, $L22=-\Delta X2 \cos \theta 1-\Delta Y2 \sin \theta 1-\Delta R2-G1=-\Delta X2 \cos \theta 1-\Delta Y2 \sin \theta 1-\Delta R2-(G1S+\Delta X1+\Delta X2-\Delta R1-\Delta R2)$ . . . (Expression 6) is established. Note that, when the values of L11, L21, L12, L22 measured by the first sensor 21 and the second sensor 22 are on an inner side (a roll center side) relative to a reference position (the reference position is assumed 0) in terms of a second-roll radial direction, they are considered "positive values," and when they are on an outer side relative to the reference position in terms of the second-roll radial direction, they are considered "negative values."

Here, the first-gap target value G1T (a target value of the gap dimension G1 of the first gap KG1) is equal to the gap dimension G1 of the first gap KG1 at the time when L11 and L21 are measured in step T114, and therefore, $G1T=G1S+\Delta X1+\Delta X2=L11-L21+2(\Delta X2 \cos \theta 1+\Delta Y2 \sin \theta 1)$ . . . (Expression 7) is established from (Expression 1), (Expression 2), and (Expression 3).

Further, a gap dimension G1N of the first gap KG1 at the time when the radius R1 of the first roll 11 is increased by $\Delta R1$ due to thermal expansion and the radius R2 of the second roll 12 is increased by $\Delta R2$ due to thermal expansion is equal to the gap dimension G1 of the first gap KG1 at the time when L12 and L22 are measured in step T119, and therefore, $G1N=G1S+\Delta X1+\Delta X2-\Delta R1-\Delta R2=L12-L22+2(\Delta X2 \cos \theta 1+\Delta Y2 \sin \theta 1)$ . . . (Expression 8) is established from (Expression 4), (Expression 5), and (Expression 6).

Further, a variation amount $\Delta G1$ of the gap dimension G1 of the first gap KG1, caused due to thermal expansion during each detection period DT(n), can be derived as $\Delta G1=G1N-G1T=(L12-L22)-(L11-L21)$ from (Expression 7) and (Expression 8). Accordingly, in terms of the variation amount $\Delta G1A$ of the gap dimension G1A of the first end KG1A of the first gap KG1, the relational expression of $\Delta G1A=(L12A-L22A)-(L11A-L21A)$ can be obtained. Further, in terms of the variation amount $\Delta G1B$ of the gap dimension G1B of the second end KG1B of the first gap KG1, the relational expression of $\Delta G1B=(L12B-L22B)-(L11B-L21B)$ can be obtained.

Further, in step T123 (a variation amount $\Delta G2$ calculation step), a variation amount $\Delta G2$ of the gap dimension G2 of the second gap KG2, caused due to thermal expansion during the detection period DT(n), is calculated by the second-gap variation detection portion 372. Note that, in Modification 2, the calculation is performed by use of a relational expression of $\Delta G2=(L42-L32)-(L41-L31)$.

Note that the relational expression is derived as follows. First, a setting value of the gap dimension G2 of the second gap KG2 (a gap dimension G2 of the second gap KG2 before the manufacture of the electrode plate 1 is started) is assumed G2S. Further, a displacement amount of the third roll 13 moved (displaced) in the second direction H23 due to the machining reaction force is assumed $\Delta Y3$. More specifically, a displacement amount of the first end 13A of the third roll 13 is assumed $\Delta Y3A$, and a displacement amount of the second end 13B is assumed $\Delta Y3B$. Further, an increasing amount of the radius R3 of the third roll 13 due to thermal expansion is assumed $\Delta R3$. More specifically, an increasing amount in the first end 13A of the third roll 13 is assumed $\Delta$R3A, and an increasing amount in the second end 13B is assumed $\Delta$R3B (see FIGS. 9 and 16).

Further, a displacement amount of the second roll 12 moved (displaced) in the first direction H21 due to the machining reaction force caused between the first roll 11 and the second roll 12 is assumed $\Delta$X2. More specifically, a displacement amount of the first end 12A of the second roll 12 is assumed $\Delta$X2A, and a displacement amount of the second end 12B is assumed $\Delta$X2B. Further, a displacement amount of the second roll 12 moved (displaced) in the second direction H23 due to the machining reaction force caused between the second roll 12 and the third roll 13 is assumed $\Delta$Y2. More specifically, a displacement amount of the first end 12A of the second roll 12 is assumed $\Delta$Y2A, and a displacement amount of the second end 12B is assumed $\Delta$Y2B. Further, an increasing amount of the radius R2 of the second roll 12 due to thermal expansion is assumed $\Delta$R2. More specifically, an increasing amount in the first end 12A of the second roll 12 is assumed $\Delta$R2A, and an increasing amount in the second end 12B is assumed $\Delta$R2B. Further, a thickness of the current collector foil 2 (substrate sheet) is assumed TH2 (see FIGS. 9 and 16).

In such a setting, a gap dimension G2 of the second gap KG2 at the time when L31 and L41 are measured in step T115 (a second initial detection step) is expressed by G2=G2S+$\Delta$Y2+$\Delta$Y3−TH2 . . . (Expression 11).

Further, L31=$\Delta$Y3 cos $\theta$3−TH2−G2=$\Delta$Y3 cos $\theta$3−TH2−(G2S+$\Delta$Y2+$\Delta$Y3−TH2) . . . (Expression 12) is established. Further, L41=−$\Delta$Y3 cos $\theta$3−TH2 . . . (Expression 13) is established. Further, a gap dimension G2 of the second gap KG2 at the time when L32 and L42 are measured in step T120 (a second-period-end detection step) is expressed by G2=G2S+$\Delta$Y2+$\Delta$Y3−TH2−$\Delta$R2−$\Delta$R3 . . . (Expression 14).

Further, L32=$\Delta$Y3 cos $\theta$3−TH2−$\Delta$R3−G2=$\Delta$Y3 cos $\theta$3−TH2−$\Delta$R3−(G2S+$\Delta$Y2+$\Delta$Y3−TH2−$\Delta$R2−$\Delta$R3) . . . (Expression 15) is established. Further, L42=−$\Delta$Y3 cos $\theta$3−TH2−$\Delta$R3 . . . (Expression 16) is established. Note that, when the values of L31, L41, L32, L42 measured by the second sensor 22 and the third sensor 23 are on an inner side (a roll center side) relative to a reference position (the reference position is assumed 0) in terms of a third-roll radial direction, they are considered "positive values," and when they are on an outer side relative to the reference position in terms of the third-roll radial direction, they are considered "negative values."

Here, the second-gap target value G2T (a target value of the gap dimension G2 of the second gap KG2) is equal to the gap dimension G2 of the second gap KG2 at the time when L31 and L41 are measured in step T115, and therefore, G2T=G2S+$\Delta$Y2+$\Delta$Y3−TH2=L41−L31+2$\Delta$Y3 cos $\theta$3 . . . (Expression 17) is established from (Expression 11), (Expression 12), and (Expression 13).

Further, a gap dimension G2N of the second gap KG2 at the time when the radius R2 of the second roll 12 is increased by $\Delta$R2 due to thermal expansion and the radius R3 of the third roll 13 is increased by $\Delta$R3 due to thermal expansion is equal to the gap dimension G2 of the second gap KG2 at the time when L32 and L42 are measured in step T120, and therefore, G2N=G2S+$\Delta$Y2+$\Delta$Y3−TH2−$\Delta$R2−$\Delta$R3=L42−L32+2$\Delta$Y3 cos $\theta$3 . . . (Expression 18) is established from (Expression 14), (Expression 15), and (Expression 16).

Further, a variation amount $\Delta$G2 of the gap dimension G2 of the second gap KG2, caused due to thermal expansion during each detection period DT(n), can be derived as $\Delta$G2=G2N−G2T=(L42−L32)−(L41−L31) from (Expression 17) and (Expression 18). Accordingly, in terms of the variation amount $\Delta$G2A of the gap dimension G2A of the first end KG2A of the second gap KG2, a relational expression of $\Delta$G2A=(L42A−L32A)−(L41A−L31A) can be obtained. Further, in terms of the variation amount $\Delta$G2B of the gap dimension G2B of the second end KG2B of the second gap KG2, a relational expression of $\Delta$G2B=(L42B−L32B)−(L41B−L31B) can be obtained.

Figure 18:
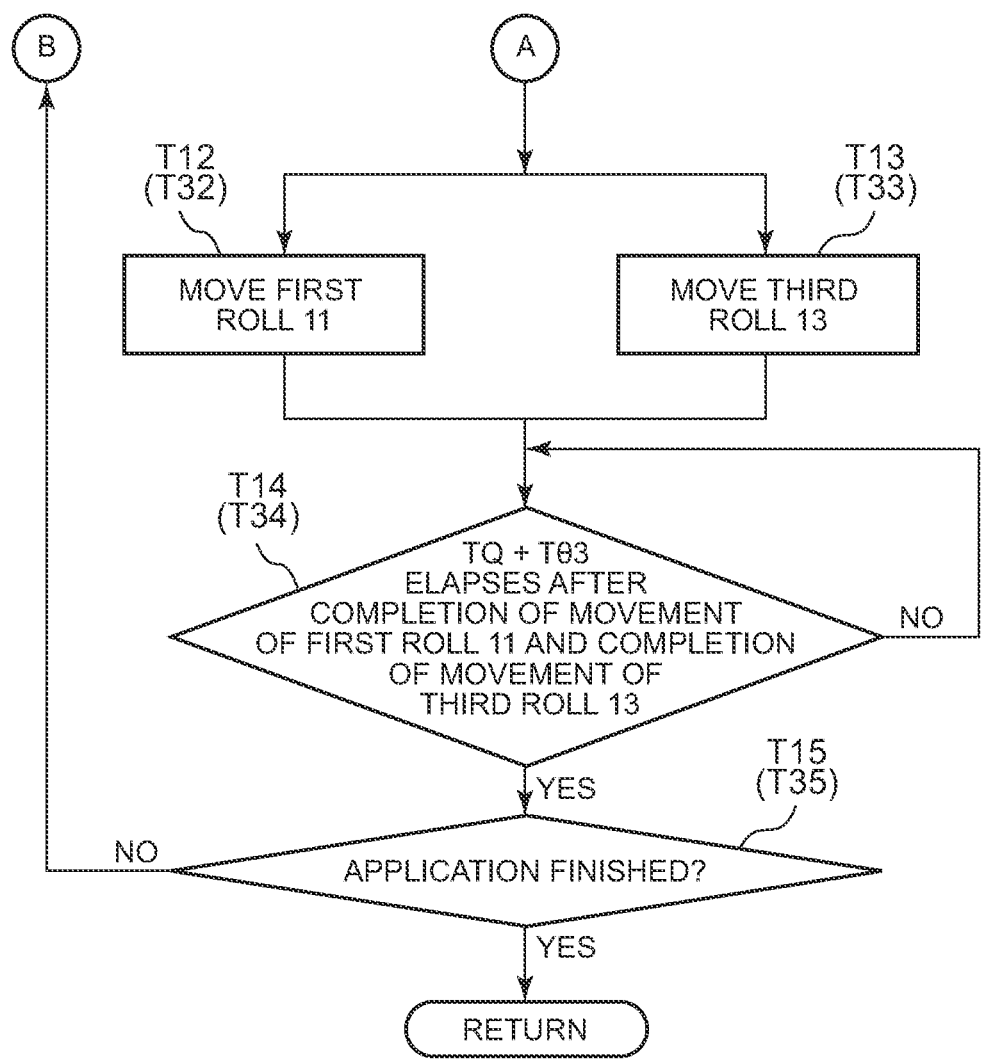
FIG. 18 is a part of a flowchart illustrating a content of the application step according to Modification 2.

Subsequently, as illustrated in FIG. 18, the process proceeds to step T12, in which, based on the variation amount $\Delta$G1 of the gap dimension G1 of the first gap KG1, caused during the detection period DT(n) and detected in step T11 (step T122), the first roll 11 is moved in the first direction H21 by the first-roll moving mechanism 25 so as to offset this. More specifically, based on a command of the first-roll movement instruction portion 373, the first end 11A of the first roll 11 is moved in the first direction H21 by the first-side first-roll moving mechanism 25a so as to offset the variation amount $\Delta$G1A. Further, based on a command of the first-roll movement instruction portion 373, the second end 11B of the first roll 11 is moved in the first direction H21 by the second-side first-roll moving mechanism 25b so as to offset the variation amount $\Delta$G1B.

Figure 19:
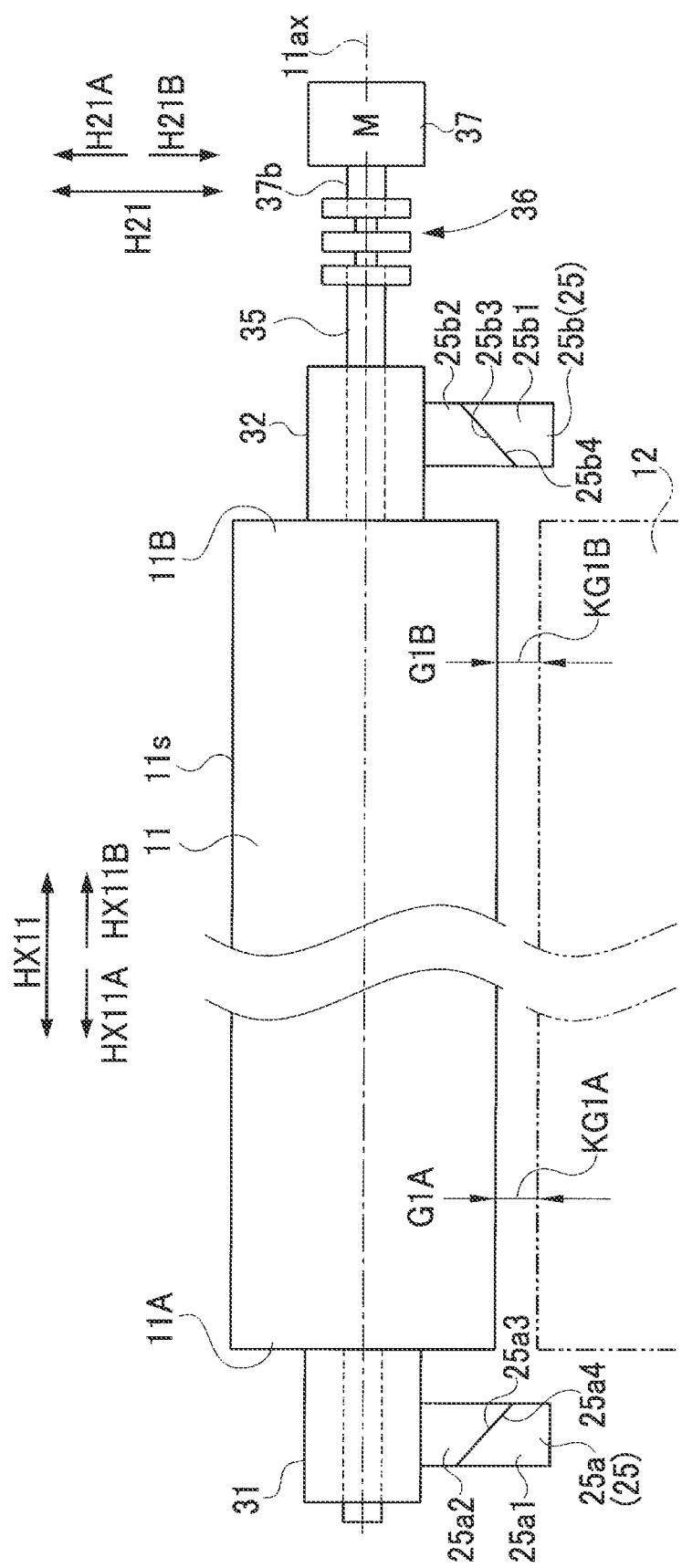
FIG. 19 is an explanatory view of a first-roll moving mechanism and a first-roll drive mechanism according to Modification 2.

Note that, as illustrated in FIG. 19, the first-side first-roll moving mechanism 25a includes a wedge-shaped first part 25a1 decreased in thickness toward a second side X11B (a right side in FIG. 19) in the first-roll axis direction HX11, and a wedge-shaped second part 25a2 decreased in thickness toward a first side X11A (a left side in FIG. 19) in the first-roll axis direction HX11. The first part 25a1 is configured to move in the first-roll axis direction HX11 (a right-left direction in FIG. 19) by driving of a motor (not shown). Further, an inclined surface 25a3 of the first part 25a1 and an inclined surface 25a4 of the second part 25a2 are movably connected to each other such that, when the first part 25a1 is moved in the first-roll axis direction HX11 (the right-left direction in FIG. 19), the inclined surface 25a3 of the first part 25a1 moves in the first-roll axis direction HX11 along the inclined surface 25a4 without being separated from the inclined surface 25a4 of the second part 25a2. Further, the second part 25a2 is configured such that its first side (a first side H21A in the first direction H21, an upper side in FIG. 19) is fixed to a first-side shaft receiving portion 31 configured to support a part of a rotational shaft portion 35 of the first roll 11, the part being placed on a first side (a first side HX11A in the first-roll axis direction HX11, the left side in FIG. 19).

Accordingly, when the first part 25a1 is moved in the first-roll axis direction HX11 (the right-left direction in FIG. 19) by driving of the motor (not shown), the inclined surface 25a3 of the first part 25a1 is moved in the first-roll axis direction HX11 (the right-left direction in FIG. 19), so that the inclined surface 25a4 of the second part 25a2 is moved in the first direction H21 (an up-down direction in FIG. 19), and hereby, the first end 11A of the first roll 11 is moved in the first direction H21 (the up-down direction in FIG. 19). For example, when the first part 25a1 is moved toward a second side HX11B (the right side in FIG. 19) in the first-roll axis direction HX11 from a state illustrated in FIG. 19, the inclined surface 25a4 of the second part 25a2 is pushed toward the first side H21A (the upper side in FIG. 19) in the first direction H21 by the inclined surface 25a3 of the first part 25a1, so that the first end 11A of the first roll 11 is moved toward the first side H21A (the upper side in FIG. 19) in the first direction H21.

Further, the second-side first-roll moving mechanism 25b also has a structure similar to the first-side first-roll moving mechanism 25a. Accordingly, similarly to the first-side first-roll moving mechanism 25a, when a first part 25b1 is moved in the first-roll axis direction HX11 (the right-left direction in FIG. 19), an inclined surface 25b3 of the first part 25b1 is moved in the first-roll axis direction HX11 (the right-left direction in FIG. 19), so that an inclined surface 25b4 of a second part 25b2 is moved in the first direction H21 (the up-down direction in FIG. 19), and hereby, the second end 11B of the first roll 11 is moved in the first direction H21 (the up-down direction in FIG. 19).

Thus, the first end 11A of the first roll 11 is moved in the first direction H21 by the first-side first-roll moving mechanism 25a so as to offset the variation amount ΔG1A (that is, the first end 11A of the first roll 11 is moved in the first direction H21 only by ΔG1A). Further, the second end 11B of the first roll 11 is moved in the first direction H21 by the second-side first-roll moving mechanism 25b so as to offset the variation amount ΔG1B (that is, the second end 11B of the first roll 11 is moved in the first direction H21 only by ΔG1B).

Hereby, the gap dimension G1 of the first gap KG1 can be adjusted (restored) to the first-gap target value G1T. More specifically, the gap dimension G1A of the first end KG1A of the first gap KG1 (see FIG. 19) can be adjusted (restored) to a first-side first-gap target value G1TA. Further, the gap dimension G1B of the second end KG1B of the first gap KG1 (see FIG. 19) can be adjusted (restored) to a second-side first-gap target value G1TB. Note that the first-side first-gap target value G1TA is equal to a gap dimension G1A of the first end KG1A of the first gap KG1 at the time when L11A and L21A are measured in step T114. Further, the second-side first-gap target value G1TB is equal to a gap dimension G1B of the second end KG1B of the first gap KG1 at the time when L11B and L21B are measured in step T114.

Further, as illustrated in FIG. 19, the rotational shaft portion 35 of the first roll 11 is connected, via a Schmidt coupling 36, to a rotating shaft 37b of a drive motor 37 that rotates the first roll 11. Further, the drive motor 37 is held and fixed by a bracket (not shown). With such a configuration, the first roll 11 (the rotational shaft portion 35) can be moved in the first direction H21 (the up-down direction in FIG. 19) independently from the drive motor 37. Further, even in a case where the first-roll central axis 11ax deviates from a center of the rotating shaft 37b of the drive motor 37 due to the movement of the rotational shaft portion 35 of the first roll 11, the first roll 11 can be rotated appropriately by the drive motor 37.

Further, in step T13, the third roll 13 is moved in the second direction H23 by the third-roll moving mechanism 26 based on the variation amount ΔG2 of the gap dimension G2 of the second gap KG2, caused during the detection period DT(n) and detected in step T11 (step T123), so as to offset this. More specifically, based on a command of the third-roll movement instruction portion 374, the first end 13A of the third roll 13 is moved in the second direction H23 by the first-side third-roll moving mechanism 26a so as to offset the variation amount ΔG2A. Furthermore, based on the command of the third-roll movement instruction portion 374, the second end 13B of the third roll 13 is moved in the second direction H23 by the second-side third-roll moving mechanism 26b so as to offset the variation amount ΔG2B (see FIG. 20).

Note that, the first-side third-roll moving mechanism 26a has a structure similar to the first-side first-roll moving mechanism 25a described above. Accordingly, similarly to the first-side first-roll moving mechanism 25a, when a first part 26a1 is moved in the third-roll axis direction HX13 (a right-left direction in FIG. 20), an inclined surface 26a3 of the first part 26a1 is moved in the third-roll axis direction HX13 (the right-left direction in FIG. 20), so that an inclined surface 26a4 of a second part 26a2 is moved in the second direction H23 (an up-down direction in FIG. 20), and hereby, the first end 13A of the third roll 13 is moved in the second direction H23 (the up-down direction in FIG. 20).

Further, the second-side third-roll moving mechanism 26b also has a structure similar to the second-side first-roll moving mechanism 25b described above. Accordingly, similarly to the second-side first-roll moving mechanism 25b, when a first part 26b1 is moved in the third-roll axis direction HX13 (the right-left direction in FIG. 20), an inclined surface 26b3 of the first part 26b1 is moved in the third-roll axis direction HX13 (the right-left direction in FIG. 20), so that an inclined surface 26b4 of a second part 26b2 is moved in the second direction H23 (the up-down direction in FIG. 20), and hereby, the second end 13B of the third roll 13 is moved in the second direction H23 (the up-down direction in FIG. 20).

Thus, the first end 13A of the third roll 13 is moved in the second direction H23 by the first-side third-roll moving mechanism 26a so as to offset the variation amount ΔG2A (that is, the first end 13A of the third roll 13 is moved in the second direction H23 only by ΔG2A). Furthermore, the second end 13B of the third roll 13 is moved in the second direction H23 by the second-side third-roll moving mechanism 26b so as to offset the variation amount ΔG2B (that is, the second end 13B of the third roll 13 is moved in the second direction H23 only by ΔG2B).

Hereby, the gap dimension G2 of the second gap KG2 can be adjusted (restored) to the second-gap target value G2T. More specifically, the gap dimension G2A of the first end KG2A of the second gap KG2 (see FIG. 20) can be adjusted (restored) to a first-side second-gap target value G2TA. Furthermore, the gap dimension G2B of the second end KG2B of the second gap KG2 (see FIG. 20) can be adjusted (restored) to a second-side second-gap target value G2 TB. Note that the first-side second-gap target value G2TA is equal to a gap dimension G2A of the first end KG2A of the second gap KG2 at the time when L31A and L41A are measured in step T115. Further, the second-side second-gap target value G2 TB is equal to a gap dimension G2B of the second end KG2B of the second gap KG2 at the time when L31B and L41B are measured in step T115.

Figure 20:
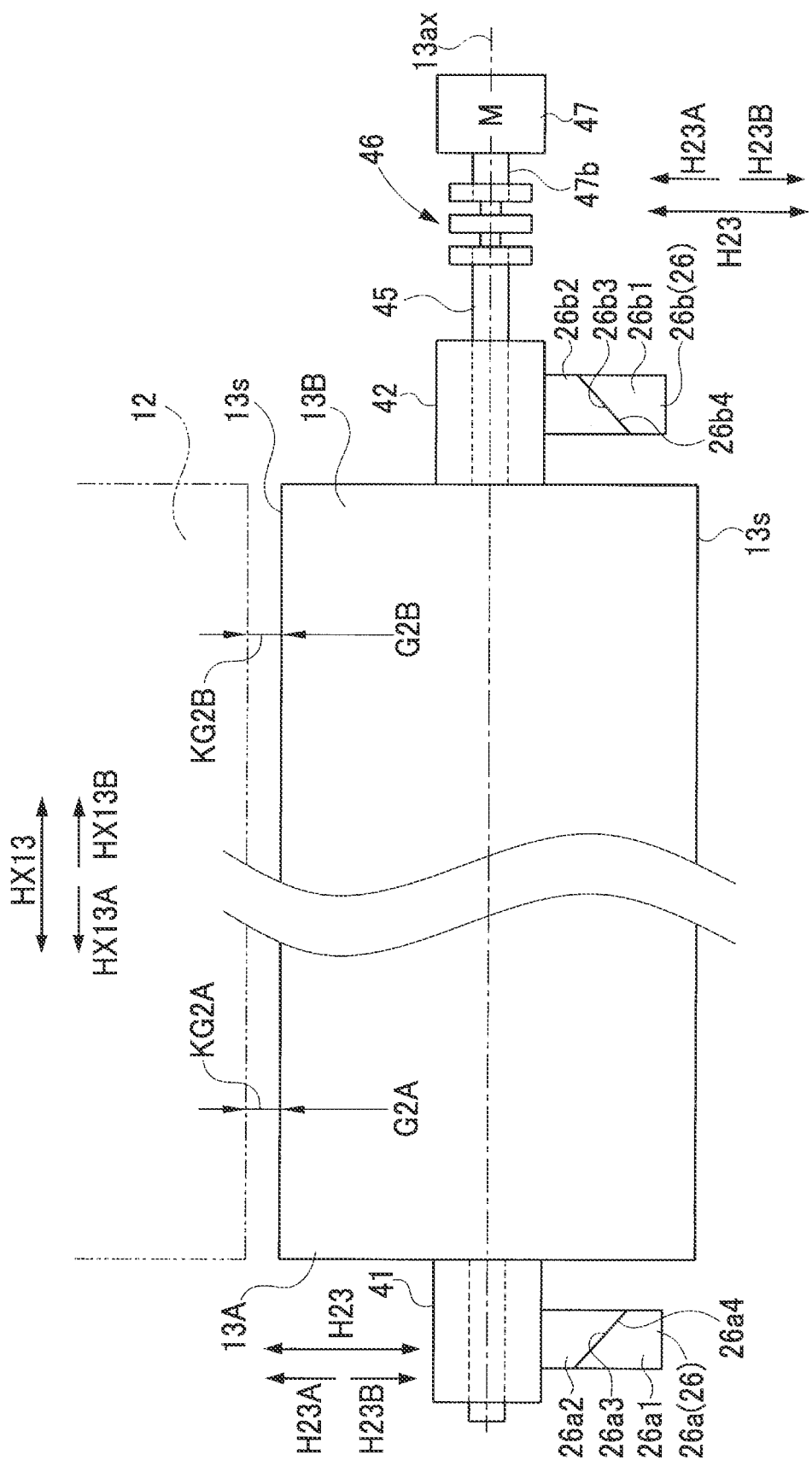
FIG. 20 is an explanatory view of a third-roll moving mechanism and a third-roll drive mechanism according to Modification 2.

Further, as illustrated in FIG. 20, a rotational shaft portion 45 of the third roll 13 is connected, via a Schmidt coupling 46, to a rotating shaft 47b of the motor 47 that rotates the third roll 13. Further, the motor 47 is held and fixed by a bracket (not shown). With such a configuration, the third roll 13 (the rotational shaft portion 45) can be moved in the second direction H23 (the up-down direction in FIG. 20) independently from the motor 47. Further, even in a case where the third-roll central axis 13ax deviates from a center of the rotating shaft 47b of the motor 47 due to the movement of the rotational shaft portion 45 of the third roll 13, the third roll 13 can be rotated appropriately by the motor 47.

Then, the process proceeds to step T14 (an adjustment step), in which the adjustment portion 375 determines whether or not a second-roll ¼-rotation time TQ during which the second roll 12 makes a quarter turn elapses and a third-roll θ3-rotation time Tθ3 during which the third roll 13 rotates by the third angle θ3 elapses after the movement of the first roll 11 by the first-roll moving mechanism 25 is finished and the movement of the third roll 13 by the third-roll moving mechanism 26 is finished, similarly to the process of step S14 of the embodiment. In a case where the third-roll θ3-rotation time T03 has not elapsed (No), step T14 is repeated to wait until the time has elapsed. In the meantime, in a case of Yes in step T14, the process proceeds to step T15, in which the adjustment portion 375 detects whether or not application of the wet active material layer 6 to the current collector foil 2 is finished or not, similarly to step S15 of the embodiment.

In a case where the application is not finished (No), the process returns to step T117 (see FIG. 17), in which a new detection period DT(n+1) is started. In the meantime, in a case where the application has been finished (Yes), step T1 (the application step) is finished so as to return to a main routine (see FIG. 2). Subsequently, in a drying step in step S2, the wet active material layer 6 thus applied is dried by use of the dryer 30 so as to form an active material layer 3, and an electrode plate formed herein is wound up once as an electrode plate roll 1RL, similarly to the embodiment.

With such a configuration, the gap dimension G1 of the first gap KG1 and the gap dimension G2 of the second gap KG2 are maintained generally constant over an entire period of step T1 (the application step), thereby making it possible to prevent accumulation of variations of the first gap KG1 and variations of the second gap KG2 caused due to thermal expansion of the first roll 11 to the third roll 13.

Figure 21:
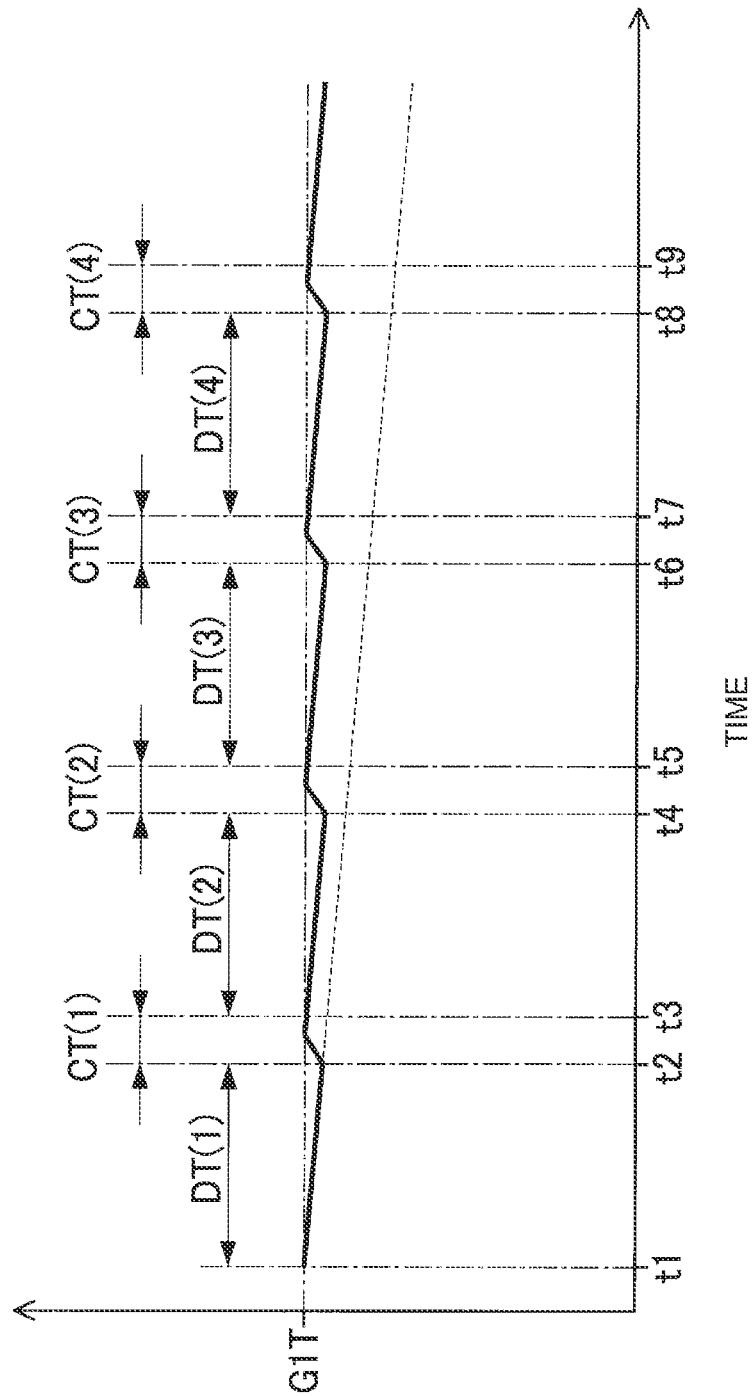
FIG. 21 is a graph indicating a temporal variation of a gap dimension of a first gap according to Modification 2.
Figure 22:
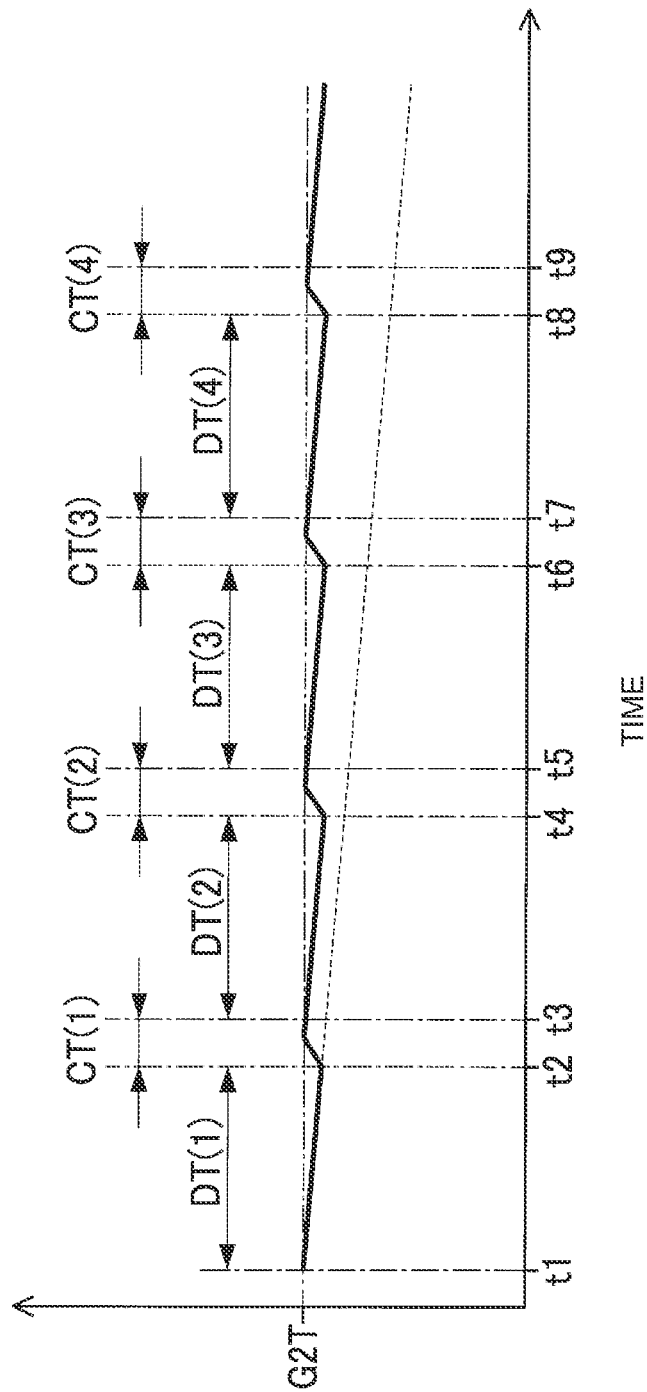
FIG. 22 is a graph indicating a temporal variation of a gap dimension of a second gap according to Modification 2.

Here, details will be described below with reference to FIGS. 21 and 22. FIG. 21 is a graph indicating a temporal variation of the gap dimension G1 of the first gap KG1. Further, FIG. 22 is a graph indicating a temporal variation of the gap dimension G2 of the second gap KG2. As illustrated in FIGS. 21 and 22, after the supply of the active material paste 4 to the first gap KG1 is started, a detection period DT(1) is started from a time t1. Note that, as illustrated in FIG. 21, a gap dimension G1 of the first gap KG1 at the time t1 is the first-gap target value G1T. Further, as illustrated in FIG. 22, a gap dimension G2 of the second gap KG2 at the time t1 is the second-gap target value G2T.

After the detection period DT(1) is started, the first roll 11, the second roll 12, and the third roll 13 thermally expand due to friction over time. On this account, as indicated by a broken line in FIG. 21, the gap dimension G1 of the first gap KG1 gradually decreases over time. Further, as indicated by a broken line in FIG. 22, the gap dimension G2 of the second gap KG2 also gradually decreases over time.

However, in Modification 2, as described above, the variation amount ΔG1 of the gap dimension G1 of the first gap KG1 is offset by use of measured values of the first sensor 21 and the second sensor 22 every detection period DT(n). More specifically, after a predetermined time elapses from the time t1 and the detection period DT(1) is finished at a time t2, a variation amount ΔG1 is calculated and the first roll 11 is moved by use of the first-roll moving mechanism 25, so as to offset a variation of the gap dimension G1 of the first gap KG1. That is, as indicated by a continuous line in FIG. 21, the gap dimension G1 is restored to the first-gap target value G1T.

Further, as described above, the variation amount ΔG2 of the gap dimension G2 of the second gap KG2 is offset by use of measured values of the third sensor 23 and the fourth sensor 24 every detection period DT(n). More specifically, after a predetermined time elapses from the time t1 and the detection period DT(1) is finished at the time t2, a variation amount ΔG2 is calculated and the third roll 13 is moved by use of the third-roll moving mechanism 26, so as to offset a variation of the gap dimension G2 of the second gap KG2.

That is, as indicated by a continuous line in FIG. 22, the gap dimension G2 is restored to the second-gap target value G2T.

After that, a new detection period DT(2) is started at a time t3. Thereafter, the first roll 11 is moved to offset the variation amount ΔG1 of the gap dimension G1 of the first gap KG1 every detection period DT(n) in a similar manner to above. Thus, as indicated by the continuous line in FIG. 21, the gap dimension G1 of the first gap KG1 is maintained at the first-gap target value G1T or a generally uniform value close to this at any time, thereby making it possible to prevent accumulation of variations of the first gap KG1 due to thermal expansion. This allows the thickness TH5 of the second-roll coating film 5 formed on the second roll 12 to be maintained at a generally uniform value.

Similarly, the third roll 13 is moved to offset the variation amount ΔG2 of the gap dimension G2 of the second gap KG2 every detection period DT(n). Hereby, as indicated by the continuous line in FIG. 22, the gap dimension G2 of the second gap KG2 is maintained at the second-gap target value G2T or a generally uniform value close to this at any time, thereby making it possible to prevent accumulation of variations of the second gap KG2 due to thermal expansion. Thus, the thickness TH6 of the wet active material layer 6 formed on the current collector foil 2 can be maintained at a generally uniform value.

Subsequently, the process proceeds to step T3 (see FIG. 2), and a wet active material layer 6 is applied onto a second surface (back surface) 2sb of the current collector foil 2 so as to manufacture a wet electrode plate 7. More specifically, as illustrated in FIGS. 17 and 18, processes of steps T31 to T35 are performed in a similar manner to the processes of steps T11 to T15 performed earlier. Note that, in step T31 (a detection step), processes of steps T311 to T323 are performed in a similar manner to the processes of steps T111 to T123 performed earlier. More specifically, in step T322, a variation amount ΔG1 of the gap dimension G1 of the first gap KG1 is calculated by use of a relational expression ΔG1=(L12−L22)−(L11−L21), and the first roll 11 is moved so as to offset the variation amount ΔG1 in step T32. Further, in step T323, a variation amount ΔG2 of the gap dimension G2 of the second gap KG2 is calculated by use of a relational expression ΔG2=(L42−L32)−(L41−L31), and the third roll 13 is moved so as to offset the variation amount ΔG2 in step T33.

After that, in a drying step of step S4, the wet active material layer 6 is dried by use of the dryer 30, and an electrode plate 1 is wound up as an electrode plate roll 1RL, similarly to the embodiment. Thus, the electrode plate 1 having the active material layers 3, 3 on respective surfaces 2sa, 2sb of the current collector foil 2 is completed.

In the manufacturing method of the embodiment or Modifications 1, 2 as described above, the first roll 11 can be moved in order to offset the variation amount ΔG1 of the gap dimension G1 of the first gap KG1 due to the thermal expansion of the first roll 11 and the second roll 12 and to maintain the gap dimension G1 of the first gap KG1 appropriately without considering influence on the second gap KG2. Further, a variation of the thickness TH5 of the second-roll coating film 5, caused due to a variation of the first gap KG1, is eliminated every detection period DT (n), thereby making it possible to prevent accumulation of variations in the gap dimension G1 of the first gap KG1. Thus, influence of the thermal expansion of the first roll 11 and the second roll 12 on the thickness TH6 and a density of the wet active material layer 6 formed on the current collector foil 2 is restrained, thereby making it possible to manufacture the wet electrode plate 7 in which variations of the thickness TH6 of the wet active material layer 6 and the like are restrained in terms of the longitudinal direction EH of the current collector foil 2. Further, with the use of the coating applicators 10, 110, it is possible to restrain variations of the thickness TH5 of the second-roll coating film 5 due to the thermal expansion of the first roll 11 and the second roll 12, thereby eventually making it possible to apply, onto the current collector foil 2, the wet active material layer 6 in which variations of the thickness TH6 and the like are restrained in terms of the longitudinal direction EH of the current collector foil 2.

Further, in the manufacturing method of the embodiment or Modifications 1, 2, the third roll 13 can be moved in order to offset the variation amount ΔG2 of the gap dimension G2 of the second gap KG2 due to the thermal expansion of the second roll 12 and the third roll 13 and to maintain the gap dimension G2 of the second gap KG2 appropriately without considering influence on the first gap KG1. Further, a variation of the thickness TH6 of the wet active material layer 6, caused due to a variation of the second gap KG2, is eliminated every detection period DT(n), thereby making it possible to prevent accumulation of variations in the gap dimension G2 of the second gap KG2. Thus, the influence of the thermal expansion of the thermal expansion of the second roll 12 and the third roll 13 on the thickness TH6 of the wet active material layer 6 formed on the current collector foil 2 is restrained, thereby making it possible to manufacture the wet electrode plate 7 in which variations of the thickness TH6 of the wet active material layer 6 are restrained in terms of the longitudinal direction EH of the current collector foil 2. Further, with the use of the coating applicators 10, 110, it is possible to apply, onto the current collector foil 2, the wet active material layer 6 in which variations of the thickness TH6 due to the thermal expansion of the second roll 12 and the third roll 13 are restrained in terms of the longitudinal direction EH of the current collector foil 2.

The present disclosure has been described above in line with the embodiment and Modifications 1, 2. However, needless to say, the present disclosure is not limited to the above embodiment and so on, and can be modified and applied appropriately without departing from the gist of the present disclosure. For example, the embodiment and Modifications 1, 2 exemplify a case where each of the first to fourth sensors 21 to 24 is provided in pair such that one of the pair is provided on the first side of a corresponding one of the second roll 12 and the third roll 13 and the other one of the pair is provided on the second side thereof. However, each of the first to fourth sensors 21 to 24 may be used solely so as to detect a central portion of a corresponding one of the second roll 12 and the third roll 13. Further, in the embodiment and so on, the electrode plate 1 is obtained such that the wet active material layer 6 is applied onto the current collector foil 2 and dried. However, the embodiment and so on are not limited to the manufacture of the electrode plate, but can be applied to manufacture of a paste-layer-attached sheet in which a paste layer is applied to a substrate sheet.

Figure 16:
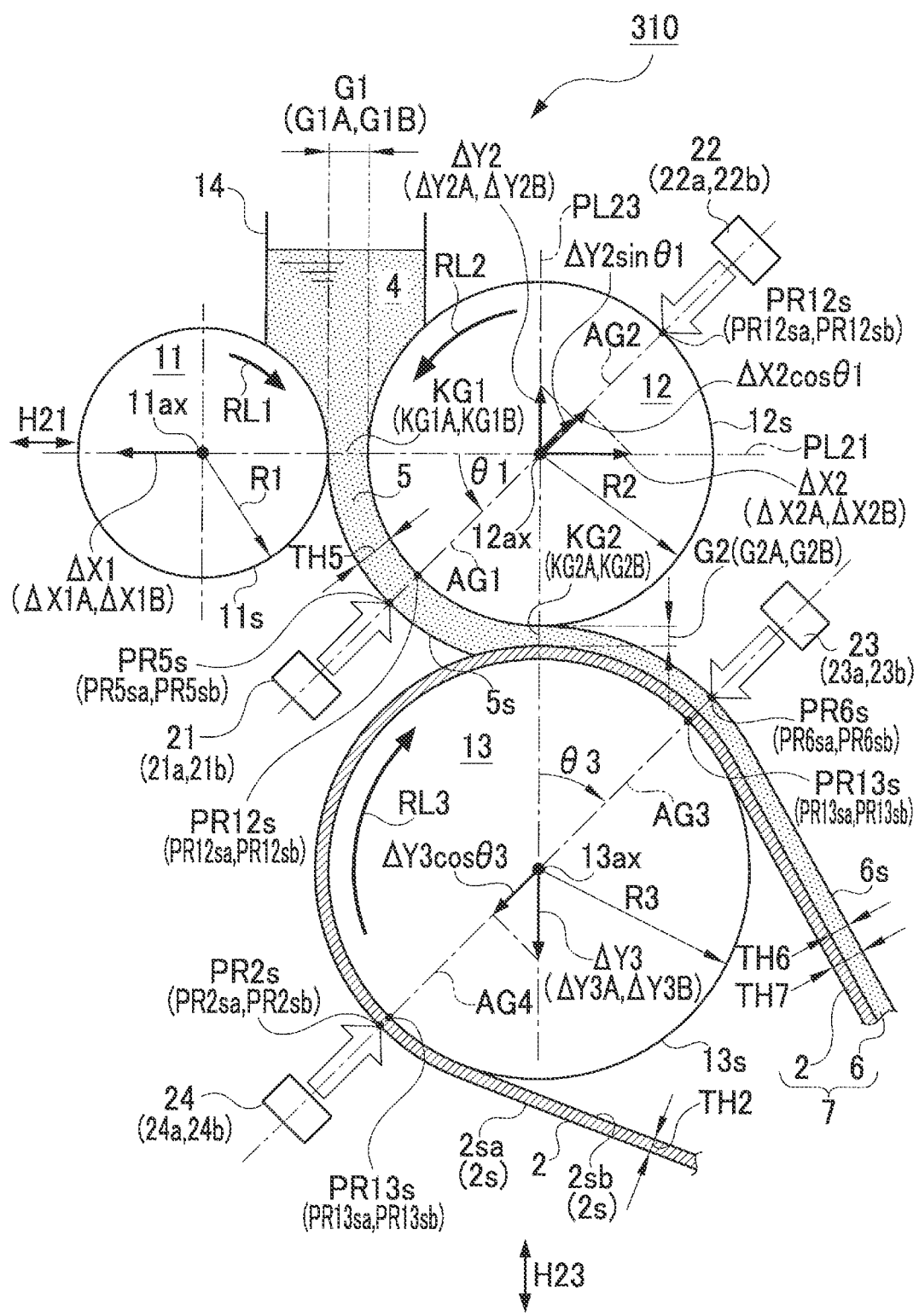
FIG. 16 is an explanatory view illustrating a coating applicator according to Modification 2 and a manufacturing method of a wet electrode plate by use of this.

Further, in Modification 2, the fourth radial position PR2s on the radially outer surface 2sa of the current collector foil 2 wound around the third roll 13 is detected by the fourth sensor 24 (24a, 24b) (see FIG. 16). However, similarly to Modification 1, the winding form of the current collector foil 2 around the third roll 13 may be modified such that the third-roll radial position PR13s on the third-roll surface 13s of the third roll 13 is detected by the fourth sensor 24 (24a, 24b) (see FIG. 15). Even in such a form, by performing the processes of steps T11 to T15 (steps T31 to T35) in a similar manner to Modification 2, the gap dimension G1 of the first gap KG1 and the gap dimension G2 of the second gap KG2 can be maintained generally constant, thereby making it possible to prevent accumulation of variations of the first gap KG1 and variations of the second gap KG2 caused due to thermal expansion of the first roll 11 to the third roll 13.

What is claimed is:

1. A coating applicator for providing a belt-shaped paste layer made of a paste on a belt-shaped substrate sheet, the coating applicator comprising:

a first roll;

a second roll placed in parallel with the first roll via a first gap and configured to rotate in a second-roll rotation direction reverse to the first roll;

a third roll placed in parallel with the second roll via a second gap and configured to rotate in a reverse direction to the second roll so as to convey the substrate sheet passing through the second gap, the first roll, the second roll, and the third roll being placed such that a first virtual surface connecting a second-roll central axis of the second roll to a first-roll central axis of the first roll and a second virtual surface connecting the second-roll central axis of the second roll to a third-roll central axis of the third roll intersect with each other at right angles at the second-roll central axis and the second gap is formed in a part advanced by a quarter turn from the first gap in the second-roll rotation direction over a second-roll surface of the second roll;

a first sensor configured to detect a first radial position on a coating film surface of a second-roll coating film made of the paste applied to the second-roll surface, the first radial position being at a first angle position on the coating film surface of the second-roll coating film, the first angle position being advanced by a first angle from the first gap in the second-roll rotation direction over the second-roll surface, the first angle being larger than 0° but smaller than 90°;

a second sensor placed to be opposed to the first sensor across the second roll and configured to detect a second radial position on the second-roll surface of the second roll, the second radial position being at a second angle position on the second-roll surface, the second angle position being advanced from the first angle position by 180° in the second-roll rotation direction;

a first-roll moving mechanism configured to move the first roll in a first direction connecting the second roll to the first roll;

a first-gap variation detection portion configured to detect, every detection period, a variation amount of a gap dimension of the first gap to be caused during the detection period due to thermal expansion caused in the first roll and the second roll, by use of the first radial position on the coating film surface of the second-roll coating film, detected by the first sensor, and the second radial position on the second-roll surface, detected by the second sensor, the detection period being provided repeatedly, the thermal expansion being caused along with continuous formation of the paste layer on the substrate sheet such that the paste is supplied to the first gap and the second-roll coating film applied to the second-roll surface is passed through the second gap so as to be transferred onto the substrate sheet conveyed by the third roll;

a first-roll movement instruction portion configured to instruct the first-roll moving mechanism to move the first roll in the first direction so as to offset the variation amount of the first gap, detected by the first-gap variation detection portion;

an adjustment portion configured to start a new detection period after the movement of the first roll by the first-roll moving mechanism is finished, and then, a second-roll rotation time during which the second roll rotates by the first angle elapses after a previous detection period is finished;

a third sensor configured to detect a third radial position on a layer surface of the paste layer transferred on the substrate sheet wound around the third roll, the third radial position being at a third angle position on the layer surface of the paste layer, the third angle position being advanced from the second gap by a third angle in a third-roll rotation direction over a third-roll surface of the third roll, the third angle being larger than 0° but smaller than 90°;

a fourth sensor placed so as to be opposed to the third sensor across the third roll, the fourth sensor being configured to detect a fourth radial position on the third-roll surface of the third roll or a radially outer surface of the substrate sheet wound around the third roll, the fourth radial position being at a fourth angle position on the third-roll surface or the radially outer surface, the fourth angle position being returned by 180° in the third-roll rotation direction from the third angle position; and a third-roll moving mechanism configured to move the third roll in a second direction connecting the second roll to the third roll;

a second-gap variation detection portion configured to detect, every detection period, a variation amount of a gap dimension of the second gap to be caused during the detection period due to thermal expansion caused in the second roll and the third roll, by use of the third radial position detected by the third sensor and the fourth radial position detected by the fourth sensor; and a third-roll movement instruction portion configured to instruct the third-roll moving mechanism to move the third roll in the second direction so as to offset the variation amount of the second gap, detected by the second-gap variation detection portion, wherein the adjustment portion starts the new detection period after the movement of the first roll by the first-roll moving mechanism is finished and the movement of the third roll by the third-roll moving mechanism is finished, and then, a second-roll ¼-rotation time elapses and further a third-roll rotation time during which the third roll rotates by the third angle elapses after the previous detection period is finished.

2. The coating applicator according to claim 1, wherein the first-gap variation detection portion acquires the variation amount of the first gap, caused during the detection period due to the thermal expansion of the first roll and the second roll, from a difference between a variation amount of the first radial position on the coating film surface of the second-roll coating film, the variation amount being caused during the detection period and detected by the first sensor, and a variation amount of the second radial position on the second-roll surface of the second roll, the variation amount being caused during the detection period and detected by the second sensor.

3. The coating applicator according to claim 1, wherein the first sensor is a sensor configured to detect the first radial position on the coating film surface based on a preinitiation first radial position on the second-roll surface at the first angle position as a reference position, the preinitiation first radial position being measured by the first sensor before the supply of the paste to the first gap is started;

the second sensor is a sensor configured to detect the second radial position on the second-roll surface based on a preinitiation second radial position on the second-roll surface at the second angle position as a reference position, the preinitiation second radial position being measured by the second sensor before the supply of the paste to the first gap is started;

the first-gap variation detection portion causes the first sensor to measure an initial first radial position on the coating film surface based on the preinitiation first radial position as the reference position and causes the second sensor to measure an initial second radial position on the second-roll surface based on the preinitiation second radial position as the reference position, so as to acquire a value of the measured initial first radial position on the coating film surface and a value of the measured initial second radial position on the second-roll surface, after the second roll rotates by the first angle or more, but before the second roll makes a first predetermined number of rotations, counting from the start of the supply of the paste to the first gap at a time of starting a first detection period among the detection periods provided repeatedly;

after that, the first-gap variation detection portion causes the first sensor to measure an end first radial position on the coating film surface based on the preinitiation first radial position as the reference position and causes the second sensor to measure an end second radial position on the second-roll surface based on the preinitiation second radial position as the reference position, at an end of each of the detection periods, so as to acquire a value of the measured end first radial position on the coating film surface and a value of the measured end second radial position on the second-roll surface; and the first-gap variation detection portion calculates a value of $\Delta G1$, which is a variation amount of the first gap, caused due to the thermal expansion during the each of the detection periods, by use of a relational expression of $\Delta G1=(L12-L22)-(L11-L21)$, where $L11$ indicates a value of the initial first radial position, $L21$ indicates a value of the initial second radial position, $L12$ indicates a value of the end first radial position, and $L22$ indicates a value of the end second radial position.

4. The coating applicator according to claim 1, wherein the first sensor includes a first-side first sensor and a second-side first sensor, and the second sensor includes a first-side second sensor and a second-side second sensor, such that the first-side first sensor and the first-side second sensor are placed to be opposed to each other via a first end of the second roll and the second-side first sensor and the second-side second sensor are placed to be opposed to each other via a second end of the second roll;

the first-roll moving mechanism includes a first-side first-roll moving mechanism configured to move a first end of the first roll in the first direction, and a second-side first-roll moving mechanism configured to move a second end of the first roll in the first direction;

the first-gap variation detection portion detects a variation amount of a gap dimension of a first end of the first gap by use of the first-side first sensor and the first-side second sensor, and detects a variation amount of a gap dimension of a second end of the first gap by use of the second-side first sensor and the second-side second sensor; and the first-roll movement instruction portion instructs the first-side first-roll moving mechanism to move the first end of the first roll so as to offset the detected variation amount of the gap dimension of the first end of the first gap, and instructs the second-side first-roll moving mechanism to move the second end of the first roll so as to offset the detected variation amount of the gap dimension of the second end of the first gap.

5. The coating applicator according to claim 1, wherein the second-gap variation detection portion acquires the variation amount of the second gap, caused during the detection period due to the thermal expansion of the second roll and the third roll, from a difference between a variation amount of the third radial position on the layer surface of the paste layer, the variation amount being caused during the detection period and detected by the third sensor, and a variation amount of the fourth radial position on the third-roll surface or the radially outer surface, the variation amount being caused during the detection period and detected by the fourth sensor.

6. The coating applicator according to claim 1, wherein:
the third sensor is a sensor configured to measure the third radial position on the layer surface of the paste layer based on a preinitiation third radial position on the third-roll surface at the third angle position as a reference position, the preinitiation third radial position being measured by the third sensor before the supply of the paste to the first gap is started;

the fourth sensor is a sensor configured to measure the fourth radial position on the radially outer surface of the substrate sheet or the third-roll surface based on a preinitiation fourth radial position on the third-roll surface at the fourth angle position as a reference position, the preinitiation fourth radial position being measured by the fourth sensor before the supply of the paste to the first gap is started;

the second-gap variation detection portion causes the third sensor to measure an initial third radial position on the layer surface of the paste layer based on the preinitiation third radial position as the reference position and causes the fourth sensor to measure an initial fourth radial position on the radially outer surface of the substrate sheet or the third-roll surface based on the preinitiation fourth radial position as the reference position, so as to acquire a value of the measured initial third radial position on the layer surface of the paste layer and a value of the measured initial fourth radial position on the radially outer surface of the substrate sheet or the third-roll surface, after the third roll rotates by the third angle or more, but before the third roll makes a second predetermined number of rotations, counting from a time when the second-roll coating film first reaches the second gap at a time of starting the first detection period among the detection periods provided repeatedly;

after that, the second-gap variation detection portion causes the third sensor to measure an end third radial position on the layer surface of the paste layer based on the preinitiation third radial position as the reference position and causes the fourth sensor to measure an end fourth radial position on the radially outer surface of the substrate sheet or the third-roll surface based on the preinitiation fourth radial position as the reference position, at an end of each of the detection periods, so as to acquire a value of the measured end third radial position on the layer surface of the paste layer and a value of the measured end fourth radial position on the radially outer surface of the substrate sheet or the third-roll surface; and the second-gap variation detection portion calculates a value of $\Delta G2$, which is a variation amount of the second gap, caused due to the thermal expansion during the each of the detection periods, by use of a relational expression of $\Delta G2=(L42-L32)-(L41-L31)$, where $L31$ indicates a value of the initial third radial position, $L41$ indicates a value of the initial fourth radial position, $L32$ indicates a value of the end third radial position, and $L42$ indicates a value of the end fourth radial position.

7. The coating applicator according to claim 1, wherein:
the third sensor includes a first-side third sensor and a second-side third sensor, and the fourth sensor includes a first-side fourth sensor and a second-side fourth sensor, such that the first-side third sensor and the first-side fourth sensor are placed to be opposed to each other via a first end of the third roll and the second-side third sensor and the second-side fourth sensor are placed to be opposed to each other via a second end of the third roll;

the third-roll moving mechanism includes a first-side third-roll moving mechanism configured to move the first end of the third roll in the second direction, and a second-side third-roll moving mechanism configured to move the second end of the third roll in the second direction;

the second-gap variation detection portion detects a variation amount of a gap dimension of a first end of the second gap by use of the first-side third sensor and the first-side fourth sensor, and a variation amount of a gap dimension of a second end of the second gap by use of the second-side third sensor and the second-side fourth sensor; and the third-roll movement instruction portion instructs the first-side third-roll moving mechanism to move the first end of the third roll so as to offset the detected variation amount of the gap dimension of the first end of the second gap, and instructs the second-side third-roll moving mechanism to move the second end of the third roll so as to offset the detected variation amount of the gap dimension of the second end of the second gap.

* * * * *